Oct. 25, 1955 C. E. LOMAX 2,721,898

TELEPHONE SYSTEM

Filed Oct. 7, 1953 22 Sheets-Sheet 1

INVENTOR.
CLARENCE E. LOMAX

BY Wm. Watts Owen.

ATTY.

Oct. 25, 1955 C. E. LOMAX 2,721,898

TELEPHONE SYSTEM

Filed Oct. 7, 1953 22 Sheets-Sheet 2

INVENTOR.
CLARENCE E. LOMAX
BY Wm. Walter Owen
ATTY.

Oct. 25, 1955 C. E. LOMAX 2,721,898

TELEPHONE SYSTEM

Filed Oct. 7, 1953 22 Sheets-Sheet 3

INVENTOR.
CLARENCE E. LOMAX
BY Wm. Walter Owen
ATTY.

Oct. 25, 1955 C. E. LOMAX 2,721,898

TELEPHONE SYSTEM

Filed Oct. 7, 1953 22 Sheets-Sheet 4

INVENTOR.
CLARENCE E. LOMAX
BY Wm. Walter Owen
ATTY.

Oct. 25, 1955 C. E. LOMAX 2,721,898

TELEPHONE SYSTEM

Filed Oct. 7, 1953 22 Sheets-Sheet 5

INVENTOR.
CLARENCE E. LOMAX

BY Wm. Walter Owen

ATTY.

Oct. 25, 1955 C. E. LOMAX 2,721,898

TELEPHONE SYSTEM

Filed Oct. 7, 1953 22 Sheets-Sheet 6

INVENTOR.
CLARENCE E. LOMAX
BY [signature]

ATTY.

Oct. 25, 1955 C. E. LOMAX 2,721,898

TELEPHONE SYSTEM

Filed Oct. 7, 1953 22 Sheets-Sheet 7

INVENTOR.
CLARENCE E. LOMAX
BY Mc Walter Owen
ATTY.

Oct. 25, 1955 C. E. LOMAX 2,721,898

TELEPHONE SYSTEM

Filed Oct. 7, 1953 22 Sheets-Sheet 8

DLR OPERATOR'S POS.

*INVENTOR.*
CLARENCE E. LOMAX

*BY* [signature]

ATTY.

FIG. 10 REPEATER 1000
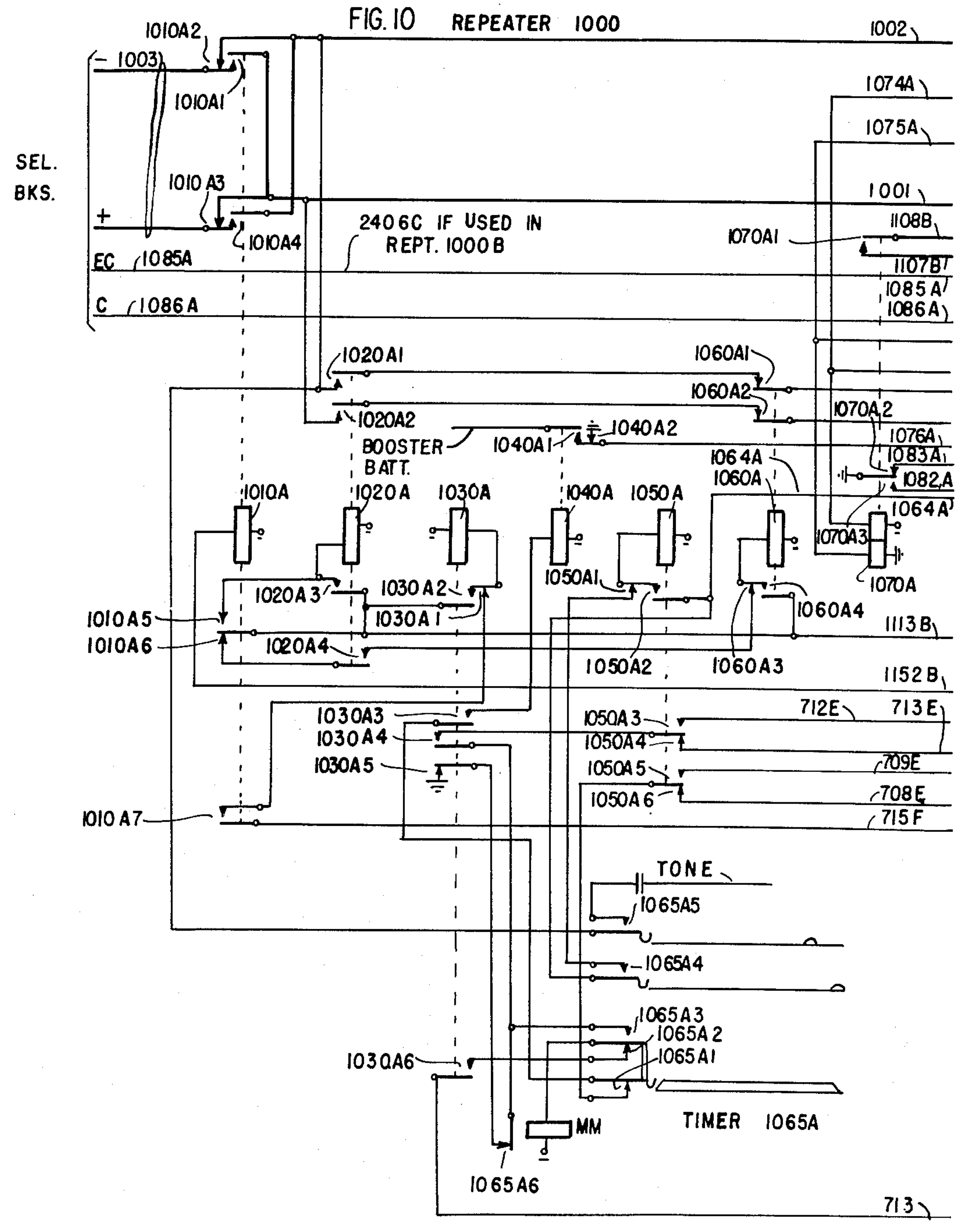
INVENTOR.
CLARENCE E. LOMAX
BY [signature]
ATTY.

Oct. 25, 1955 C. E. LOMAX 2,721,898

TELEPHONE SYSTEM

Filed Oct. 7, 1953 22 Sheets-Sheet 10

INVENTOR.
CLARENCE E. LOMAX

BY Wm. Walter Owen

ATTY.

Oct. 25, 1955 C. E. LOMAX 2,721,898

TELEPHONE SYSTEM

Filed Oct. 7, 1953 22 Sheets-Sheet 11

INVENTOR.
CLARENCE E. LOMAX

BY [signature]

ATTY.

TELEPHONE SYSTEM
Filed Oct. 7, 1953 22 Sheets-Sheet 12
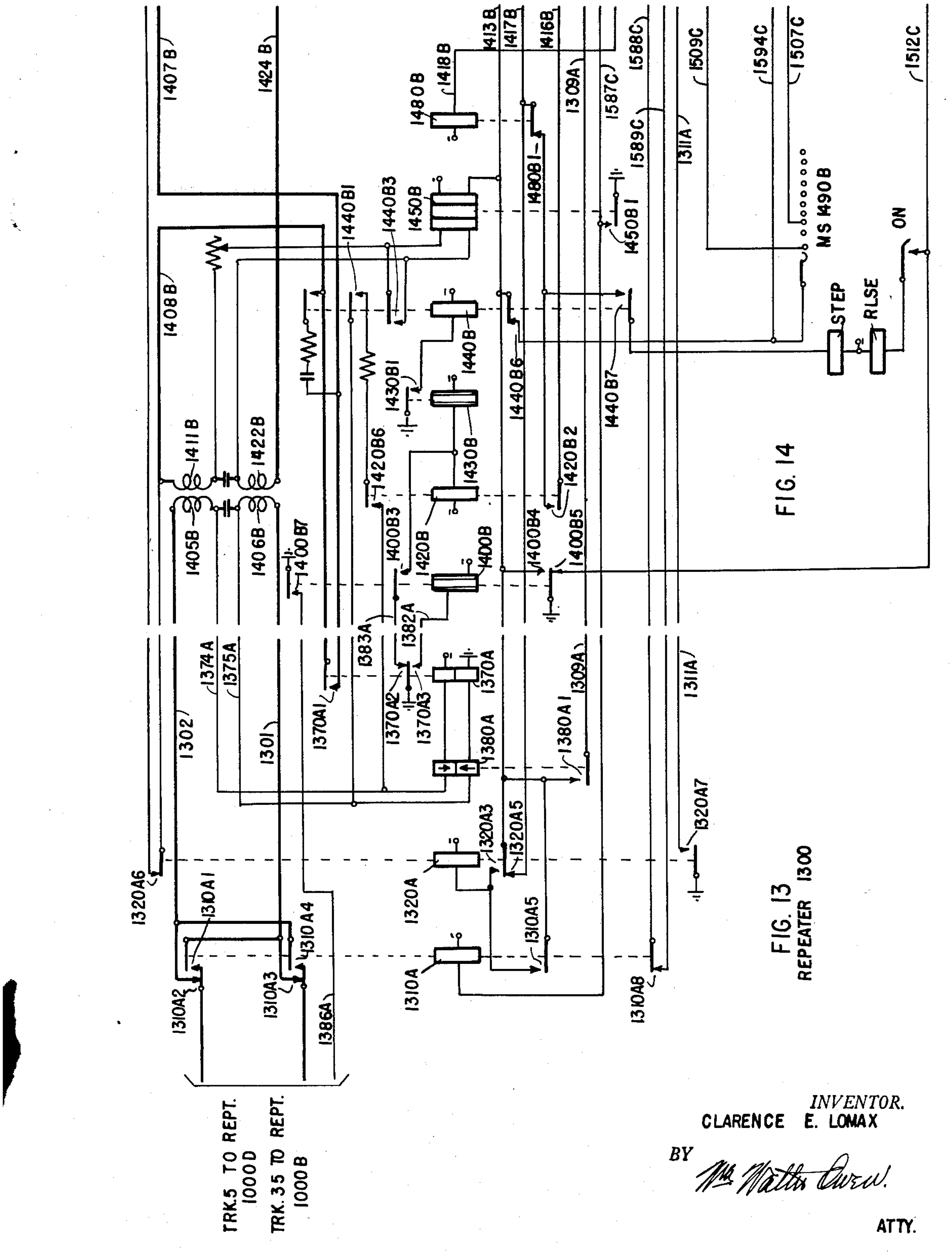
FIG. 13 REPEATER 1300, FIG. 14
INVENTOR.
CLARENCE E. LOMAX
BY Wm. Walter Owen
ATTY.

Oct. 25, 1955 C. E. LOMAX 2,721,898

TELEPHONE SYSTEM

Filed Oct. 7, 1953 22 Sheets-Sheet 13

*INVENTOR.*
CLARENCE E. LOMAX

*BY* Wm. Walter Owen

ATTY.

Oct. 25, 1955 C. E. LOMAX 2,721,898

TELEPHONE SYSTEM

Filed Oct. 7, 1953 22 Sheets-Sheet 14

INVENTOR.
CLARENCE E. LOMAX
BY Wm. Walter Owen
ATTY.

INVENTOR.
CLARENCE E. LOMAX
BY Mc Walter Owen
ATTY.

TELEPHONE SYSTEM

Filed Oct. 7, 1953 22 Sheets-Sheet 16

INVENTOR.
CLARENCE E. LOMAX
BY
Mc Walter Owen
ATTY.

INVENTOR.
CLARENCE E. LOMAX
BY *[signature]*
ATTY.

Oct. 25, 1955 C. E. LOMAX 2,721,898

TELEPHONE SYSTEM

Filed Oct. 7, 1953 22 Sheets-Sheet 18

INVENTOR.
CLARENCE E. LOMAX

BY Wm. Walter Owen

ATTY.

Oct. 25, 1955 C. E. LOMAX 2,721,898

TELEPHONE SYSTEM

Filed Oct. 7, 1953 22 Sheets-Sheet 19

*INVENTOR.*
CLARENCE E. LOMAX

*BY* Wm Walter Owen

ATTY.

INVENTOR.
CLARENCE E. LOMAX
BY Wm. Walter Owen
ATTY.

Oct. 25, 1955

C. E. LOMAX 2,721,898

TELEPHONE SYSTEM

Filed Oct. 7, 1953

22 Sheets-Sheet 21

INVENTOR.
CLARENCE E. LOMAX

BY McWatter Owen.

ATTY.

Oct. 25, 1955 C. E. LOMAX 2,721,898

TELEPHONE SYSTEM

Filed Oct. 7, 1953 22 Sheets-Sheet 22

INVENTOR.
CLARENCE E. LOMAX

BY Wm. Walter Owen.

ATTY.

United States Patent Office 2,721,898

Patented Oct. 25, 1955

2,721,898

TELEPHONE SYSTEM

Clarence E. Lomax, Chicago, Ill., assignor to Automatic Electric Laboratories, Inc., Chicago, Ill., a corporation of Delaware Application October 7, 1953, Serial No. 384,557

23 Claims. (Cl. 179—7.1)

The present invention relates in general to telephone systems but more particularly to an automatic telephone system involving a plurality of near by exchanges in which all the subscribers directly dial and control the automatic switches to extend a connection to a called line in any one of the exchanges and wherein the subscribers have different classes of service, some having free local service and interception on all near by exchange calls by a recording operator before completion of the call and others having metered service for local and some of the near by exchange calls without interception by the recording operator while other near by exchange calls by the latter subscribers are intercepted before completion by the recording operator and wherein a special class of subscribers are metered on all calls and complete all calls without interception by the recording operator. Interception will be referred to as delayed line recording hereinafter generally abbreviated as DLR. On a DLR or intercepted call the last digit of the called subscriber's number is stored and the operator signalled so that she may secure and record necessary information from the calling party after which she may release the stored digit to allow the call to be completed.

Among the objects of this invention is to provide metered service, delayed line recording service and a combination of both types of service in accordance with the different classes of subscriber lines.

Another object of this invention is to provide these types of services on interexchange calls with the use of common equipment.

Another object of this invention is to provide in an automatic telephone system several classes of subscribers at several exchanges with different classes of service.

Another object of this invention is to provide a class of subscribers with a predetermined type of service dependent on the destination of their calls.

A feature of this invention is the means for determining the class of subscriber making a call.

Another feature of this invention is the means for charging different predetermined classes of subscribers, in accordance with the location of the called party.

Another feature is the means for automatically charging certain classes of subscribers in accordance with the destination and duration of the call.

Still another feature of this invention is the arrangement for providing an operator at only one exchange to service certain classes of subscribers at a number of other near by exchanges.

Still another feature of this invention is the trunking and circuit arrangement for allowing all classes of subscribers to use certain means in common.

Still another feature is the selecting means for signalling the operator when a subscriber having a certain class of service is making a toll call.

Still another feature is the circuit arrangement allowing a call by a subscriber having paystation or delayed line recording class of service to be completely supervised.

Still another feature is the arrangement whereby the delayed line recording or DLR operator may be reached through means common to subscribers at various exchanges.

Still another feature is the arrangement for signalling the DLR operator on completion of a call by a subscriber who has been intercepted by said operator.

The demand of the public for automatic service and the consequent installation of completely automatic telephone systems posed problems as to service and rates to be given to various classes of subscribers. The problems become increasingly more involved in semi-rural areas where all subscribers neither need nor want the same class of service. Therefore this system provides in addition to different classes of metered service, a class of service which is non-metered. This class of non-metered service is provided at all the exchanges and each of the subscribers has a four digit call number. This class of non-metered service, as is common, is generally applied to party lines. For calls from one exchange to another exchange in the system, a prefix number is dialled for controlling a connection to the desired exchange. The last digit of the called subscriber's number is stored, if a non-meterer class subscriber is calling, and a delayed line recording operator is signalled. After the operator has ticketed the call she can then release the storing means so that the stored digit is sent to enable the called party to be signalled. A supervisory signal is operated when the connection is completed so that a charge can be made by the operator. She may then continue to supervise the call and make charges accordingly. This class of non-metered subscribers can make free local calls of any duration. The non-metered class is classified for the purposes of this illustration as a low rate class.

A second class of service is provided for individual subscriber lines having all calls, both local and near by exchange calls, automatically metered on completion without interception by an operator. On the call being completed metering starts immediately and the calling subscriber is charged in accordance with the exchange called and the duration of the call. A meter is provided individual to the subscriber's line and is operated from a repeater on inter-exchange calls. This class of subscriber is also metered on local calls with the exception that the rate on local calls is different than on an inter-exchange call and the meter will be operated from a local metering circuit. This class of service is classified for the purposes of this illustration as a high rate class.

In this illustration both types of service are provided at each exchange, however the system might easily be arranged to have one exchange having both types of service while other exchanges have either one or the other type.

A third or combination class of service which pays an intermediate rate is shown at one exchange in this illustration. This class of service is further differentiated into three groups so that calls from each group to individually corresponding exchanges are intercepted by the delayed line recording operator before completion, while calls to other exchanges are not intercepted by the operator and are automatically metered when the called party answers. The subscribers in this class of service are also metered on local calls.

Figs. 1–5 taken together show the trunking arrangement used in this system.

Figs. 6 and 6*a* show the local metering circuit in its relationship to a subscriber's line and a finder-selector link.

Figs. 10–12 is the repeater 1000 used in exchanges D, B, C.

Figs. 13–15 is the repeater 1300 used in exchange A.

Figs. 19–21*a* is the repeater 1900 used in exchange A.

Figures 22, 23:
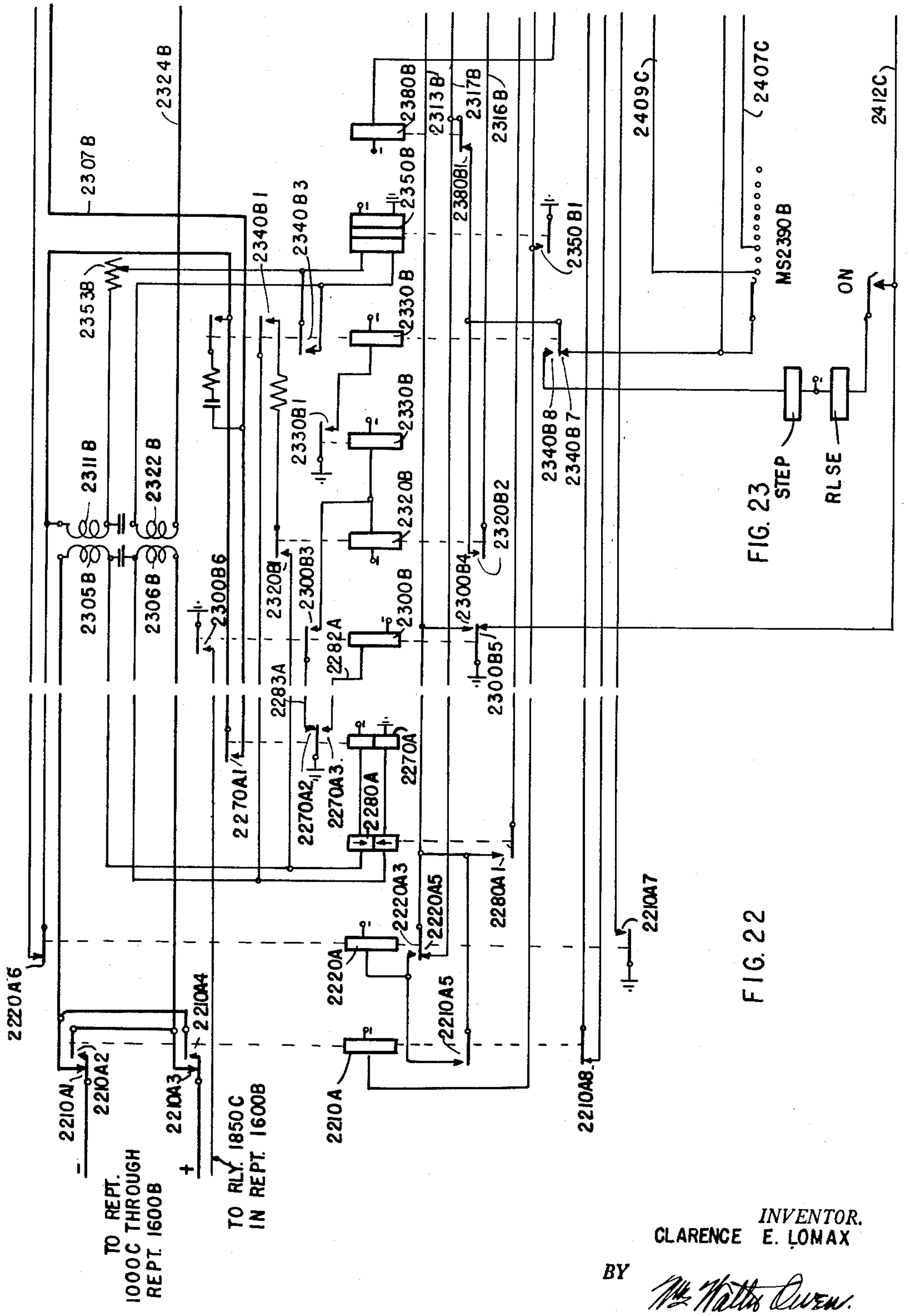
Figure 24:
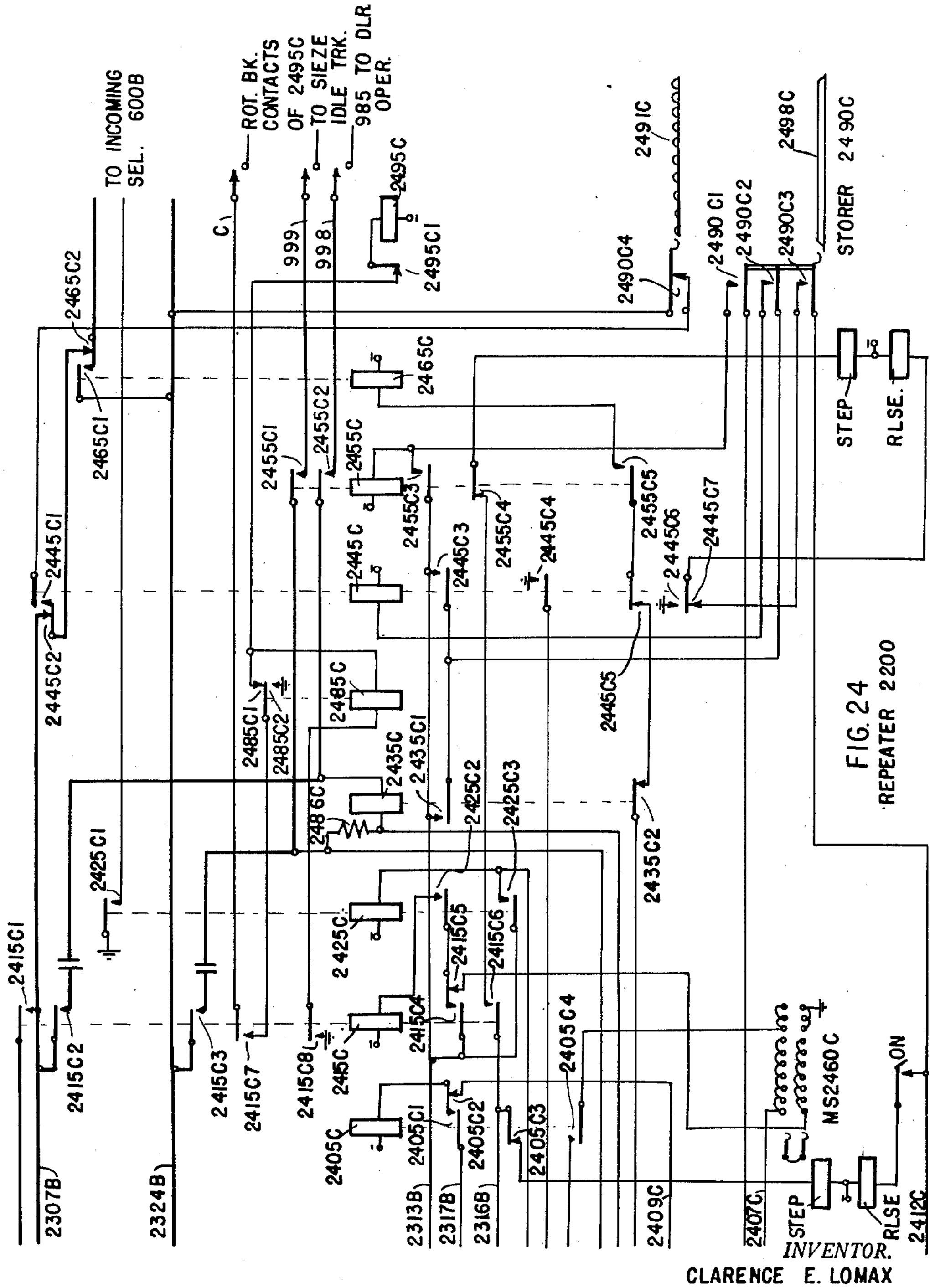

Figs. 22–24 is the repeater 2200 used in exchange B.

Figs. 25, 25*a*, 25*b*, 25*c*, 25*d*, 25*e* and 25*f* are block diagrams showing how Figs. 1–5, Figs. 10–12, Figs. 13–15, Figs. 16–18, Figs. 8, 19–21*a*, Figs. 22–24, and Figs. 6, 6*a* and 7, respectively should be arranged.

Figure 4:
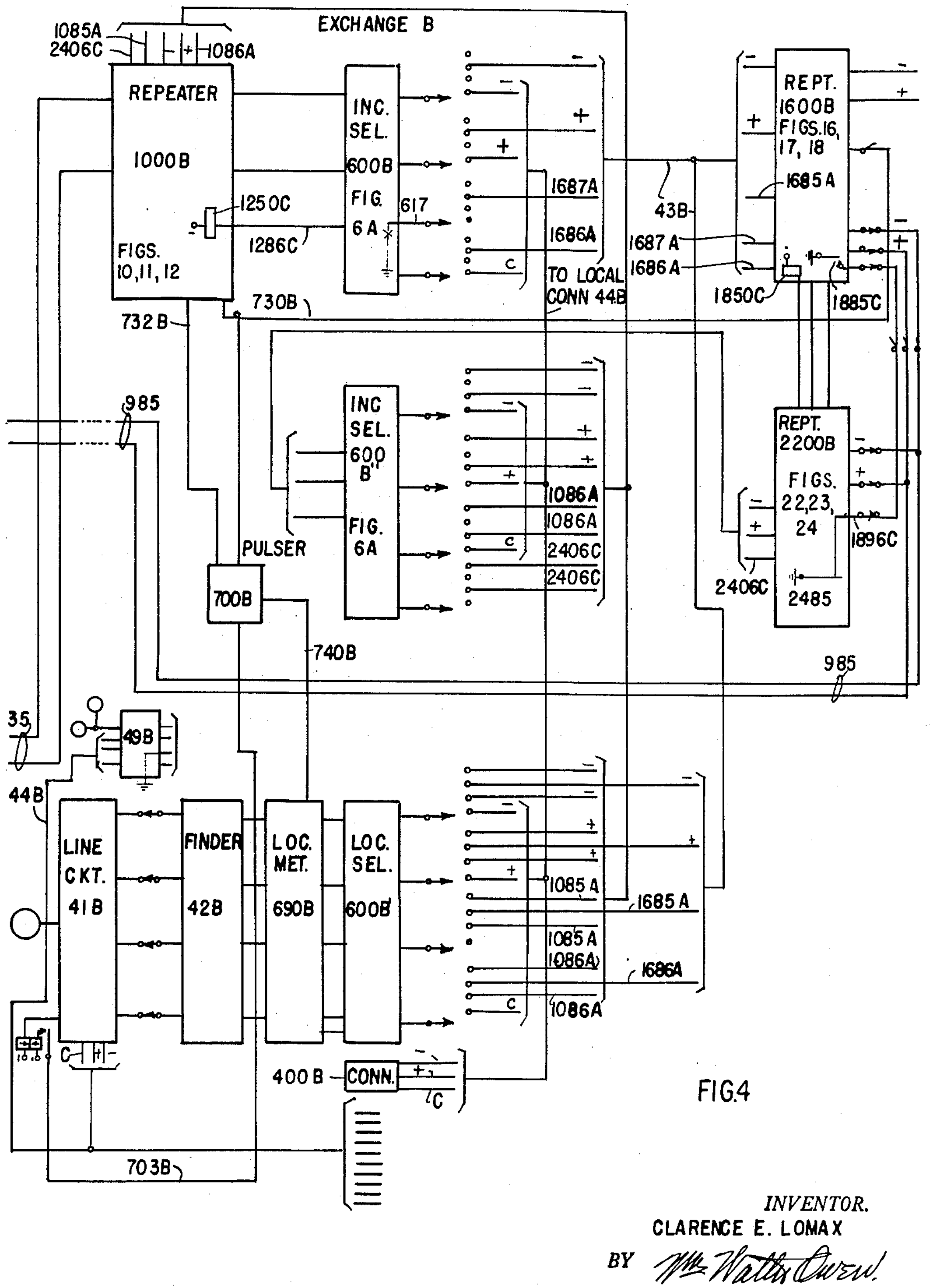
Figure 5:
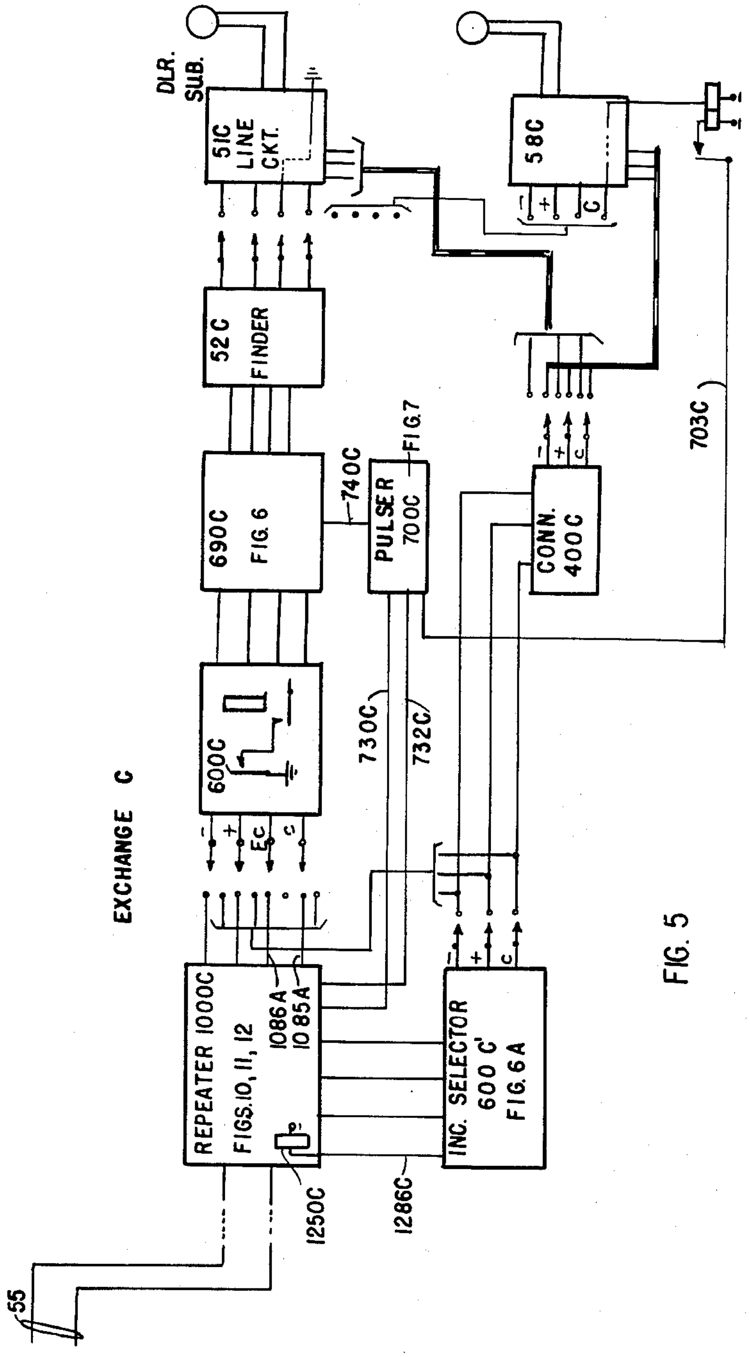
Figure 6:
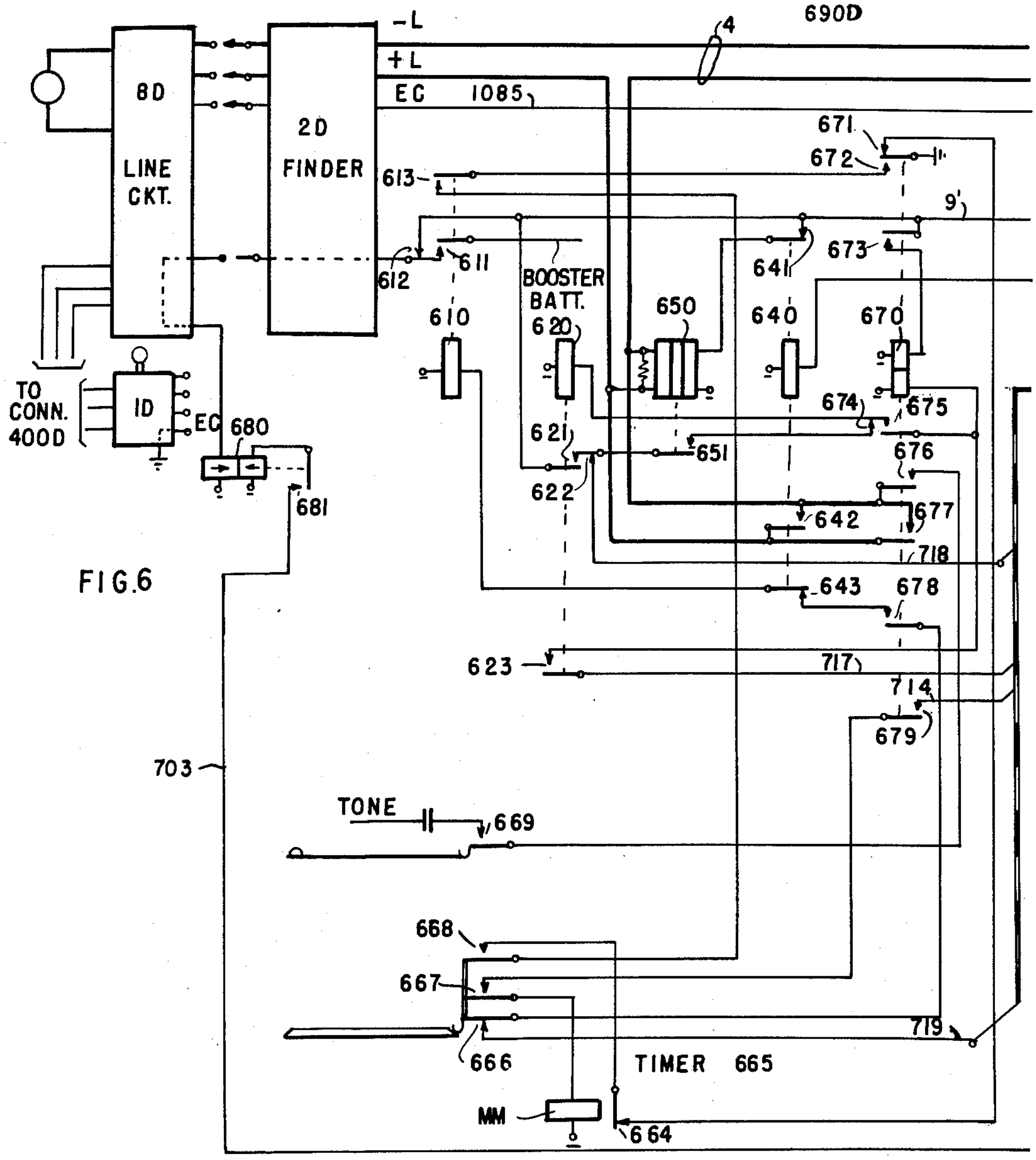
Figures 6A, 7:
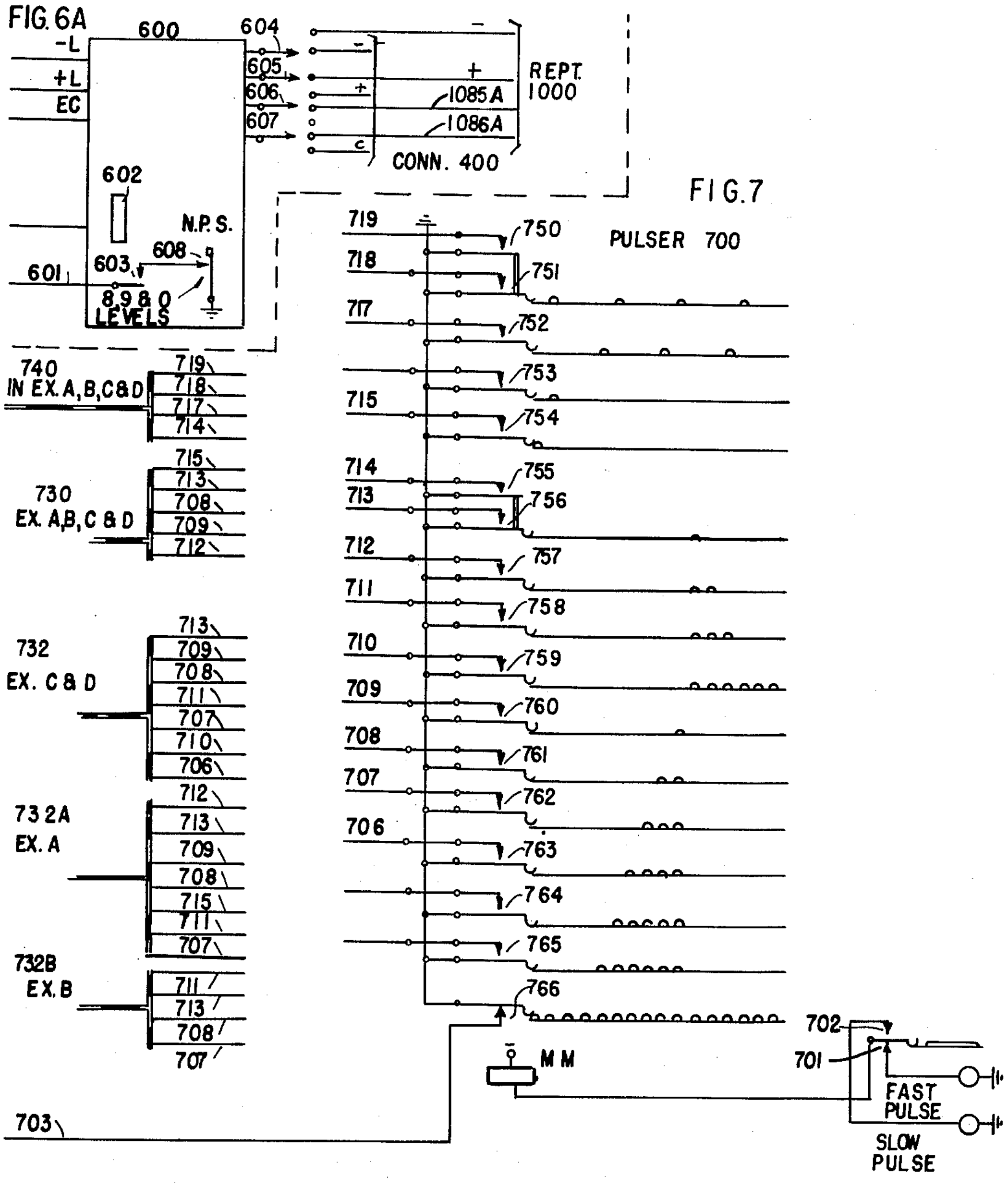
Fig. 7 shows the pulser, one of which is used in each exchange to control metering.

Referring to the drawings it will be noted that although the local metering circuit 690 is shown in detail only in Fig. 6 it is used in each of the exchanges A, B, C and D as shown in Figs. 1, 3, 4 and 5. A pulser such as shown in Fig. 7 is also used in each exchange. Figs. 6 and 6*a* also show the selector arangement for rendering the local metering circuit ineffective on shorthaul toll, or near by exchange calls as will be explained in detail. Fig. 6*a* shows a selector of the type disclosed in Fig. 4 of Patent No. 2,513,426, issued to Lomax, July 4, 1950, with the exception that normal post springs NPS are provided for sending ground back to the local metering circuit, Fig. 6, when the selector is stepped to the eighth, ninth or zero levels.

Figure 1:
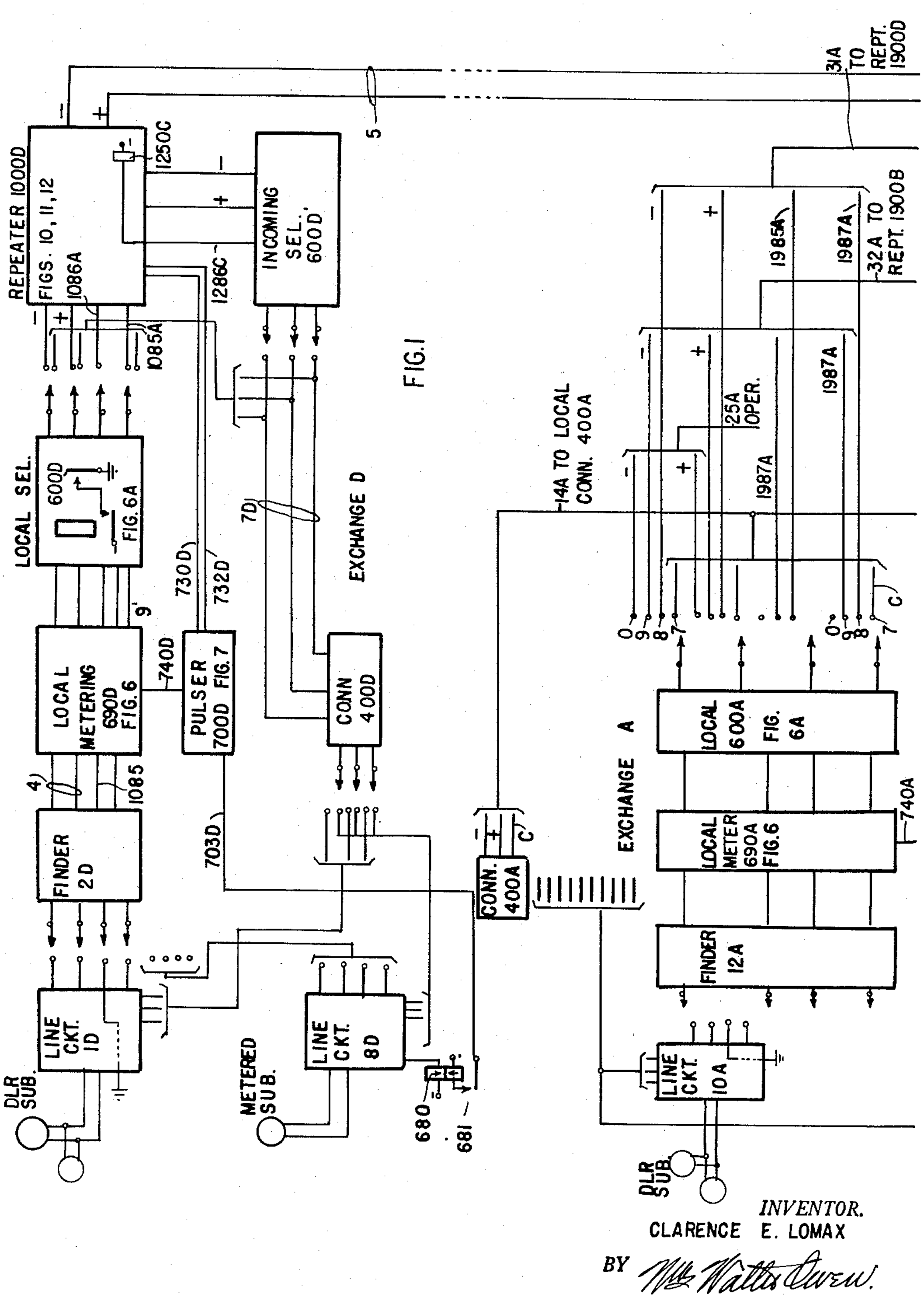
Figure 11:
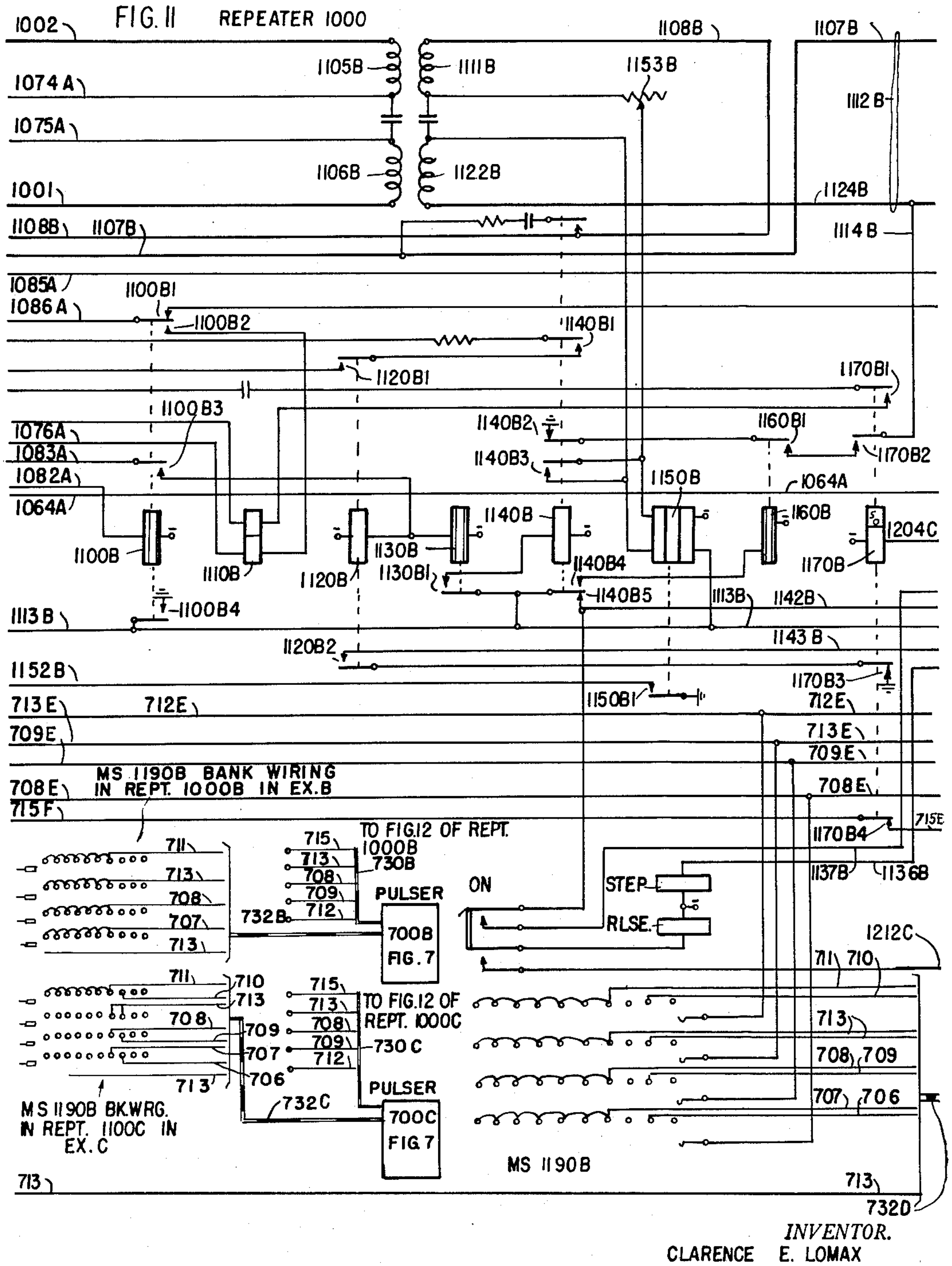
Figure 12:
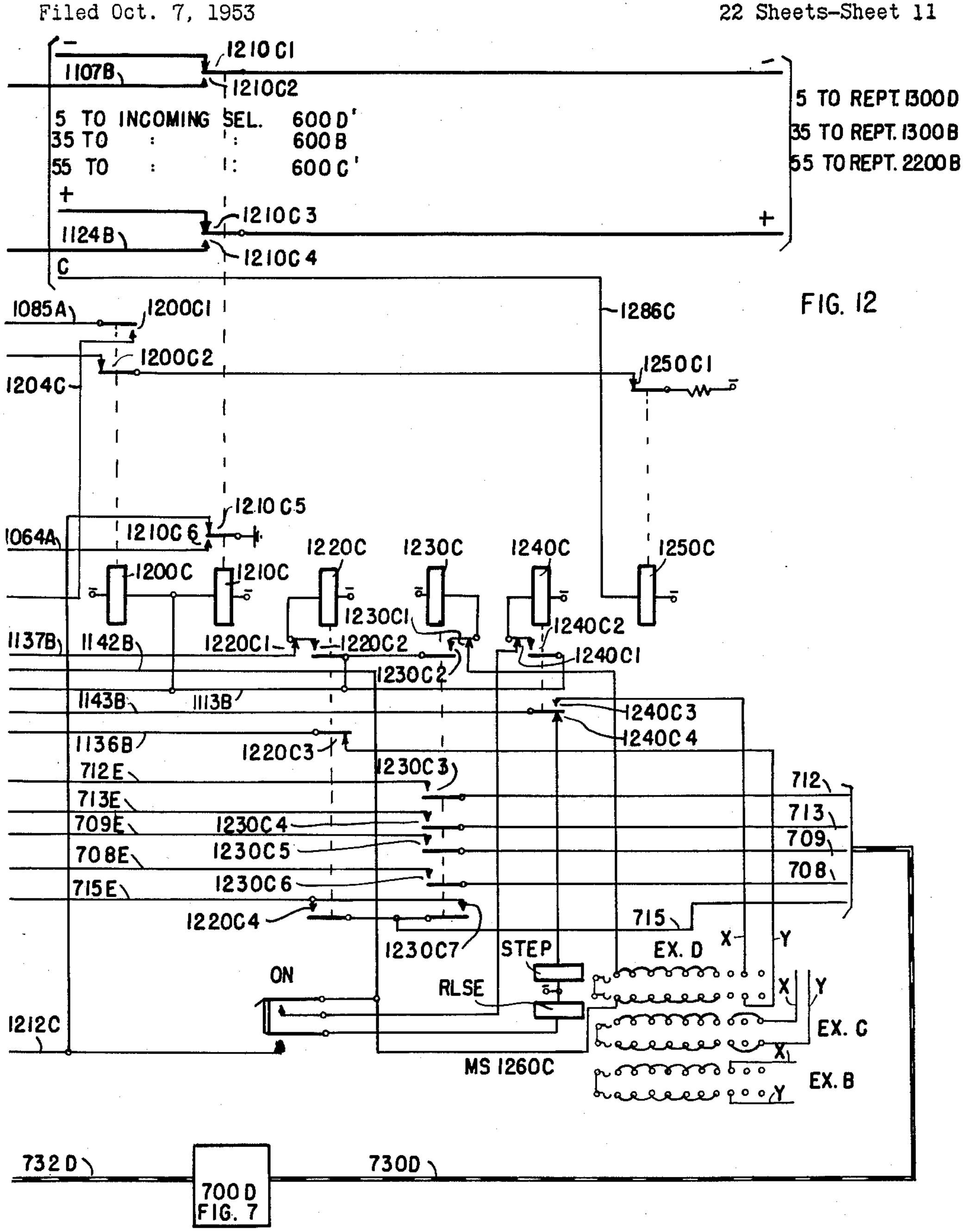

Figs. 10–12 represent the outgoing repeater 1000 used in exchanges D, B and C with notations marked on the drawings depending on whether the repeater is 1000D in exchange D, repeater 1000B in exchange B or repeater 1000C in exchange C as shown in block form in Figs. 1, 4 and 5. Repeater 1000D has trunk 5 from exchange A normally extending through it to incoming selector 600D'. Repeater 1000B has trunk 35 from exchange A normally extending through it to incoming selector 600B and repeater 1000C has trunk 55 from exchange B normally extending through it to the incoming selector 600C'. Repeaters 1000B, C and D are each equiped with well-known minor switches of the rotary type including MS1260C (Fig. 12) and MS1190B (Fig. 11) both of which have a rotary stepping magnet for stepping the switch wipers on energization, off-normal springs and a release magnet for returning the switches to normal. Each repeater is also equipped with a timer 1065A (Fig. 10) having three rotatable cam lobes. The timer does not have a release magnet nor off-normal springs but is stepped by a well-known type of motor magnet. Fig. 11 shows the different arrangements for wiring leads from pulser 700 to MS1190B in repeater 1000D, B, C. Fig. 12 shows the various wiring arrangements for MS1260C in repeaters 1000D, B and C.

Figure 3:
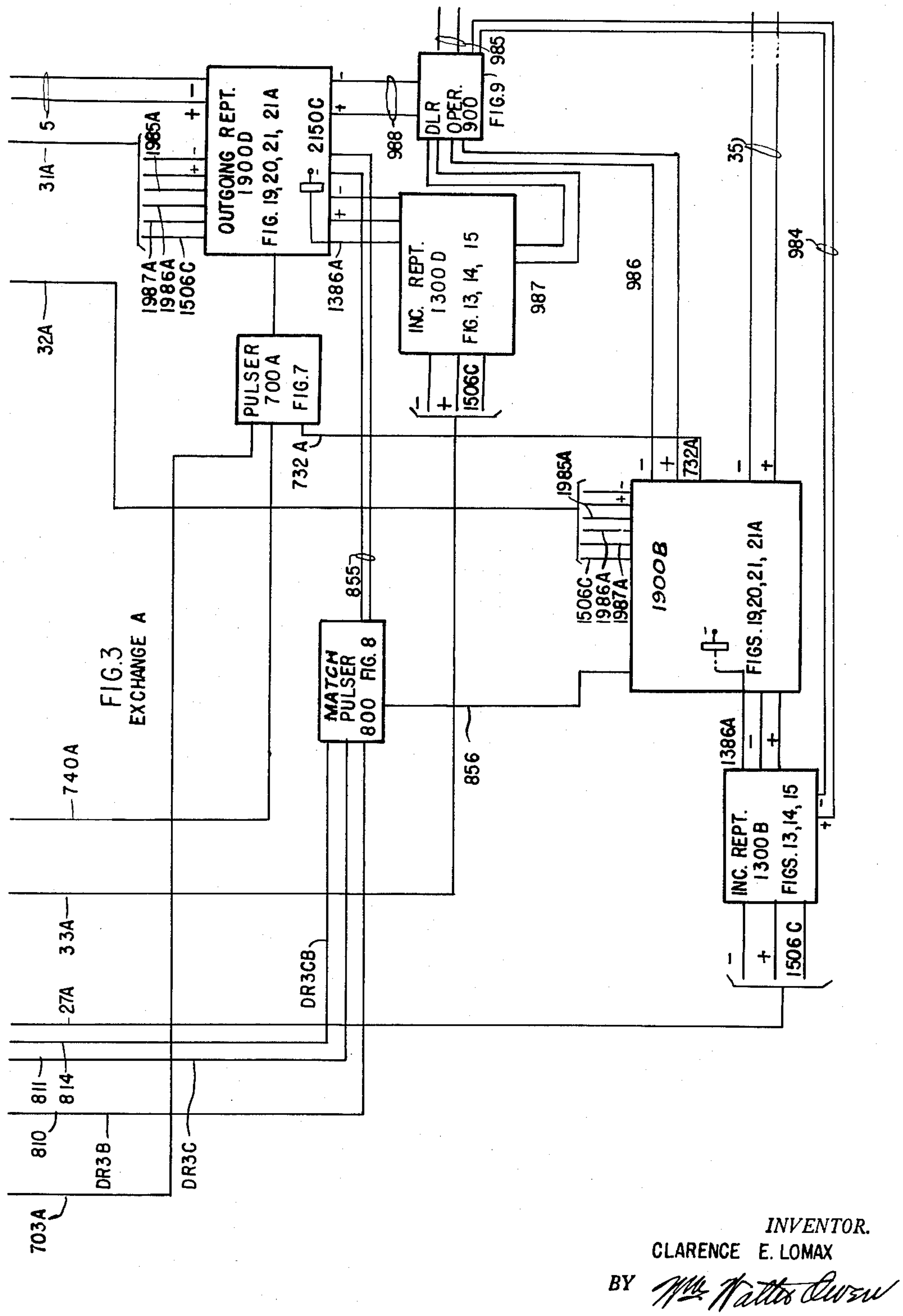
Figure 15:
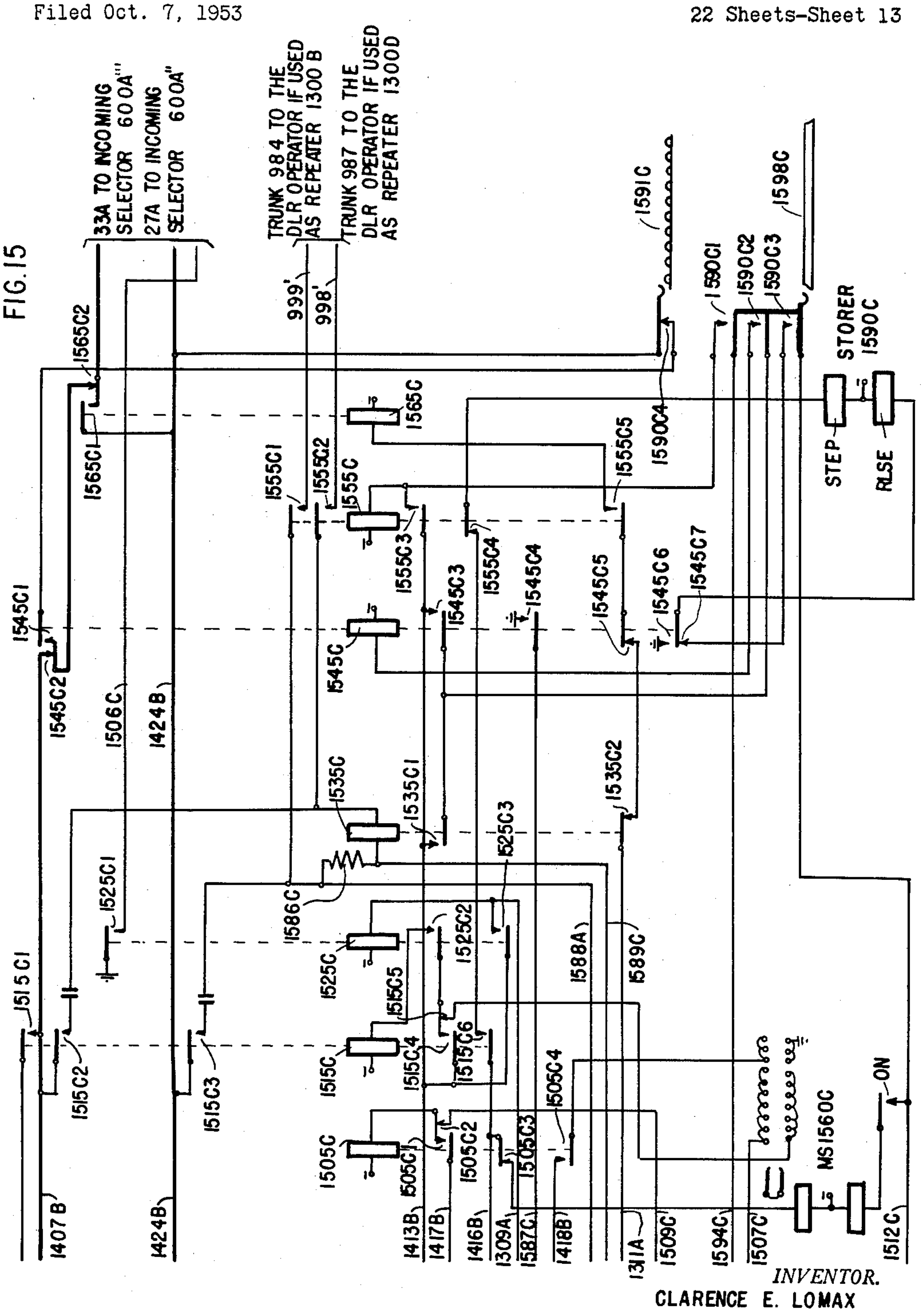

Figs. 13–15, represent the incoming repeater 1300 used in exchange A as shown in Fig. 3 either as 1300B or 1300D. Trunk 5 terminates in repeater 1300D and trunk 35 in repeater 1300B. Repeaters 1300D and B are each equipped with minor switches of the well-known rotary type MS1490B (Fig. 14) and MS1560C (Fig. 15). Each switch is stepped on energization of its stepping magnet and each switch is equipped with a release magnet for returning the switches to normal. The storer 1590C comprises a rotary shaft mounting cams 1591C and 1598C, a stepping magnet for rotating the shaft and cams, and a release magnet for enabling a spring to return the shaft and cams to normal. Storer 1590C is provided with a governor for controlling speed of rotation of the cam shaft to normal. One of the cams 1591C interrupts cam springs 1590C4 to send governor controlled pulses over the trunk to operate succeeding switches.

Figure 16:
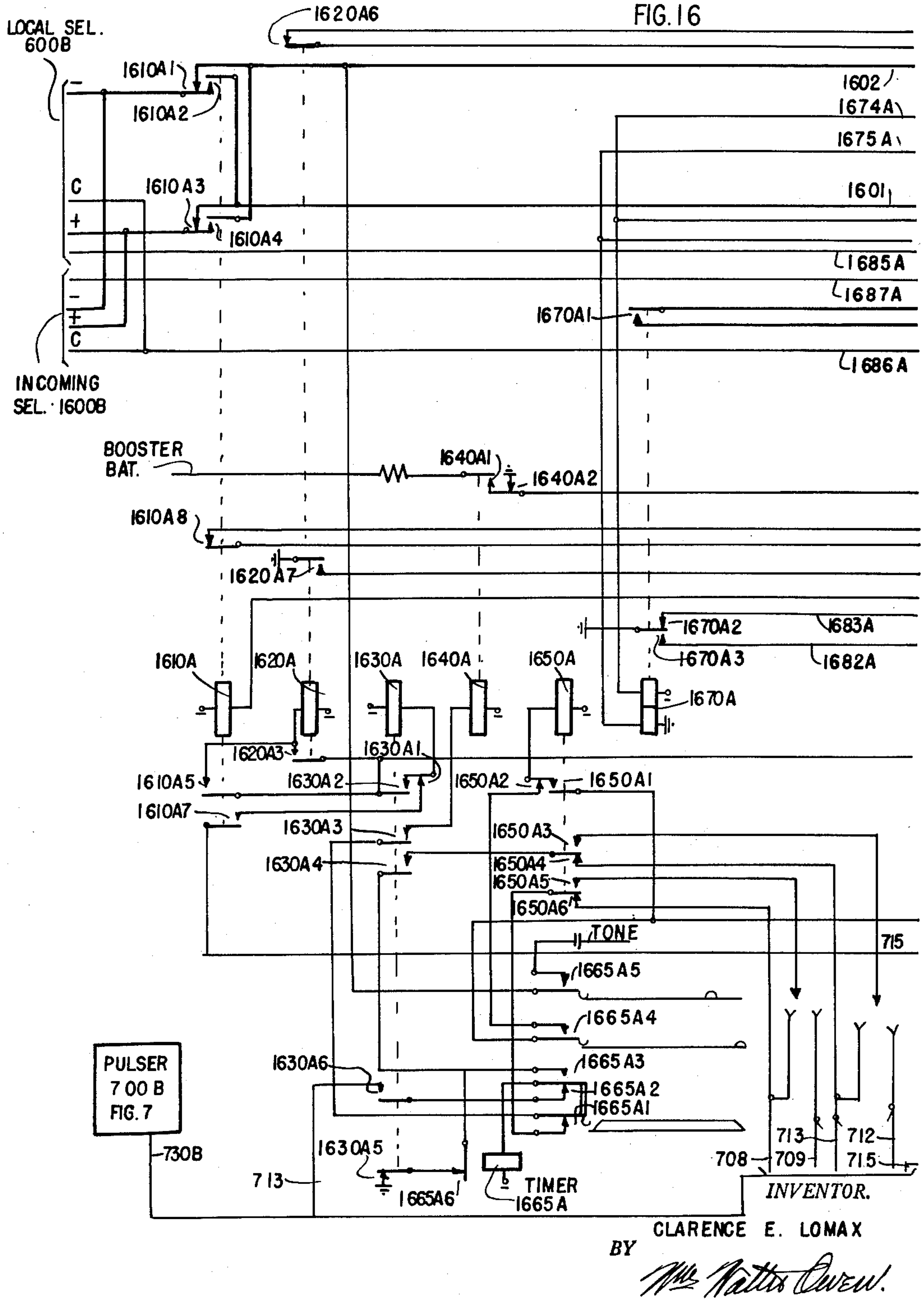
Figs. 16–18 is the repeater 1600 used in exchange B.
Figure 17:
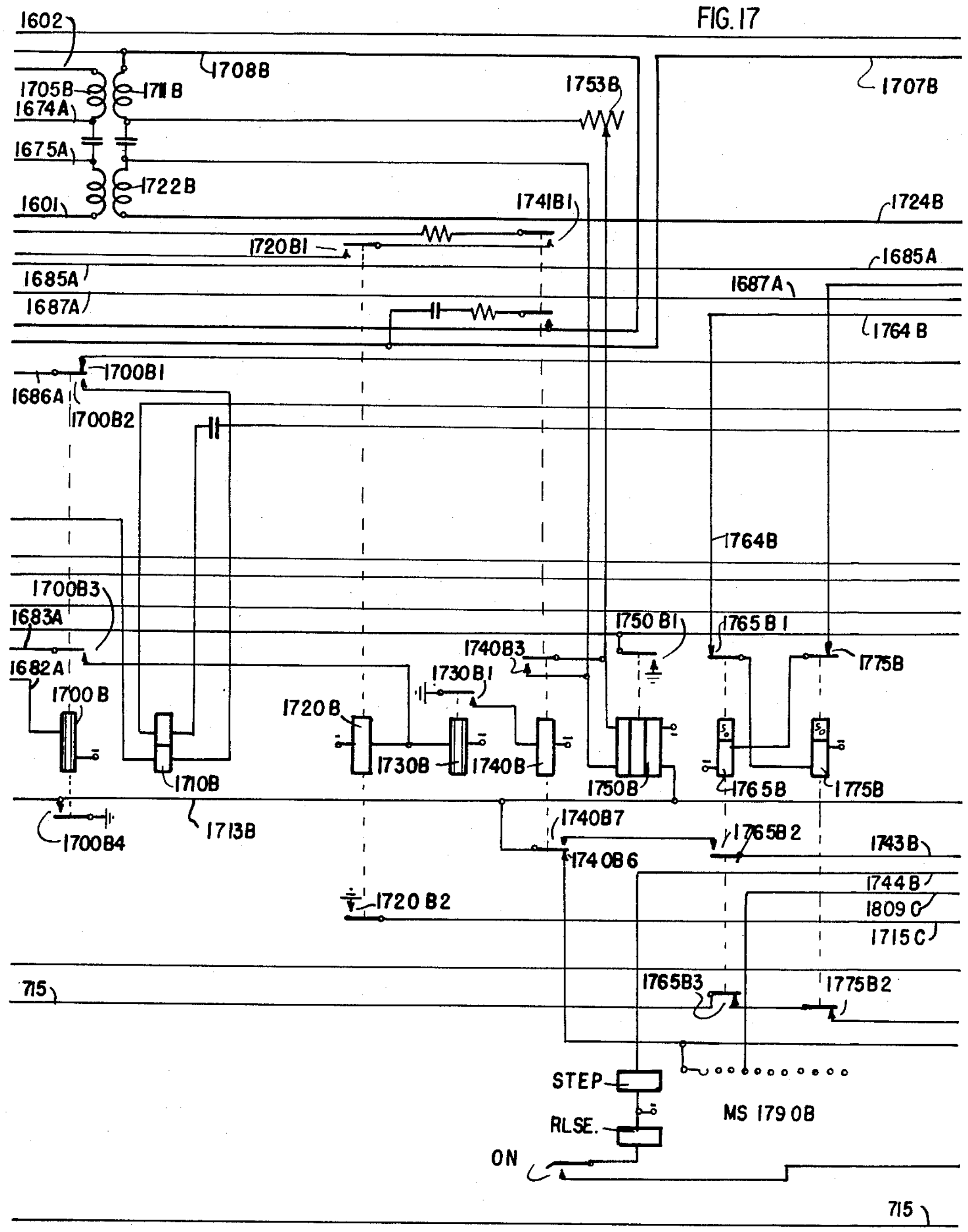
Figure 18:
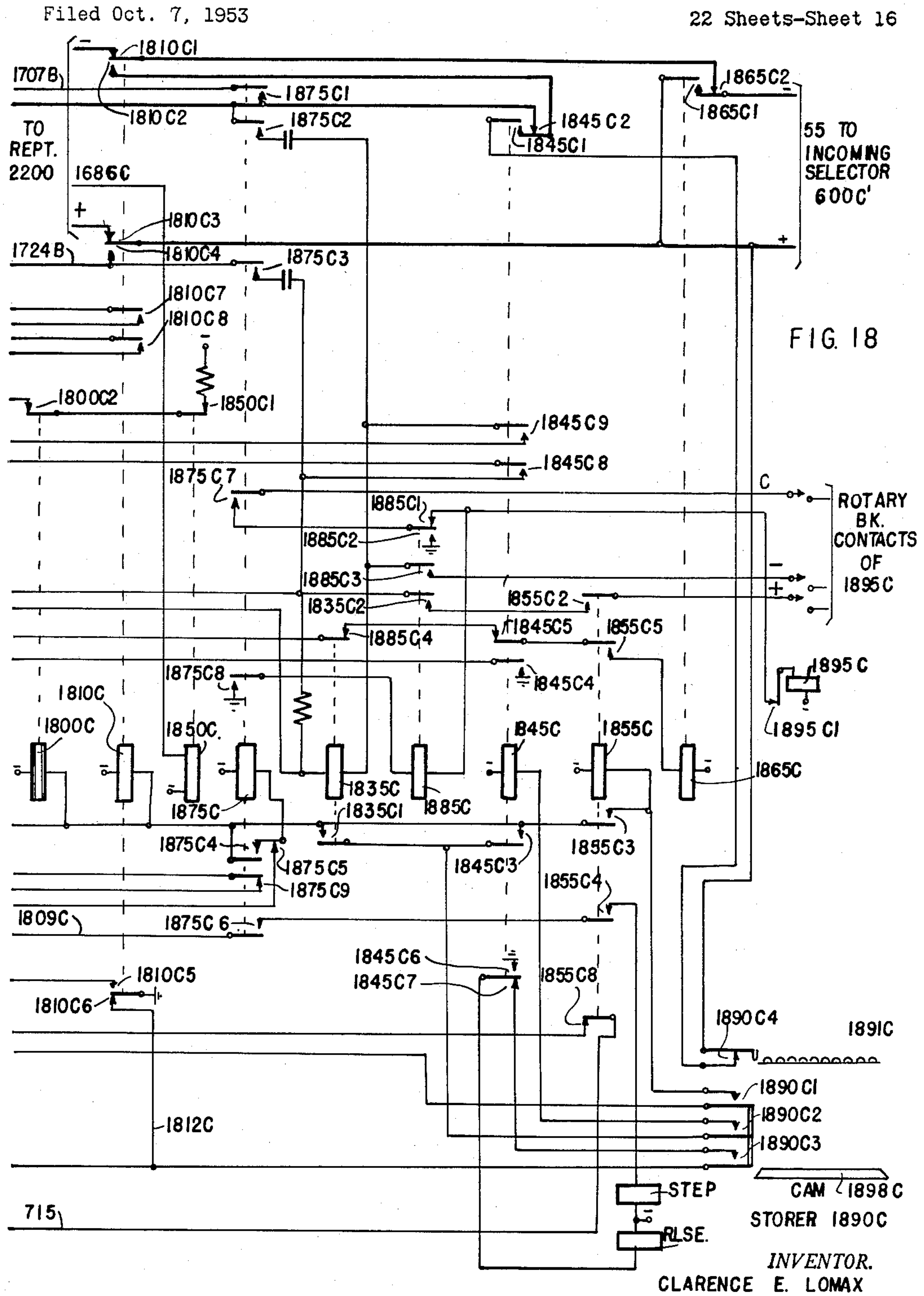
Figure 19:
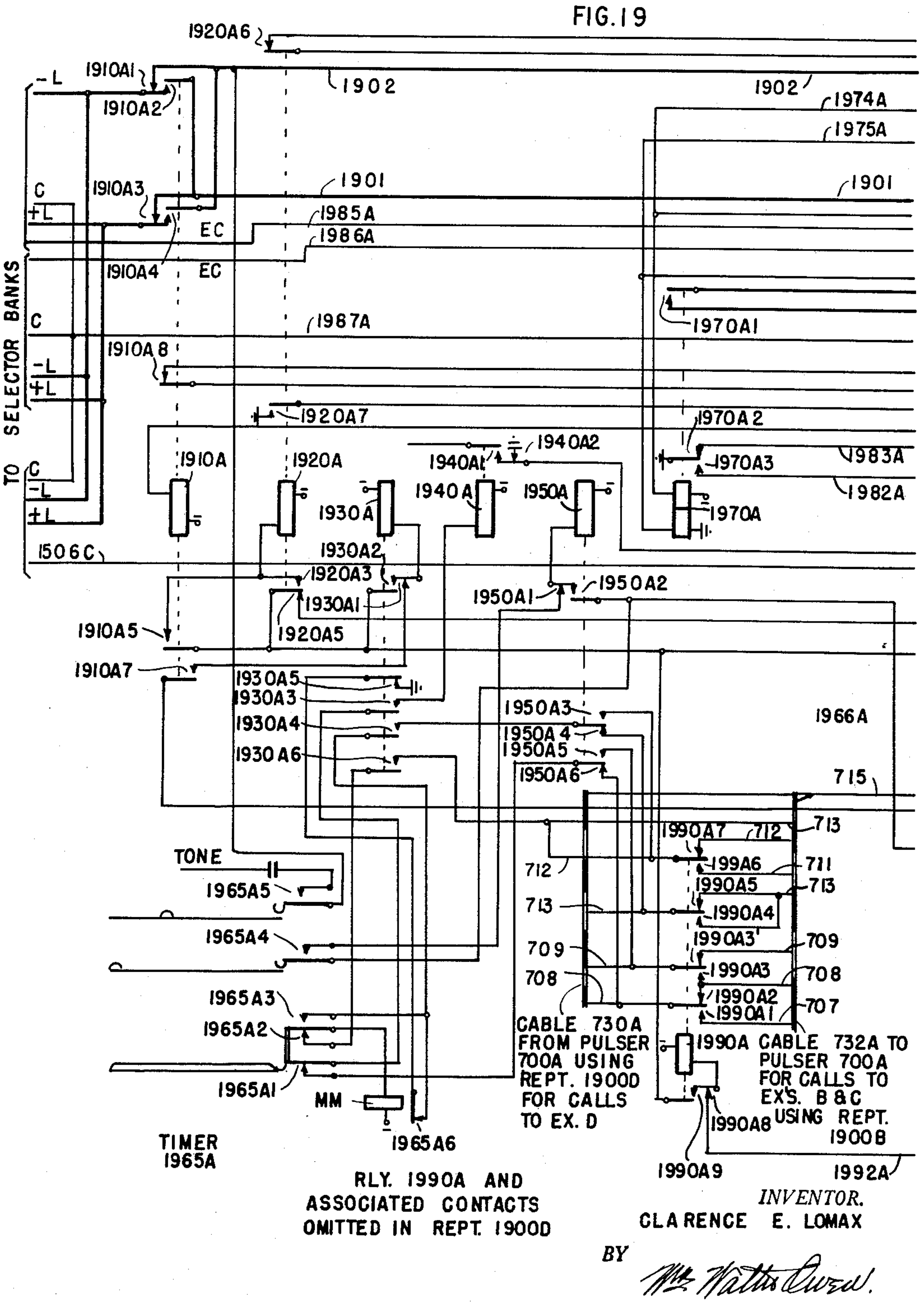
Figure 20:
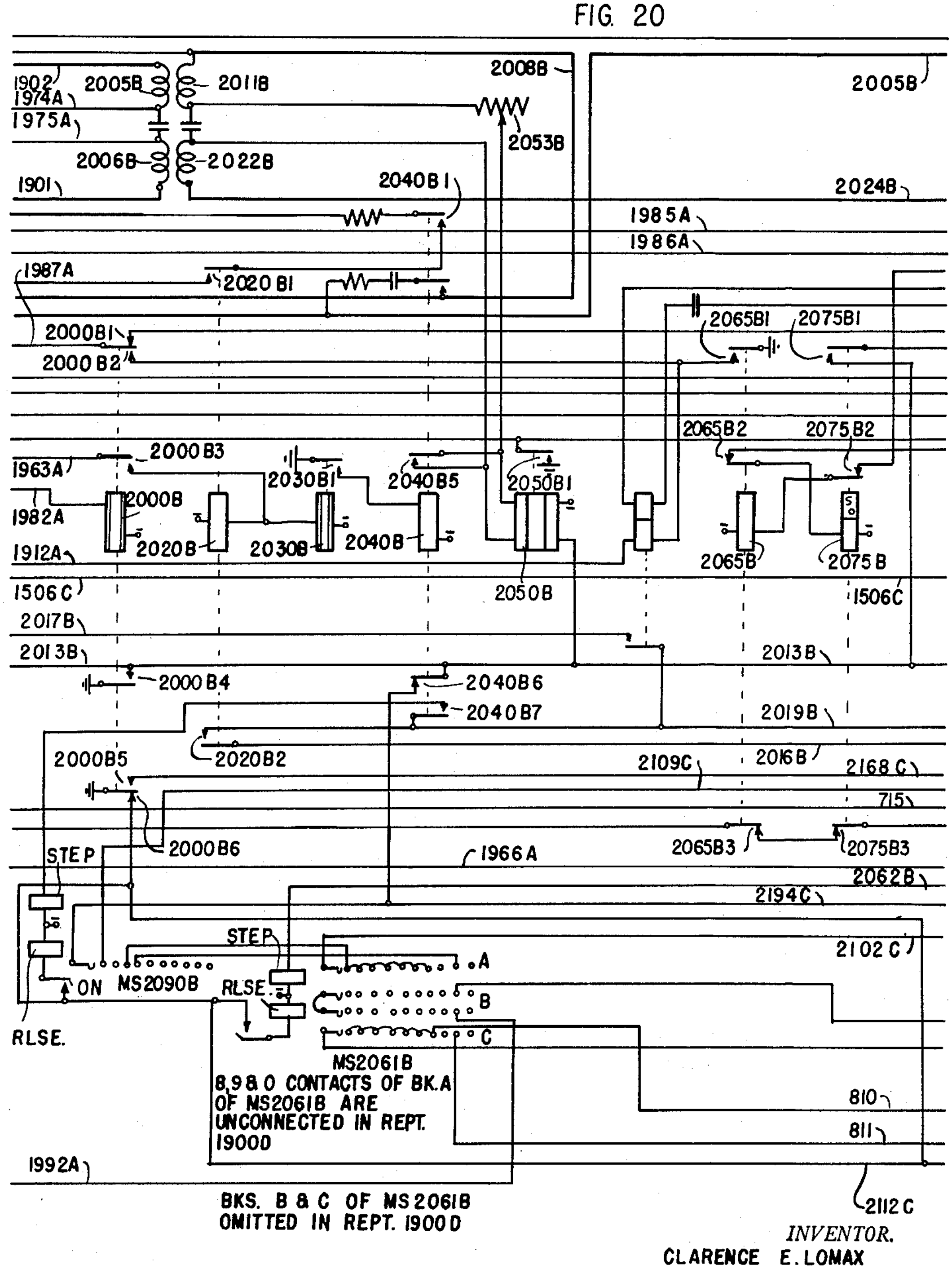
Figure 21:
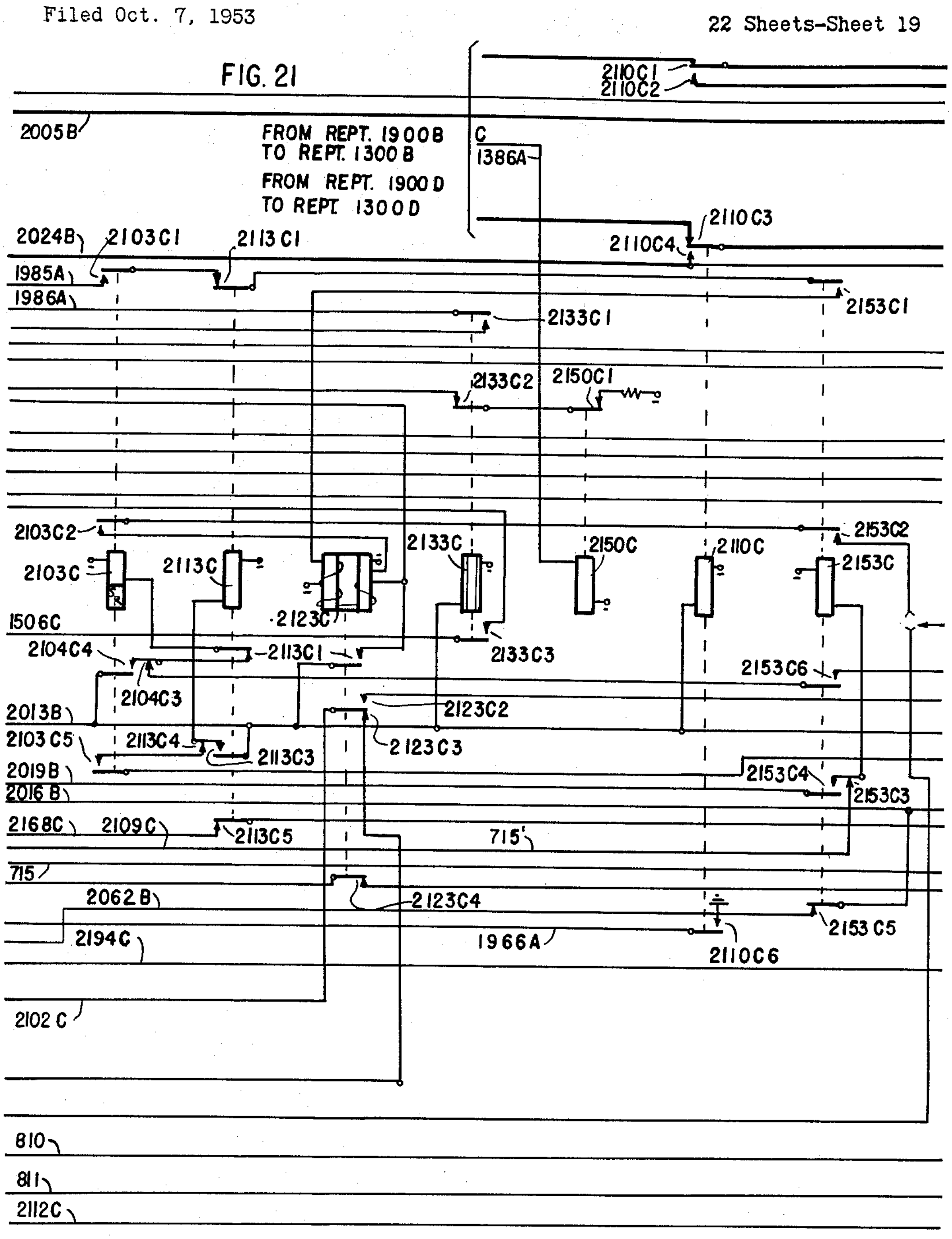
Figure 21A:
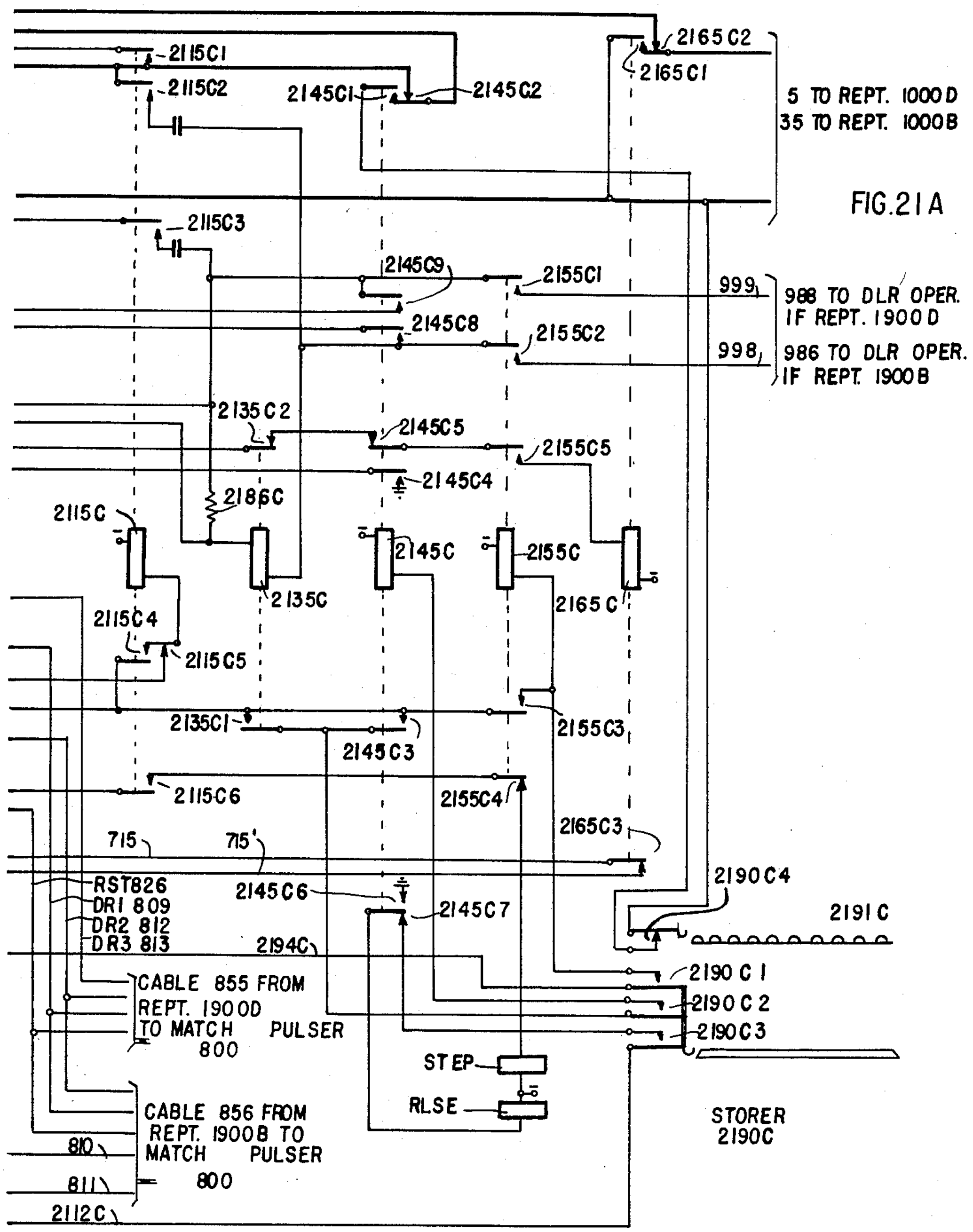

Figs. 16–18 show an outgoing repeater 1600 used in exchange B and mark on Fig. 4 as 1600B. Repeater 1600B is an outgoing repeater at exchange B with trunk 55 to exchange C normally extending through it. It is equipped with a minor switch 1790B (Fig. 17) similar to previously described minor switch MS1190B, a storer 1890C (Fig. 18) similar to previously described storer 1590C and a timer 1665A (Fig. 16) similar to previously described timer 1065A. Repeater 1600B also has a rotary stepping switch 1895C (Fig. 18) for searching for an idle trunk 985 to the DLR operator.

Figs. 19–21*a* show an outgoing repeater 1900 used in exchange A as repeater 1900B or 1900 D with notations thereon depending on whether it is being used as an outgoing repeater 1900B on calls to exchange B or as outgoing repeater 1900D on calls to exchange D. It is shown in the trunking arrangement in Fig. 3. Repeater 1900B has trunk 35 to exchange B normally extending through it while repeater 1900D has trunk 5 to exchange D normally extending through it. Each repeater is equipped with a minor switch MS2090B and MS2061B (Fig. 20) similar to previously described minor switch MS1190B. MS2061B however in repeater 1900B has three banks while in repeater 1900D it has only the A bank which does not have any connections past the seventh contact. Both repeaters 1900B and D have a storer 2190C (Fig. 21*a*) similar to storer 1590C and a timer 1965A (Fig. 19) similar to timer 1065A. Relay 1990A (Fig. 19) and its associated contacts are also used only in repeater 1900B.

Figs. 22–24 show the incoming repeater 2200 which is shown as 2200B in Fig. 4. It is used only in exchange B. Repeater 2200B is used as an incoming repeater in exchange B and terminates trunk 55 from exchange C. It is equipped with minor switches MS2390B and MS2460C (Figs. 23 and 24) similar to previously described minor switches MS1490B and MS1560C; a storer 2490C (Fig. 24) similar to storer 1590C and a rotary switch 2495C (Fig. 24) similar to rotary switch 1895C.

As details of the line circuits, finders, selectors and connectors are well-known they are shown only in block form in Figs. 1–5 while Figs. 6, 6*a* and 7 are designed to show the cooperation between the line circuit, finder, local metering circuit and the selector.

In the interest of clarity and for the purpose of reduction of unnecessary repetition, of what would otherwise be an unwieldy specification, a code is used in this specification in which the five different types of repeaters are each shown on several sheets of drawings each denoted by a different figure number. The first part or figure of each repeater has its character reference numbers suffixed by the letter A; the second part or figure of each repeater has its character reference numbers suffixed by the letter B and the last part or figure or each repeater has its character reference numbers suffixed by the letter C. Due to the fact that many devices have the same or similar purposes or modes of operation in each repeater the last two number of a similarly operated device in each repeater are the same. Thus it is possible to identify a similarly operated device by the last two numbers and the suffix letter. Contacts are further identified by a number following the suffix letter. Thus a contact is prefixed by the number and letter of the relay which operates it plus its own individual number to thereby enable contact similarity to be identified by the intermediate two numbers, suffix letter and following number. Some similarly operated relays have less or more contacts than another similarly operated relay. These contacts will be identified accordingly by their last number. The first two numbers of each reference character serve to identify the figure number and thus the repeater in which the device is in. Therefore by simply referring a reference number back to a previously described device, together with any exceptions to be noted, its operation may be easily understood and the length of the specification greatly reduced. Figs. 10, 11 and 12 are used for repeater 1000; Figs. 13, 14 and 15 are used for repeater 1300; Figs. 16, 17, 18 are used for repeater 1600; Figs. 19, 20, 21 and 21*a* are used for repeater 1900 and Figs. 22, 23 and 24 are used for repeater 2200. Thus to illustrate relays 1310A, 1610A, 1910A, and 2210A operate in the same manner as relay 1010A, while relays 1450B, 1750B, 2050B and 2350B operate as relay 1150B; and contacts 1910A1, 1310A1, 1610A1 and 2210A1 operate in the same manner as contacts 1010A1.

This telephone system envisages combinations of high, low and intermediate rate subscribers in any one or all near by exchanges and in which the subscribers directly dial or indirectly control the operation of automatic switches to complete a connection to a called line in any one of the near by exchanges. In this particular adaptation of the invention a high rate subscriber is a subscriber receiving metered service to all subscribers in any of the near by exchanges without such calls being intercepted. An intermediate rate subscriber might fall into one of several classes dependent on what exchange he called. Thus he receives metered service on calls to one exchange and receives delayed line recording service on calls to another exchange, the latter calls being ticketed for charge purposes. In this application this intermediate rate is illustrated for subscribers at exchange A, it being understood that the same service could be furnished in the other near by exchanges. The low rate subscribers have their calls to other exchanges intercepted by the delayed line recording operator hereinafter abbreviated DLR operator. All of the subscribers receiving any type of metered service have an individual line while those in the low rate group who receive DLR service on calls to other exchanges may be individual or party lines. All subscribers have four digit call numbers. Low rate subscribers or party line subscribers are selected by the last digit.

This system provides for the use of a prefix number or numbers which are prefixed to the subscriber's directory telephone number in dialling to reach a subscriber in any other exchange from the calling subscriber. The prefix numbers assigned to be used on calls from the various exchanges in addition to the four digit directory subscriber number are:

Call from A to D is 8, to B is 9, to C is 99.
Call from B to A is 0, to C is 9, to D is 88.
Call from C to B is 9, to A is 00, to D is 888.
Call from D to A is 0, to B is 99, to C is 999.

Calls from any exchange to the long distance operator are initiated by dialling the prefix number necessary to reach exchange A followed by the digit 0. Thus a party calling from exchange C to the long distance operator would dial 000.

In this illustration exchanges B, C, D, have subscribers who receive either metered service on calls to any other exchange or DLR service on calls to any other near by exchange. As previously mentioned exchange A has subscribers who receive either metered service or DLR service on calls to any other exchange and another class who receive a combination of metered service and DLR service depending on the exchange that is being called. Thus one type of subscriber in exchange A receives DLR service on calls to exchanges B and C and metered service on calls to D; another type of subscriber in exchange A receives DLR service on calls to B and metered service on calls to D and C; and a different type of subscriber in exchange A receives DLR service on calls to C and metered service on calls to D and B. Special repeaters are used in exchange A to provide these services. Although the B exchange is near the A exchange it may at times be advisable for a subscriber to secure metered service to a more distant exchange C while receiving DLR service to B as for example a business house in exchange A and having a branch office in exchange C.

Exchanges D and C use the same type of repeater 1000D *or* 1000C respectively and a subscriber in either exchange dials through the repeater 1000D or C respectively in the same manner in making a call to another exchange. As the DLR operator's position is located at the A exchange, calling non-metered subscribers at both exchanges C and D must go through additional repeaters to reach this operator. A calling subscriber at D reaches the DLR operator through repeater 1300D or 1900B at exchange A while a calling subscriber at exchange C, if calling a subscriber in B, reaches the operator by going through a repeater 2200B at exchange B which has access to trunks to the DLR operator at exchange A. Calling subscribers in exchange C use repeaters 1300B or 1900D respectively in exchange A to reach the DLR operator, if the call is to exchange A or D respectively. A calling subscriber at B calling to exchange C goes through repeater 1600B at B to reach the DLR operator at exchange A. Both repeaters 1600B and 2200B at exchange B have a selecting switch for selecting an idle trunk to the DLR operator's position.

Trunks between exchanges serve both incoming and outgoing calls. This is accomplished by having the trunk normally extended through an outgoing repeater of the called exchange to either an incoming selector or an incoming repeater depending on the exchange and direction of the call. If an outgoing call is being made the extension is broken at the outgoing repeater and the trunk switched to the outgoing circuit from the outgoing repeater. This will be described in more detail.

Each exchange is provided with local selectors and incoming selectors. The local selectors 600 have access to outgoing repeaters or to local connector switches. An incoming selector 600 is used on a call from another exchange. The incoming selectors have access to local connectors in the same exchange and may have access to outgoing repeaters having trunks leading to another exchange.

All subscribers regardless of the exchange in which they are located have four digit call numbers, the first digit of which is seven or less. As has been previously mentioned the exchanges might have a large number of low rate party line subscribers, whose local calls are completed in the usual manner and are not metered. Connections to these party lines are completed by a connector similar to the type disclosed in Patent No. 2,542,272, issued February 20, 1951 to P. Bakker. The first digit of the called party's number operates a selector which selects the connector, the second and third digits of the called party's number steps the connector to reach the line and the fourth digit selects the ringing frequency of the desired called party on the selected line.

Thus on a local call to be completed in the exchange a local selector 600 is stepped to one of its first seven levels and the call is then directed to a connector 400 for completion within the exchange. A call to any other exchange necessitates the use of prefix numbers 8, 9 or 0 which raises the local selector above its seventh level to reach an outgoing repeater. On reaching an outgoing repeater and being trunked through the repeater of the next exchange and to the incoming selector of this next exchange, the incoming selector is stepped in accordance with the second digit dialled. If the second digit is seven or less then the incoming selector is stepped to a position enabling it to connect to a connector for extending a connection to a subscriber line in the same exchange. If however the incoming selector is stepped to its eighth, ninth or tenth level it then connects to an outgoing repeater to forward the calling line to another exchange.

Each exchange is equipped with a pulse generator 700 to be used in metering completed calls. The pulse generator is commonly connected to all the outgoing repeaters in the exchange. If a call originating in one exchange to a subscriber in another exchange is completed and answered the pulse generator 700 in the originating exchange operates the meter relay in the outgoing repeater of the originating exchange to operate the calling subscriber's meter 680. The pulser 700 is also used for operating the meter if the call is a local one. The pulse generator consists of a plurality of rotating cams operating contacts at different time sequences as diagrammatically illustrated. Some of these cams will have their contacts connected to the local metering circuit. Other of these cams have their contacts connected to the outgoing repeaters and to a local timer. One of these cams serves as a pick-up cam to operate a relay which will prepare a circuit for the metering relay. The metering relay is operated a number of times in accordance with the destination and duration of the call and dependent upon the time of day the call is completed. The cams are equipped with lobes which will operate the cam contacts during each period of revolution. The repeater to which these leads are connected is equipped to switch or interchange the leads from the cams if a different charge rate is to be made for overtime calls. The first cam is for restoring the differential meter 680. When the time mechanism reaches its home position and the call is still being continued, one of the overtime set of leads connected to the repeater is used to operate the metering relay.

The timer is stepped in accordance with the cam contact connected thereto. This is done so that the unit charge per call time may be varied in accordance with the desired rate. The full arrangement will be explained in more detail, however at this point it will be stated that for the purposes of this illustration the call rates are: Local call (those within one exchange) one unit charge per unit time.

Calls from exchange A to B or D or vice versa two unit charges per unit time on initial period and one unit charge per half unit time on overtime period.

Calls from exchange A to C or vice versa three unit charges per unit time on initial period and two unit charges per one-third unit time on overtime period.

Calls from exchange D to B or vice versa same as calls between A and C.

Calls from exchange D to C or vice versa four unit charges per unit time on initial period and one unit charge per one-sixth of unit time on overtime period.

Calls from exchange B to C or vice versa two unit charges per unit time on initial call and one unit charge per one-half unit time on the overtime period.

A unit time for the purposes of illustration is a period of six minutes and a unit charge is six cents. Thus if a call lasts longer than six minutes, the initial period in all these examples, the leads from the pulser 700 will be automatically switched so that a different charge rate can be applied for the overtime period. The timer mechanism also has several cams on a rotatable shaft, one cam operating a signal for warning the subscriber that a new charge will be made if the call is continued and the other operating a relay for automatically switching the leads to the overtime charge rate.

The first cam of the pulser 700 is arranged to close contacts immediately after booster battery is applied to the differential meter 680. The lead 703 from these contacts is connected through meter contacts 681 directly to the meter and will complete a circuit for returning the meter immediately to normal. Thus the meter operates and is released almost simultaneously as this latter circuit activates the windings of the meter in an opposing direction. In this manner the meter may charge as many times as necessary during the extremely short space of time as the various pulses are applied to the meter relay to thereby apply booster battery to and operate the meter, especially if more than one unit charge is being made at one time.

The rapidity with which the cams rotate is determined by whether the fast or slow pulse units are used to step the motor magnet of the pulser 700. The fast pulse unit is used during the busy peak load periods of the day while the slow pulse unit is used during the normally non-busy periods of the day. The slow pulse unit provides a greater time period per unit charge than is provided by the fast pulse unit and this arrangement should encourage the subscribers to delay or make their calls during the non-busy periods to take advantage of the greater time period provided by the slow pulse unit. The operation of the pulser will be more completely explained in description of a metered call.

The local and incoming selectors 600 are similar Strowger selectors of the battery searching type, which step in a vertical and rotary direction respectively. They are of general type disclosed in Patent No. 2,513,426, issued to Lomax, July 4, 1950. The local selectors 600 are equipped with a fourth wiper for the purpose of forwarding ground over an EC lead to the repeater on the operation of the switching relay 602. Relay 602 in the local selectors, in addition, completes a circuit for preventing local metering. This circuit is only completed by the normal post springs NPS when the selector is stepped to its eighth, ninth or zero levels at which levels connection is made to a repeater having an outgoing trunk.

When the prefix digits 8, 9 or 0 are dialled and the wipers of the selector reached the eighth level the normal post springs prepare a circuit which is completed when the selector switching relay operates to operate relay 640 over the following circuit: ground, NPS contacts 608, contacts 603, conductor 601, winding of relay 640 to battery. Relay 640 on operating closes contacts 642 to shunt the left-hand winding of relay 650 so that reversal of battery on the trunk when the called party answers will not operate relay 650 to start the metering operation.

GENERAL DESCRIPTION OF THE OPERATION

To more easily understand the arrangement between the exchanges it is suggested that all figures be arranged as shown in Figs. 25, 25*a*, 25*b*, 25*c*, 25*d*, 25*e* and 25*f* and that the repeaters, pulsers and local metering circuits be considered as located in their corresponding blocks in the trunking layout Figs. 1–5. Thus by following this layout calls will be traced from one exchange to another in this general description so that enough familiarity will be gained to more completely understand the detailed description.

A subscriber at exchange D desiring to call a subscriber at exchange A removes his handset thereby operating his line relay in his line circuit 1D in a well-known manner to cause a finder 2D to find the calling line and extend the calling line through the local metering circuit 690D to the local selector 600D. The calling subscriber after hearing dial tone then dials the prefix digit 0 which raises the local selector 600D to its tenth level where one of the repeaters 1000D is seized. As the selector is stepped to its eighth level and beyond a circuit is prepared by the normal post springs NPS of the selector 600D for relay 640, which is completed on the operation of the switching relay 602, in the well-known manner. Relay 640 in the local metering circuit 690D on operating prevents any local metering operation. As this is a non-metered or party line subscriber calling, the EC lead 1085 is grounded from the line circuit of the calling line. The finders and selectors both being of the four wiper type extends the ground marking on lead EC in the line circuit to EC lead 1085A in repeater 1000D. Repeater 1000D on being seized for an outgoing exchange call switches the trunk 5 from the incoming selector 600D' and thereby seizes incoming repeater 1300D in exchange A where trunk 5 terminates after being normally extended through outgoing repeater 1900D. Repeater 1300D on being seized prevents seizure of the last mentioned outgoing repeater 1900D. Repeater 1300D also seizes its associated incoming selector 600A''' over trunk 33A. As EC lead 1085A is grounded by the line circuit of the calling subscriber on seizure of repeater 1000D a circuit is completed for operating relay 1170B of repeater 1000D to prevent any metering operations, when the call is completed.

The next digit dialled is the first digit of the regular directory telephone number of the called subscriber. Repeater 1000D and repeater 1300D repeat the digit impulses to raise incoming selector 600A''' to one of its first seven levels to seize a connector such as 400A. This connector is somewhat similar to the type disclosed in Patent No. 2,542,272, issued to P. Bakker, February 20, 1951. This connector is stepped by the next two digits dialled to extend the connection to the called line and rings the called subscriber in response to dialling the last digit. After the prefix digit is dialled by a non-metered calling subscriber, one conductor of trunk 5 is grounded to operate differential relay 1380A of incoming repeater 1300D in exchange A. Relay 1380A prepares circuits for subsequently storing the last digit of the called party's number and signalling the DLR operator over trunk 987. The DLR operator tickets the call and releases the stored digit to complete the call to the called subscriber.

The same subscriber in exchange D calling a party in exchange B would seize an incoming repeater such as 1300D and its associated incoming selector 600A''' in the same manner as previously described except the first prefix digit dialled would have been 9 to extend the connection to exchange A. A second prefix digit 9 must be dialled to extend the connection from exchange A to the B exchange. The incoming selector 600A''' in exchange A is raised to its ninth level where it seizes outgoing repeater 1900B in exchange A over trunk 32A. Simultaneously the minor switches in repeater 1300D are stepped to a position from which the DLR operator is not signalled. Differential relay 1380A operates another relay such as relay 1525C to forward a ground through selector 600A''' to outgoing repeater 1900B as a non-metered subscriber had initiated this call. The DLR operator is later signalled from repeater 1900B over trunk 986, and the last digit of the called party's number is stored in repeater 1900B. Repeater 1900B on being seized by the incoming selector disconnects trunk 35 from incoming repeater 1300B and switches to its own outgoing circuit to seize incoming selector 600B over trunk 35 normally extended through repeater 1000B in the B exchange. The dialling of the first digit of the called subscriber's number then raises incoming selector 600B to one of its first seven levels where it seizes a connector such as 400B. The connector is stepped to connect to the called line on the dialling of remaining digits of the called party's number, and it rings the called party after the DLR operator releases the stored digit.

A call from exchange D to exchange C results in the seizure of the incoming selector 600B at exchange B in the same manner as described for a call to exchange B. The next digit dialled, however, is another prefix number 9 which raises this selector 600B to its ninth level where it seizes repeater 1600B over trunk 43B. Repeater 1600B disconnects trunk 55 from repeater 2200B and seizes incoming selector 600C' over the trunk 55 normally extended through repeater 1000C. Dialling of the called subscriber's number then causes incoming selector 600C' to seize a connector such as 400C, which in turn is operated to connect to the called line. As this is a call by a non-metered subscriber the last digit is stored in repeater 1900B and the DLR operator signalled from repeater 1900B as on a DLR call to exchange B.

A metered subscriber such as 8D at exchange D on making a call does not forward ground from the line circuit to EC lead 1085A and therefore does not reach the DLR operator on interexchange calls nor is the fourth digit stored, but instead the connection to the called party is completed and the party is rung directly.

Subscribers at exchange A calling a party in exchange D dial the prefix digit 8 which raises a local selector 600A to the eighth level to seize a repeater such as 1900D over trunk 31A in the same manner as a subscriber at D seizes repeater 1000D. Repeater 1900D disconnects from repeater 1300D and seizes incoming selector 600D' over trunk 5 normally extended through repeater 1000D. Dialling of succeeding digits then results in operating the incoming selector and connector in exchange D to connect with the called line in a manner similar to that already described, with the exception that if this is a non-metered subscriber calling, the DLR operator is signalled from repeater 1900D over trunk 988 and the last digit of the called party's number is stored in repeater 1900D until released by the DLR operator.

On a call by a subscriber in exchange A to a subscriber in exchange B, the prefix digit 9 is dialled which raises local selector 600A to the ninth level where it seizes a repeater such as 1900B over trunk 32A. Repeater 1900B on being seized disconnects itself from incoming repeater 1300B and seizes incoming selector 600B over trunk 35 normally extended through repeater 1000B. Dialing of the first digit of the called subscriber's number raises incoming selector 600B to one of its first seven levels where it seizes a connector 400B. The dialling of the second, third and fourth digits of the subscriber's number then operates the connector 400B to connect to the called line. If the calling subscriber is non-metered the last digit is stored in repeater 1900B and the DLR operator signalled from there over trunk 986, and after the operator has ticketed the call, the digit is sent over trunk 35.

A call from a subscriber in exchange A to a subscriber in exchange C results in the seizure of incoming selector 600B in exchange B in the same manner as on a call to exchange B on dialling of the first prefix digit 9. The second prefix digit 9 on being dialled raises the selector 600B to its ninth level where it seizes outgoing repeater 1600B to in turn seize incoming selector 600C' over trunk 55 normally extended through repeater 1000C. Dialling of the four digits of the subscriber's number operates the incoming selector and a connector such as 400C to connect to the called line. If this is a non-metered calling subscriber the last digit is stored in repeater 1900B and the DLR operator signalled therefrom as previously explained.

Figure 2:
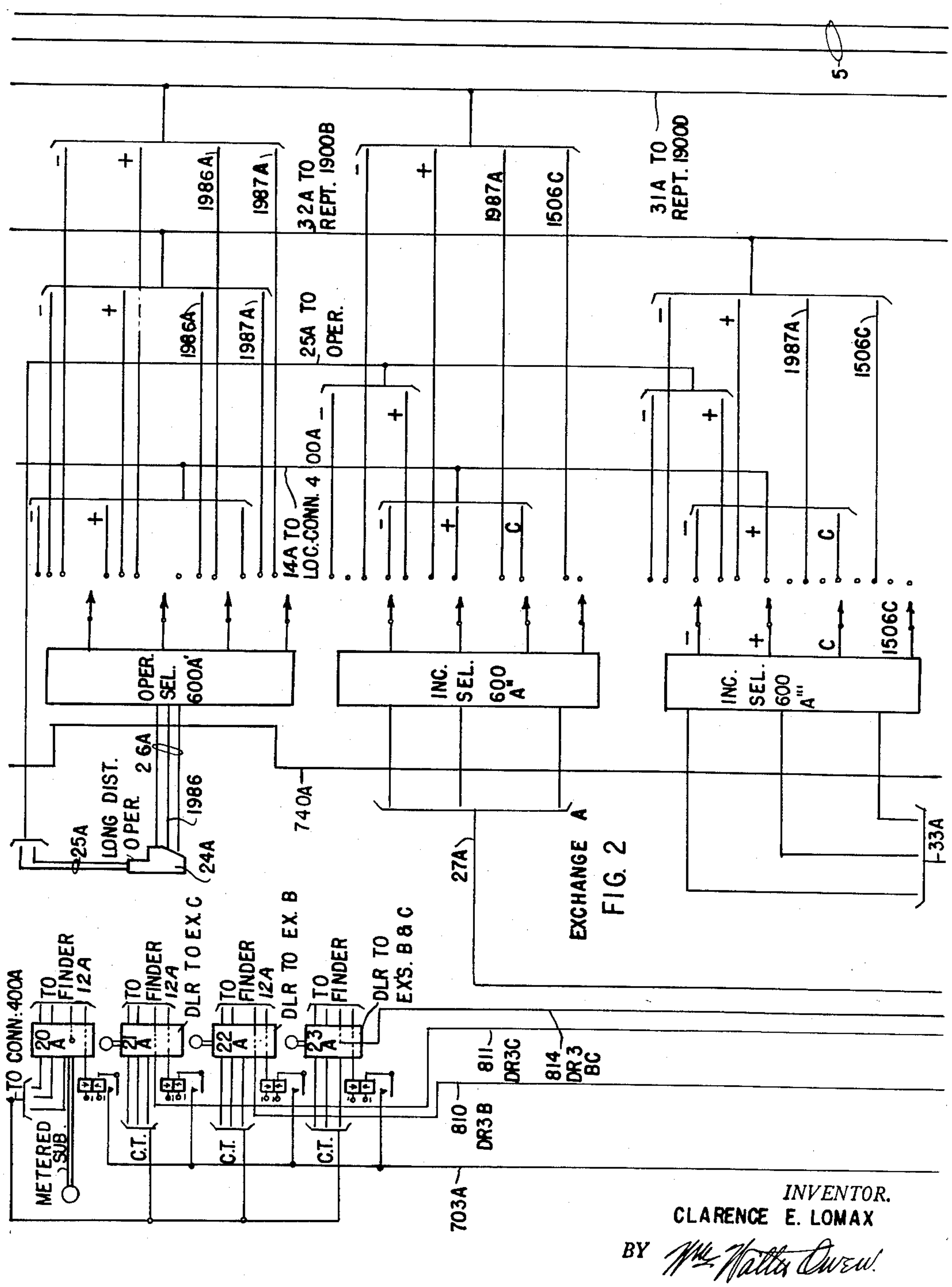

The A exchange is equipped with a match pulser 800, which by sending a pulse over a lead connected to the EC lead in the line circuit of combination subscribers 21A, 22A and 23A as shown in Figs. 2 and 3 and simultaneously to relay 2123C of repeater 1900B provides DLR service for these subscribers depending on which exchange is called. If the pulses do not match, which will be the case if the call is to an exchange other than the predetermined exchanges determined by their individual EC line circuit connections to the match pulser 800 they will receive metered service. Subscriber 21A receives DLR service on calls to exchange C and metered service to the rest of the exchanges. Subscriber 22A receives DLR service on calls to exchange B and metered service on calls to any other exchange. Subscriber 23A receives DLR service to exchanges B and C and metered service to exchange D. The details of this operation will be explained fully and it only need be noted here that these subscribers will use the same trunks and repeaters as are used by other subscribers and in this illustration are only in exchange A.

A subscriber in exchange B calling a subscriber in exchange D dials the first prefix digit 8, which raises the local selector 600B' to its eighth level where it seizes a repeater such as 1000B. Repeater 1000B on being seized switches trunk 35 from incoming selector 600B to the outgoing circuit of repeater 1000B to seize repeater 1300B and its associated selector 600A'' over trunk 27A. The incoming selector 600A'' will on dialling of the second prefix digit eight raise selector 600A'' to its eighth level to seize repeater 1900D, which switches trunk 5 from incoming repeater 1300D to the outgoing circuit of repeater 1900D and seizes incoming selector 600D′ over trunk 5 normally extended through repeater 1000D in exchange D. Selector 600D′ is stepped to seize a connector such as 400D, which in turn completes the connection on the dialling of the rest of the digits of the called subscriber's number. If this is a non-metered subscriber calling the DLR operator is signalled from repeater 1900D over trunk 988 and the last digit is stored in repeater 1900D and later released by the DLR operator.

A call by a subscriber in exchange B to a subscriber in exchange A results in seizing a selector 600A″ as on a call to exchange D, except that the prefix digit 0 is dialled. The following digit, being the called subscriber's first digit, steps selector 600A″ only to one of its first seven levels where it seizes a connector such as 400A over trunk 14A. Continued dialling of the other digits completes the connection. The DLR operator, if signalled, is signalled from repeater 1300B over trunk 984.

A call to exchange C from exchange B is preceded by the prefix digit 9, which raises the local selector 600B′ to its ninth level. Repeater 1600B is then seized and the previously described operation for seizing incoming selector 600C′ takes place. Dialling of the called subscriber's number then completes the connection. In the case of a non-metered subscriber making the call, stepping switch 1895C in repeater 1600B is operated to seize an idle trunk 985 to the DLR operator and the last digit of the called subscriber's number is stored in repeater 1600B and later released by the DLR operator.

A call by a subscriber in exchange C to exchange D is initiated by dialling the prefix digits 888. Repeater 1000C is seized by local selector 2600C to switch trunk 55 from incoming selector 600C′ and seize repeater 2200B and the associated incoming selector 600B″ in exchange B. Dialling of the second prefix digit eight operates selector 600B″, which results in the seizure of repeater 1000B, switching of trunk 35, and seizure of repeater 1300B and associated incoming selector 600A″ in exchange A. Dialling of the third prefix digit eight operates selector 600A″, which results in seizure of repeater 1900D, switching of trunk 5 and seizure of incoming selector 600D′ in exchange D. Dialling of the subscriber's number will then complete the connection. If the call is made by a non-metered subscriber the DLR operator is signalled from repeater 1900D over trunk 988.

A call from exchange C to exchange A is prefixed by the digits 00 and results in seizure of incoming selector 600A″ in exchange A, after which the call is completed as has been previously described. In the event the call is made by a non-metered subscriber the DLR operator will be signalled from repeater 1300B using trunk 984.

On a call from exchange C to exchange B the prefix digit nine is dialled to first seize incoming selector 600B″ in exchange B. Dialling of the subscriber's number completes the call within exchange B. If the call is made by a non-metered subscriber a stepping switch 2495C in repeater 2200B selects an idle trunk 985 over which the DLR operator is signalled.

All outgoing repeaters have booster battery metering circuits which operate the subscriber's meter, when battery is reversed on the trunk on answer by the called party. Although the metering circuits in several repeaters may operate at the same time on answer, only the outgoing repeater used in the calling party's exchange will actually operate his meter. In the case of a non-metered party making a call the metering circuits are disconnected, and therefore a metering operation does not occur.

On local calls a local booster battery metering circuit 690 is provided, which operates if the local selector is not stepped above its seventh level as shown in Figs. 6 and 6*a*. This circuit will operate on all local calls regardless of whether the subscriber has a meter or not.

DETAILED OPERATION

*Non-metered call from exchange D to exchange A*

We will now discuss a call from a non-metered subscriber 1D in exchange D, who calls a subscriber in exchange A. The non-metered subscriber 1D has a lead grounded in his line circuit as shown in Fig. 6. This lead will be called an EC lead, and its purpose will be described in describing the operation of the repeater. The finder as before mentioned is a four wiper type and extends the calling line loop 4, the C lead 9′ and the EC lead to the local selector 600D in the well-known manner on the initiation of a call. A call to exchange A from exchange D must be prefixed by the digit 9, which on being dialled raises the local selector 600D to level nine where it hunts for and connects with an idle repeater 1000D in the well-known manner. Normal post spring contacts 608 close on the eighth, ninth and tenth levels and when the selector finds an idle repeater, the switching relay 602 is operated to complete a circuit for relay 640 by way of contacts 603 and contacts 608. The circuit for relay 602 is completed as described for the corresponding switching relay R490 shown in Fig. 4 of the aforementioned patent issued to Lomax.

Relay 640 at contacts 641 opens the circuit to the right-hand winding of relay 650 and at contacts 642 closes a short circuit for the left-hand winding of relay 650 to prevent the operation of relay 650 when battery is reversed on answer by the called party. At contacts 643, relay 640 opens the circuit to the local meter relay 610 to also prevent its operation.

On connecting with an idle repeater 1000D a loop circuit is completed for operating line relay 1070A as follows: battery, upper winding of relay 1070A, conductor 1074A, repeating coil winding 1105B, conductor 1002, contact 1010A2, —L line of trunk 1003, bank contacts and selector wiper 604, through the selector, local metering circuit 690D, linefinder and line circuit, subscriber's substation, back through the line circuit, linefinder, local metering circuit 690D and contacts 642, through selector and wiper 605, +L line, contact 1010A3, conductor 1001, repeating coil winding 1106B, conductor 1075A, lower winding of line relay 1070A to ground. Relay 1070A on operating closes contacts 1070A1 and contacts 1070A3. Contacts 1070A3 on closing operates relay 1100B as follows: ground, contacts 1070A3, conductor 1082A, winding of relay 1100B to battery. Relay 1100B is slow-to-release and closes contacts 1100B2, 1100B3, 1100B4 and opens contacts 1100B1. Opening of contacts 1100B1 disconnects negative battery potential from the C lead 1086A thereby making this repeater busy to other selector switches. Contacts 1100B2 complete a circuit for holding switching relay 602 in selector 600D operated over the C lead 1086A from ground, contacts 1040A2, and lower winding of relay 1110B, contacts 1100B2, C lead 1086A, selector wiper 606, winding of relay 602 to battery (not shown). Closing of contacts 1100B3 prepares a circuit for relays 1120B and 1130B. Contact 1100B4 puts ground on holding conductor 1113B which will be grounded as long as repeater 1000D is seized. Ground on conductor 1113B causes the operation relay 1200C and 1210C as follows: ground on conductor 1113B, windings of relays 1200C and 1210C in parallel to battery. Relay 1150B does not operate at this time as it is a shunt wound polar relay which will only operate on the reversal of current on the trunk when the called party answers or the operator reverses battery. This is true of every repeater in the system. Relay 1210C opens contacts 1210C1, 1210C3, 1210C5 and closes contacts 1210C2, 1210C4 to switch the trunk 5 from the incoming selector 600D′ to the outgoing trunk 1112B of repeater 1000D to seize a repeater 1300D in the next exchange or A exchange. Closing of contacts 1210C6 prepares a circuit which will not be completed at the present time as this is a non-metered call. This circuit will be discussed in connection with a metered call. Opening of contacts 1210C5 prevents operation of the release magnets of the minor switches to be discussed in connection with a metered call. Relay 1200C closes contact 1200C1 to operate relay 1170B and opens contact 1200C2 to further prevent the repeater being seized. Relay 1170B operates only in case the EC lead in the calling subscriber's line circuit is connected to ground as follows: ground on the EC lead in the non-metered subscriber's line circuit 1D, through the finder, local metering circuit, and selector wiper 607, EC lead 1085A, contact 1200C1, conductor 1204C, winding of slow-to-operate relay 1170B to battery. Relay 1170B on operating closes contacts 1170B2 to prepare a circuit to operate differential relay 1380A in repeater 1300D in exchange A in order to forward the EC class of service to repeater 1300D to enable that repeater to identify the class of service the calling line is entitled to. Relay 1170B also opened contacts 1170B3 to prevent a circuit being completed to the stepping magnet of minor switch MS 1260C, and thus also preventing operation of minor switch MS 1190B as they are not necessary to the completion of a non-metered call. Contacts 1170B1 prepare a circuit through relay 1110B for transmitting paystation tone in case the calling subscriber is at a paystation, and at contacts 1170B4 a point is opened in the circuit to relay 1030A. Relay 1030A remains unoperated, and therefore no metering operation takes place on this type of call. This completes the seizure operation, however, it is to be remembered that relays 1070A, 1100B, 1200C and 1210C operate on seizure whether it is repeater 1000D, 1000B or 1000C that has been seized and that relay 1150B does not operate on seizure.

After relay 1210C operated an incoming repeater 1300D at exchange A was seized as follows: battery, upper winding of relay 1370A, upper winding of differential relay 1380A, conductor 1374A, repeating coil winding 1405B, conductor 1302, contacts 1310A2, over, —line of trunk 5, contacts 2110C1 and 2165C2 of repeater 1900D, over —line of trunk 5 to exchange D and repeater 1000D, contact 1210C2, conductor 1107B, contact 1070A1, conductor 1108B, repeating coil 1111B, resistor 1153B, left winding of shunt field polar relay 1150B, repeating coil 1122B, conductor 1124B, contact 1210C4, +line of trunk 5, contact 2110C3 of repeater 1900D in exchange A, +line of trunk 5, contact 1310A3 of repeater 1300D, conductor 1301, repeating coil 1406B, conductor 1375A, lower winding of differential relay 1380A, lower winding of relay 1370A, to ground. Relay 1370A now operates to close contacts 1370A1, 1370A3 and opens contact 1370A2. Contacts 1370A1 on closing causes the seizure of an associated incoming selector 600A''' of the A exchange over trunk 33A by operation of its line relay in the well-known manner. The incoming selector 600 need not be of the four wiper type if used only to seize a connector as they need not forward a marking over an EC lead nor do the normal post springs have to prepare a circuit to prevent local metering. Contacts 1370A3 on closing operate relay 1400B to thus close contacts 1400B3 and 1400B4 which contacts perform similar functions to their corresponding suffixed contacts (1100B3 and 1100B4) in repeater 1000D by preparing circuits to relay 1420B, 1430B and placing ground on hold conductor 1413B. Contacts similar to 1100B1 and 1100B2 are not necessary in this repeater (1300D) as a selector does not have access to it. Relay 1400B also opens contacts 1400B5 to prevent the operation of the release magnets of minor switches MS 1490B, MS 1560C and storer 1590C. Contacts 1400B7 connects ground to the C lead 1386A to repeater 1900D to operate relay 2150C in repeater 1900D as follows: ground, contacts 1400B7, C lead 1386A, winding of relay 2150C in repeater 1900D to battery. Relay 2150 in repeater 1900D at contacts 2150C1 disconnects battery potential from C lead 1986A of repeater 1900D to make repeater 1900D busy and prevent its seizure by a selector. The description of the seizure operation being complete a description of the dialling and DLR operation will be undertaken. It is to be remembered that relays 1370A and 1400B operate when either repeater 1300D or 1300B is seized through repeaters 1900D or 1900B respectively and that relay 2150C of repeaters 1900B or D will then be operated to prevent the seizure of either of these latter repeaters from selector switches having access thereto.

On dialling of the first digit of the called subscriber's number, line relay 1070A of repeater 1000D in exchange D is pulsed in accordance therewith over a circuit previously described for operating relay 1070A. Relay 1070A pulses contacts 1070A1 and contacts 1070A2. Relay 1100B, being slow-to-release, will not restore during the pulsing period when its circuit is opened at 1070A3. Contacts 1070A2 on each closure completes the following circuits for operating relays 1120B and 1130B: ground, contacts 1070A2, conductor 1083A, contact 1100B3, relays 1120B and 1130B in parallel, to battery. Relay 1120B pulses contacts 1120B1 and 1120B2 in accordance with the digital pulses as contacts 1070A2 open and close. Any relay suffixed 20B in any of the repeaters will pulse in this fashion. At contacts 1120B1 a pre-energizing circuit is prepared to aid in re-energizing line relay 1070A. Pulses formed by the opening and closing of contacts 1120B2 have no effect on this call as the circuit to the stepping magnet minor switch MS 1260C had been broken when relay 1170B operated contacts 1170B3. Relay 1130B, being slow-to-release, allows its contacts to fall back shortly after each digit has been dialled. Any relay suffixed 30B in all repeaters will operate in this fashion. On operating relay 1130B closes contact 1130B1 to operate relay 1140B as follows: battery, winding of relay 1140B, contact 1130B1 to ground on conductor 1113B. Relay 1140B is held operated until relay 1130B releases at the end of each digit. This will be true of all relay suffixed 40B in any repeater. Relay 1140B closes contacts 1140B1, 1140B3, 1140B4 and opens contacts 1140B2 and contacts 1140B5. As described, closing contacts 1140B1 allows relay 1120B to aid in re-energizing relay 1070A. Contacts 1140B3 shunts the left winding of polar shunt field relay 1150B to improve the impulse repeating circuit. Contacts 1140B4 close a circuit for operating slow-to-release relay 1160B as follows: battery, winding of relay 1160B, contacts 1140B4, ground on conductor 1113B. Contacts 1140B2 disconnect ground to prevent grounding conductor 1124B when relay 1160B operates in order to prevent forwarding ground over the trunk 5 at this time for designating the class of service of the calling subscriber.

In the meantime the digital pulses of the first digit of the called subscriber's number are being repeated at contacts 1070A1 and sent over the aforementioned circuit for operating line relay 1370A in repeater 1300D with the exception that the left winding of relay 1150B is shunted at contacts 1140B3 to improve impulsing. The transmitted digital pulses cause relay 1370A to operate relays 1420B, 1430B and 1440B in the same manner as relays 1120B, 1130B and 1140B were operated. Contact 1370A1 is pulsed in the same manner as contacts 1070A1 and re-energization of relay 1370A is aided by pulsing contacts 1420B1 of relay 1420B and contacts 1440B1. Contacts 1440B3 improve the impulsing circuit to the incoming selector 600A''' by short circuiting the left-hand winding of polar shunt field relay 1450B. The pulsing of contact 1370A1 operates the line relay of the incoming selector 600A''' in exchange A over trunk 33A to cause the selector, as the dialled digit is seven or less, to connect over trunk 14A, in the well-known manner, to a three digit connector 400A of the type disclosed in the aforementioned Patent No. 2,542,272 to P. Bakker. In response to the last three digits of the called subscriber's number the connector 400A is stepped over this pulsing circuit now including the selector 600A''' in the well-known manner.

Relay 1420B on dialling of the first digit of the subscriber's number also pulses contacts 1420B2 as before mentioned to operate the stepping magnet of MS 1560C over the following circuit: battery, stepping magnet of MS 1560C, contact 1505C3, conductor 1416B, contact 1420B2, contact 1480B1, conductor 1417B, contact 1320A5 to ground on conductor 1413B. Stepping magnet of MS 1560C steps its wiper one step for each impulse of the transmitted digit to a contact corresponding to the first digit, which will be its seventh contact or less to prepare a circuit for operating relay 1505C as will be described later. Stepping magnet of MS 1490B is also operated to step the wiper of MS 1490B to its first contact, while relay 1440B is held operated by slow-to-release relay 1430B as follows: battery, stepping magnet of 1490B, contact 1440B7, contact 1480B1, conductor 1417B, contacts 1320A5 to ground on conductor 1413A. As relay 1430B operates once for every digit transmitted it will operate relay 1440B likewise to thus step MS 1490B one step for each digit dialled. Both switches, when stepped, operate their off-normal On springs to prepare release circuits to be described later.

At the end of the dialling of the first digit of the subscriber's number relays 1120B, 1130B and 1140B in repeater 1000D and 1420B, 1430B and 1440B in repeater 1300D fall back and release their contacts. Contacts 1140B2 on closing now send a ground pulse over both the +line and —line conductors of trunk 5 to operate differential line relay 1380A and to maintain line relay 1370A operated in repeater 1300D. Line relay 1370A and differential relay 1380 have their upper windings energized from ground, contacts 1140B2, contact 1160B1 (which has not opened as relay 1160B is slow-to-release), contact 1170B2, conductor 1114B, repeating coil 1112B, left winding of relay 1150B, resistor 1153B, repeating coil 1111B, conductor 1108B, contacts 1070A1, conductor 1107B, contacts 1210C2, —line of trunk 5, contact 2165C2, contacts 2110C1 (in repeater 1900D), contacts 1310A2, repeating coil 1405B, conductor 1374A, upper winding of relay 1380A, upper winding of relay 1370A to negative battery. The lower windings of relays 1380A and 1370A are short circuited from ground, contacts 1140B2, 1160B1, 1170B2, conductor 1114B, contacts 1210C4, +line of trunk 5, contacts 2110C3 of repeater 1900D, contacts 1310A3 of repeater 1300D, repeating coil winding 1406B, lower windings of relays 1380A and 1370A in series to battery. This short circuit over the positive trunk conductor of trunk 5 permits differential relay 1380A to become unbalanced so it can operate. This is the circuit which forwards an EC marking, or class of service, to the succeeding repeater and mention should be made of it at this point as this is a non-metered call. Relay 1380A now operates and closes contacts 1380A1 to complete a circuit for operating relay 1525C as follows: battery, winding of relay 1525C, conductor 1309A, contact 1380A1 to ground on conductor 1413B. Relay 1525C on operating closes contacts 1525C1, 1525C2 and 1525C3. Contacts 1525C1 puts ground on EC lead 1506C which serves no special purpose in the present operation and whose extra control function will be described in connection with a non-metered call from exchange D to another exchange such as B or C. Contacts 1525C2 prepare a circuit for and will be described in conjunction with relay 1515C. Contacts 1525C3 locks relay 1525C operated as follows: battery, winding of relay 1525C, contact 1525C3, ground on conductor 1413B.

At the end of the dialling of the first digit of the subscriber's number as mentioned relay 1430B also falls back to open contacts 1430B1 so that relay 1440B releases and opens the circuit to the stepping magnet of MS 1490B at contacts 1430B7. Contacts 1440B6, close to complete a circuit for operating relay 1505C as follows: battery, winding of relay 1505C, contacts 1505C2, conductor 1509C, the first bank contact and wiper of MS 1490B, contact 1440B6 to ground on conductor 1413B. Relay 1505C on operating opens contacts 1505C2, but locks operated as follows: battery, winding of relay 1505C, contact 1505C1, conductor 1417B, contact 1320A5 to ground on conductor 1413B. Relay 1505C also closes contacts 1505C4, which serves no purpose in the present operation as MS 1560C on this call is not stepped past its seventh contact. It will be described later. Relay 1505C also opens contact 1505C3 to open the circuit to the stepping magnet of MS 1560C so that MS 1560C will not be stepped on dialling of the second or subsequent digits of the called party's number. As relay 1160B in repeater 1000D finally restores the ground is removed from trunk 5 so that relay 1380A restores and opens contacts 1380A1.

On dialling of the second and third digits of the subscriber's number the same procedure as described in regard to the operation of relays 1070A, 1120B, 1130B, 1140B, 1160B, 1380A, 1370A, 1420B, 1430B and 1440B take place. Relays 1120B, 1130B, 1140B and 1160B operate to no purpose as the differential relay 1380A has already operated contact 1380A1, to operate relay 1525C, which is locked operated over its described locking circuit. Relay 1070A pulses relay 1370A which in turn pulses contact 1370A1 to step the connector 400A seized over the trunk 14A by the incoming selector 600A''' in the well-known manner. The stepping magnet of MS 1490B is operated each time relay 1440B operated as previously described. The wiper of MS 1490B on reaching its second contact accomplishes nothing, but at the end of the third digit of the subscriber's number it will be on its third contact where, upon relay 1440B releasing to close contacts 1440B6 completes a circuit, already prepared, for operating relay 1515C as follows: battery, winding of relay 1515C, contacts 1525C2 and 1515C5, multipled bank contacts 1–7 inclusive of MS 1560C, wiper of MS 1560C, conductor 1507C, third bank contact and wiper of MS 1490B, contacts 1440B6 to ground on conductor 1413B. Relay 1515C locks operated as follows: battery, winding of relay 1515C, contacts 1525C2, contact 1515C4 to ground on conductor 1413B. Relay 1515C closes contacts 1515C1 to shunt impulsing contacts 1370A1 to prevent the pulses of the fourth dialled digit of the subscriber's number from being sent over trunk 33A and the selector 600A''' to the connector 400A. Contacts 1515C2 and contacts 1515C3 on closing prepares a talking circuit over the talking conductors 1407B and 1424B for enabling the DLR operator to converse with the calling subscriber. Relay 1515C locks over contacts 1525C2 and 1515C4 and it also closes contacts 1515C6 to prepare a circuit for stepping the magnet of storer 1590C.

The non-metered subscriber on dialling the last digit of the called party's number causes the re-operation of relays 1070A, 1120B, 1130B, 1140B, 1160B in repeater 1000D and relays 1370A, 1380A, 1420B, 1430B and 1440B in repeater 1300D as previously described. MS 1490B is stepped in the manner described to its fourth position. Relays 1505C, 1515C and 1525C are already operated and relay 1515C prevents at contacts 1515C1 the sending of the fourth digit to connector 400A and as it also closes contacts 1515C6 the fourth digit is sent to storer 1590C. The storer stepping magnet is pulsed by relay 1420B over the following circuit: battery, stepping magnet of 1590C, contact 1555C4, contact 1515C6, conductor 1416B, contact 1420B2, contacts 1480B1, conductor 1417B, contacts 1320A5 to ground on conductor 1413B. As relay 1420B follows digital pulses it pulses contact 1420B2 to operate the magnet of 1590C a number of times corresponding to the fourth digit of the called subscriber's number to step the cams 1596C and 1598C to a corresponding position. Cam 1598C of the storer closes contacts 1590C1, 1590C2 and 1590C3.

Contacts 1590C3 close to prepare a circuit for the release magnet of 1590C. Contacts 1590C2 prepare a circuit for the operation of relay 1545C to be described later. Contacts 1590C1 prepare a circuit for the control trunk switching relay 1555C which operates when relay 1440B releases contacts 1440B6 at the end of the fourth digit as follows: battery, winding of relay 1555C, contacts 1590C1, conductor 1594C, contacts 1440B6 to ground on conductor 1413B. Relay 1555C on operating closes contacts 1555C1, 1555C2, 1555C3, 1555C5 and opens contacts 1555C4.

Contacts 1555C3 holds relay 1555C operated over the following circuit: battery, winding of relay 1555C, contacts 1555C3 to ground on conductor 1413B. Contacts 1555C4 on opening breaks the stepping circuit to the stepping magnet of storer 1590C.

Figure 9:
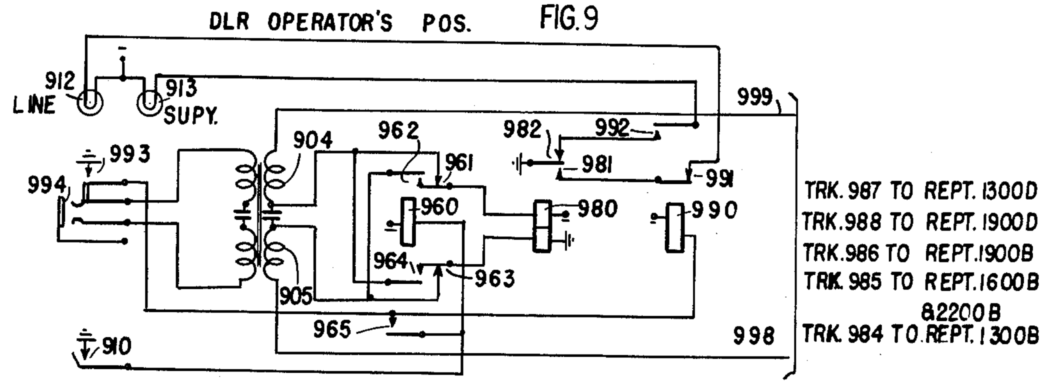
Fig. 9 is a diagram of the delayed line recording operator's position located in exchange A.

Contacts 1555C5 prepare a circuit for relay 1565C. Contacts 1555C1 and 1555C2 on closing complete a circuit over trunk 987 for operating line relay 980 of the DLR operator's equipment (Fig. 9) as follows: battery, upper winding of relay 980, contacts 961, repeating coil 904, conductor 999 of trunk 987, contacts 1555C1, conductor 1588C, contact 1310A8, conductor 1589C, winding of polar relay 1535C, contacts 1555C2, conductor 998, repeating coil 905, contact 963, lower winding of relay 980 to ground. Polar relay 1535C does not operate at this time due to the direction of the flow of current in this circuit.

Relay 980 on operating closes contact 981 to operate the DLR operator's line lamp 912 over the following circuit to attract her attention: ground, contact 981, contact 991, line lamp 912 to battery. The operator by plugging in her jack to 994 operates relay 990 as follows: ground, jack contact 993, winding of relay 990 to battery. Relay 990 operates to open contact 991 to break the circuit to the line lamp 912 and close contact 992 to prepare a circuit to the supervisory lamp 913.

The operator converses with the calling party to secure the necessary information to ticket the call. She now manipulates key 910 to operate relay 960 as follows: battery, winding of relay 960, key 910, to ground. Relay 960 on operating opens contacts 961 and 963 and closes contacts 962 and 964 to reverse battery on conductor 998 and 999 to operate polar relay 1535C over the aforementioned circuit as the direction of current flow is reversed in trunk 987 and polar relay 1535C. Relay 960 also closes contacts 965 to hold relay 960 operated as long as the operator keeps her plug in jack 994 over the following circuit: battery, winding of relay 960, contacts 965, contact 993 to ground.

Relay 1535C on operating closes contact 1535C1 and opens contact 1535C2. Contact 1535C1 on closing completes a previously prepared circuit to operate relay 1545C as follows: battery, winding of relay 1545C, contact 1590C2, contact 1535C1 to ground on conductor 1413B. Relay 1545C on operating closes contacts 1545C1, 1545C3, 1545C4, 1545C6 and opens contacts 1545C2, 1545C5 and 1545C7. Relay 1545C is held operated as follows: battery, winding of relay 1545C, contacts 1590C2, contact 1545C3 to ground on conductor 1413B. Contact 1545C4 on closing operates relay 1310A as follows: ground, contact 1545C4, conductor 1587C, winding of relay 1310A to negative battery. Other contacts of relay 1545C will be discussed shortly. Relay 1310A on operating opens contacts 1310A2 and 1310A3 and closes contacts 1310A1 and 1310A4 to reverse battery on trunk 5 to operate polar relay 1150B in repeater 1000D. Relay 1310A also closes contacts 1310A5 to operate relay 1320A and opens contacts 1310A8 to include resistance 1586C in series with polar relay 1535C. The increased resistance causes relay 980 which is marginal to fall back and close contacts 982 to thereby operate the supervisory lamp 913 at the DLR operator's position as follows: ground, contacts 982, contacts 992, supervisory lamp 913 to battery. Relay 1320A is operated as follows: battery, winding of relay 1320A, contacts 1310A5, to ground on conductor 1413B. Relay 1320A holds operated as follows: battery, winding of relay 1320A, contacts 1320A3, to ground on conductor 1413B. It also opens contact 1320A6 to remove the shunt from contacts 1370A1 and close contacts 1320A7. Contacts 1320A5 on opening break the holding circuit for relay 1505C, which restores.

Polar relay 1150B in repeater 1000D on operating closes contacts 1150B1 to operate relay 1010A as follows: ground, contacts 1150B1, conductor 1152B, winding of relay 1010A to battery. Relay 1010A on operating opens contacts 1010A2 and 1010A3 and closes contacts 1010A1, 1010A4, 1010A7 and 1010A5. Contacts 1010A1 and 1010A4 reverse battery on the line loop to the subscriber. Contacts 1010A7 closes to no purpose as the leads to the metering pulser 700D have not been closed and the circuit to relay 1030A is open at contacts 1170B4. On closing, contacts 1010A5 complete a circuit for operating relay 1020A as follows: battery, winding of relay 1020A, contacts 1010A5, ground on conductor 1113B. Relay 1020A is held operated as follows: battery, winding of relay 1020B, contacts 1020A3, ground on conductor 1113B. Relay 1020A also closes contacts 1020A1, 1020A2 and 1020A4. Contacts 1020A4 operate to prepare a circuit for relay 1060A. Contacts 1020A1 and 1020A2 place the upper winding of coil 1110B across the trunk so that if this is a paystation calling the DLR operator will be so advised by paystation tone on the C lead 1086A induced through coil 1110B to the talking leads and over the repeating coils in repeaters 1000D and 1300D, contacts 1515C2 and 1515C3 to the DLR trunk 987. The tone signal indicates to the operator that a paystation is calling, and she must stay on the line and collect coins from time to time. The superivsory lamp extinguishes as soon as the storer 1590C has sent the last digit and relights on answer by the called party as will be explained so that the operator can time the call. After securing all desired information or coins the operator releases key 910.

In the meantime when relay 1545C had closed contacts 1545C6, the circuit of the release magnet of storer 1590C was completed as follows: battery, release magnet, contact 1545C6 to ground. Relay 1545C also closed contacts 1545C1 so that when the cam 1591C returns to normal thereby opening and closing contacts 1590C4 a number of times, impuses corresponding to the fourth digit are generated and sent over the trunk 33A through the selector 600A''' to operate the connector 400A accordingly. The storer release operation is slowed by a governor in any well-known manner to allow properly timed pulses to be sent over the trunk 33A, to selector 600A''' and trunk 14A to the connector 400A from contacts 1590C4. Contacts 1545C1 on closing placed contacts 1590C4 across the line and contacts 1545C2 on opening prevented the pulses from being heard in the calling party's handset. The sending of this stored, or ringing, digit causes the connector 400A in the well-known manner to select and connect the desired ringing frequency to the called line.

When the stored digit has been sent and the storer 1590C is fully restored contacts 1590C1, 1590C2 and 1590C3 are opened but releases only relay 1545C as relay 1555C is held operated over its holding circuit. Relay 1545C on releasing opens contacts 1545C1, 1545C3, 1545C4, 1545C6 and closes contacts 1545C2, 1545C5 and 1545C7. Contacts 1545C1 on opening disconnects the storer cam contacts 1590C4 from the trunk and contacts 1545C2 reestablish the original trunk connection. Contacts 1545C4 on releasing opens the circuit to relay 1310A which on releasing restores original battery on trunk to cause release of polar relay 1150B to in turn cause release of relay 1010A. Relay 1310A releasing also shunts resistor 1586C at contacts 1310A8 and causes relay 980 at the DLR operator position to reoperate to break the circuit to the supervisory lamp 913 and thereby extinguish it to indicate the stored digit has been sent. Relay 1010A also on releasing closes contact 1010A6 to operate relay 1060A over a previously prepared circuit as follows: battery, winding of relay 1060A, contact 1060A3, contact 1020A4, contact 1010A6 to ground on conductor 1113B. Relay 1060A holds operated as follows: battery, winding of 1060A, contact 1060A2 to ground on conductor 1113B. It also opens contacts 1060A1 and 1060A2 to remove tone from the trunk in the event this is a paystation call.

When the called party answers, battery at the connector is reversed on trunks 14A and 33A in the well-known manner to in turn cause the operation of shunt wound polar relay 1450B. The reversal of current from the connector 400A through the left-hand winding of shunt field relay 1450B now energizes this left-hand winding in opposition to the right-hand winding thereby causing relay 1450B to close contacts 1450B1. Polar relay 1450B closes contact 1450B1 to in turn reoperate relay 1310A, which in turn reoperates relay 1150B and 1010A in repeater 1000D for no purpose. Relay 1310A on reoperating again opens contact 1310A8 which places resistor 1586C in series with polar relay 1535C. The increased resistance causes a decreased current flow which signals the operator that the call is answered by causing relay 980 to release to close contact 982. The supervisory lamp then lights as follows: battery, supervisory lamp 913, contacts 992, contacts 982 to ground. The operator then begins to time the call. If this is a paystation calling, however, it would be classed as a low rate subscriber and the operator must collect coins. The operator on being thus signalled that the called party has answered then requests the deposit of coins which may be heard by both the parties. If the correct amount of coins are not deposited the operator can restore the original polarity to relay 1535C by removing her plug from the jack to restore relay 960 and relay 1535C so that contacts 1535C2 and 1535C1 are released. Contacts 1535C1 on release have no effect, but contacts 1535C2 close a circuit to operate relay 1565C as follows: ground, contacts 1320A7 (relay 1320A locked operated the first time relay 1310A operated), conductor 1311A, contacts 1535C2, contacts 1545C5, contacts 1555C5, winding of relay 1565C to battery. Relay 1565C operates and splits the trunk at contacts 1565C2 but holds the switches at contact 1565C1. The operator can now talk only with the calling party when she replaces her plug. If then the deposit of the correct number of coins is made the operator again reverses the polarity of relay 1535C by pressing key 910 to reoperate relay 960 to cause relay 1535C to reoperate to open contact 1535C2 to release relay 1565C and restore the talking connection. Attention is called to the fact that relay 1565C can operate only after the stored digit has been sent. Further attention is called to the fact that, when the operator removes her plug, the supervisory lamp 913 extinguishes as relay 990 is released to open contact 992 but it relights when relay 990 is reoperated by the inserted plug.

*Non-metered call from D to B*

Now let us assume a non-metered call to a subscriber in exchange B from a calling subscriber in exchange D. In addition to the four digits of the called subscriber's number there would be the prefix digits 99. The dialling of the first prefix digit 9 connects the calling subscriber to an idle repeater 1000D in exchange D in exactly the same manner as on a call to a subscriber in exchange A to thus connect, as before described, to the incoming repeater 1300D in exchange A and to its corresponding incoming selector 600A'''. On seizure of repeater 1300D relays 1370A and 1400B again operate. The dialling of the second digit 9 instead of raising the selector 600A''' to any of its levels 1 to 7 raises it to its ninth level where it connects over a trunk 32A to an idle outgoing repeater 1900B through which the trunk 35 connected to exchange B is normally extended.

As before the seizure of repeater 1000D by a non-metered subscriber operates relay 1170B to prevent metering from repeater 1000D, the stepping of MS 1260C and MS 1190B and prepares a ground for one side of trunk 5 to operate differential relay 1380A in repeater 1300D at the end of the second prefix digit dialled which in this case is the digit 9. Relay 1070A in repeater 1000D pulses the relay 1370A in repeater 1300D which in turn operates relays 1420B, 1430B and 1440B as previously mentioned.

In repeater 1300D the dialling of the second prefix digit 9 rotates MS 1560C to its ninth bank contact over the circuit previously described for stepping it, as relays 1420B, 1430B and 1440B are operated as described. The MS switches in repeater 1000D in exchange D do not operate for the same reason as given for a non-metered call to a subscriber in exchange A (relay 1170B opens their stepping circuits). Relay 1505C in repeater 1300D operating, when MS 1490B reaches its first bank contact as previously described, closes contacts 1505C1, 1505C4 and open contacts 1505C2 and 1505C3. It holds operated over its previously described circuit and at contacts 1505C3 breaks the stepping circuit to the stepping magnet of MS1560C. Relay 1515C is not operated this time as MS 1560C is stepped past its first through seventh bank contacts. Relay 1480B operates as follows: battery, winding of relay 1480B, conductor 1418B, contact 1505C4, ninth bank contact and wiper of 1560C in its ninth position, to ground. Relay 1480B on operating opens contact 1480B1 to prevent MS 1490B from being stepped past its first contact by subsequent dialled digits. Relays 1515C, 1535C, 1545C, 1555C, 1565C and the stepping magnet of storer 1590C of this repeater 1300D therefore do not operate and the DLR operator is signalled from repeater 1900B as will be explained. The class of service ground pulse to operate differential relay 1380A is sent as before at the end of the second prefix digit 9 to operate relay 1525C as before described. Relay 1525C closes contact 1525C1 to extend class of service ground over EC lead 1506C through the incoming selector 600A''' and EC lead 1506C' to repeater 1900B controlling the trunk connecting the A and B exchanges. Relay 1525C also holds operated as before described.

*Seizure of repeater 1900B*

On seizure of repeater 1900B over the trunk 32A from the incoming selector 600A''' in exchange A, relays 1970A, 2000B, operate in a manner similar to their corresponding relays in repeaters 1000D and 1300D. The circuit for operating relay 1970A is as follows: battery, upper winding of relay 1970A, conductor 1974A, repeating coil winding 2005B, conductor 1902, contacts 1910A1, —line of trunk 32A, back through incoming selector 600A''', contact 1565C2 in repeater 1300D, contacts 1545C2, conductor 1407B, contacts 1370A1, conductor 1408B, repeating coil 1411B, resistor 1453B, left winding of polar shunt field relay 1450B, repeating coil 1422B, conductor 1424B and +line of trunk 32A through incoming selector 600A''', contacts 1910A3, conductor 1901, repeating coil 2006B, conductor 1975A, lower winding of relay 1970A to ground. Relay 2000B then operates as described for relay 1100B. Relay 2000B also closes additional contacts 2000B5 for a purpose to be described shortly. Relay 2000B places ground on the C lead to hold selector 600A''' operated and to operate relay 2010B as follows: ground, contacts 1940A2, conductor 1912A, lower winding of relay 2010B, contacts 2000B2, C conductor 1987A to the C wiper of incoming selector 600A''' and through the winding of the selector switching relay to battery. Ground is placed on hold conductor 2013B at contacts 2000B4 by relay 2000B. As soon as relay 2000B places ground on conductor 2013B relay 2110C operates as follows: battery, winding of relay 2110C to ground on conductor 2013B and relay 2133C operates as follows: battery, winding of relay 2133C, to ground on conductor 2013B. Relay 2110C closes contacts 2110C2, 2110C4 and 2110C6. Contacts 2110C2 and 2110C4 switch trunk 35 from repeater 1300B and cause the seizure of an incoming selector 600B at exchange B over trunk 35 normally extended through repeater 1000B in the B exchange. The trunk 35 extends through repeater 1000B in exchange B at contacts 1210C1 and 1210C3 to incoming selector 600B. To prevent repeater 1000B from being seized from another selector in exchange B and breaking the trunk 35, a circuit is completed when the selector 600B is seized to place ground on the C conductor 1286C to complete the following circuit: ground in selector 600B, C conductor 1286C, winding of relay 1250C (in repeater 1000B) to battery. Relay 1250C operates to open contact 1250C1 and removes battery from C conductor 1086A to prevent repeater 1000B from being seized and trunk 35 from being switched.

Relay 2133C in repeater 1900B is slow-to-release and when it operated it closed contacts 2133C1, 2133C3 and opened contacts 2133C2. Opening of contacts 2133C2 takes battery off the C lead 1987A to busy the repeater. Contacts 2133C1 prepare a circuit for relay 2065B which will not be used in this operation as lead 1986A is not grounded at this time. Contacts 2133C3 extend ground on the lead 1506C′ to operate relay 2075B as follows: ground, contacts 1525C1 (in repeater 1300D), conductor 1506C through incoming selector 600A‴ at exchange A and 1506C′, contacts 2133C3, contacts 2065B2, winding of relay 2075B to battery. Thus relay 2075B is operated by the non-metered class of service ground forwarded from repeater 1000D to repeater 1300D and then to this repeater 1900B. Relay 2075B on operating opens contacts 2075B2 and closes contacts 2075B1. It also opens contacts 2075B3 to prevent a metering operation while the repeater 1900B is seized. Contacts 2075B2 on opening prevents any operation of relay 2065B. Contacts 2075B1 on closing complete a circuit for the lower windings of shunt wound relay 2123C which does not operate until a circuit in opposition is completed for one of its other windings. The completed circuit for the lower windings of relay 2123C is as follows: battery, lower left and right windings of relay 2123C, contacts 2075B1 to ground on conductor 2013B. It is to be noted that although relays 2123C, 2075B or 2065B may or may not operate depending on the class of service, relays 1970A, 2000B, 2010B, 2110C and 2133C operate whenever repeater 1900B or 1900D is seized.

Figure 8:
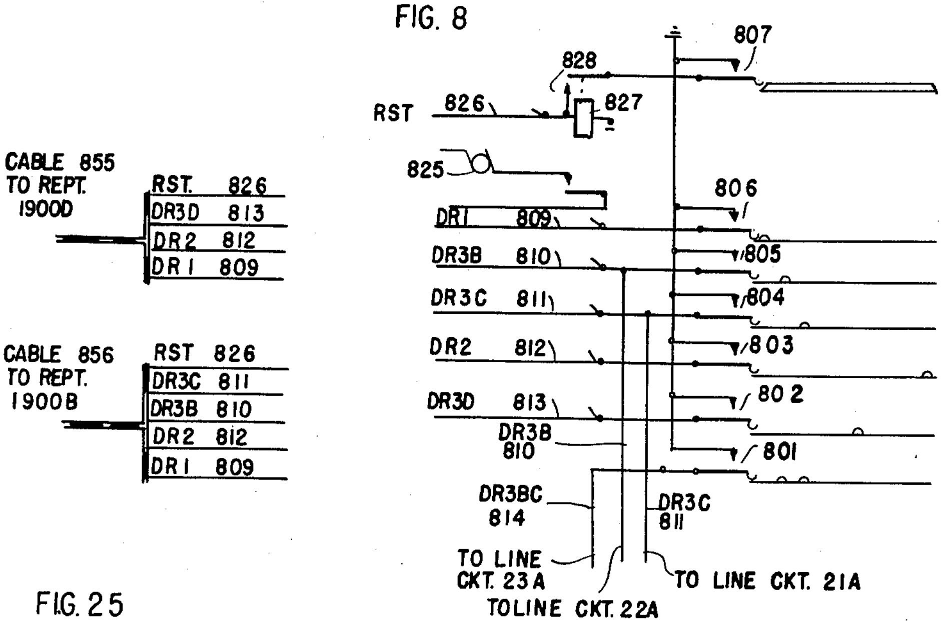
Fig. 8 shows the match pulser which is used only in exchange A for marking the subscribers lines in that exchange in accordance with the class of metered and delayed line recording service assigned to such lines.
Figure 25:
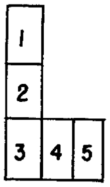
Figure 25A:
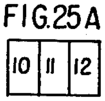
Figure 25B:
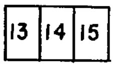
Figure 25C:
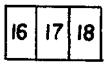
Figure 25D:
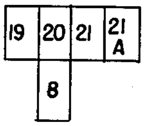
Figure 25E:
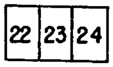
Figure 25F:

Relay 2000B as mentioned also closed contact 2000B5 to complete a circuit for operating RST relay 827 of the match pulser 800 shown in Fig. 8 as follows: ground, contact 2000B5, conductor 2168C, contact 2113C5, RST conductor 826 of cable 856, winding of relay 827 to battery. Relay 827 starts poly-phase motor 825 to in turn rotate the cams 801—807 of the match pulser 800 of Fig. 8. Relay 827 now holds operated by closing contact 828 to complete the following circuit: battery, winding of relay 827, contacts 828, contacts 807 to ground. Cam contacts 806, 805, 804, 803 and 802 close at different time intervals. Contacts 801 close twice per revolution of 800 with one closing occurring when contacts 805 are closed and the other when the contacts 804 are closed. Its purpose will be more fully explained in conjunction with the combination class of service provided for subscribers at exchange A.

Relay 2010B had on operating closed contact 2010B1 to prepare stepping circuits for MS 2090B and MS 2061B. Ms 2061B in operation is very similar to MS 1560C already described, however it is provided with additional wipers and bank contacts whose purposes will be explained. This completes the seizure operation of repeater 1900B in exchange A by a non-metered subscriber at exchange D who has now dialled the prefix digits 99. Seizure of repeater 1900B also resulted in seizure of repeater 1000B and the incoming selector 600B in exchange B when relay 2110C switched trunk 35 from repeater 1300B.

*Dialling through repeater 1900B*

The dialling of the first digit of the called subscriber's number raises the wipers of the incoming selector 600B at exchange B to one level of its first seven levels by pulsing of relay 1970A in repeater 1900B which also operates relays 2020B, 2030B and 2040 as their like suffixed relays had operated in the other repeaters such as 1000D and 1300D. These relays will operate whenever repeaters 1900B or 1900D are dialled through. In the meantime coincident with the dialling of the first digit of the subscriber's number and the stepping of selector 600B, the stepping magnet of MS 2061B is pulsed to rotate all the wipers of MS 2061B to one of its first seven positions, or bank contacts, over the following circuit: battery, stepping magnet of MS 2061B, conductor 2062B, contacts 2153C5, conductor 2016B, pulsing contacts 2020B, contacts 2010B1, conductor 2017B, contact 1920A5 to ground on conductor 2013B. The wiper of MS 2090B is simultaneously stepped to its first position, or bank contact, by the stepping magnet of MS 2090B over the following circuit: battery, stepping magnet of 2090B, contacts 2040B7, contacts 2010B1, conductor 2017B, contacts 1920A5 to ground on conductor 2013B. After relay 2040B releases at the end of the first digit relay 2153C then operates over the following circuit: battery, winding of relay 2153C, contact 2153C3, conductor 2109C, first contact and wiper of MS 2090B, contact 2040B6 to ground on conductor 2013B. Relay 2153C closes contacts 2153C1, 2153C2, 2153C4, 2153C6 and opens contacts 2153C3 and 2153C5. Opening of contacts 2153C5 breaks the circuit to the stepping magnet of MS 2061B. Opening of contacts 2153C3 and closing contacts 2153C4 complete a holding circuit for relay 2153C as follows: battery, winding of relay 2153C, contacts 2153C4, conductor 2019B, contacts 2010B1, conductor 2017B, contact 1920A5 to ground on conductor 2013B. Contacts 2153C2 partially prepare a circuit to one of the windings of relay 2123C from the third wiper of MS 2061B and matched pulser 800 which will be described shortly. Contacts 2153C6 prepare a circuit for the DR1 pulse from matched pulser 800 to operate relay 2103C as will be described. Contacts 2153C1 close for no purpose in this operation as a class of service ground is not forwarded over EC lead 1985A at this time.

As previously mentioned poly-phase motor 825 rotates the cams of matched pulser 800 and causes contacts 806 to close. Relay 2103C operates when contacts 806 close to give a DR1 ground pulse over the following circuit: ground, contacts 806, DR1 conductor 809 of cable 856, contacts 2153C6 (which closed when relay 2153C operated after relay 2040B released at the end of the first digit dialled through repeater 1900B), contacts 2103C3, contacts 2113C2, winding of relay 2103C to battery. Relay 2103C is slow-to-release and closes contacts 2103C1 (for no purpose in this operation as EC lead 1985A forwards no class of service ground at this time), and contacts 2103C2 (to complete a previously prepared circuit for a ground pulse over the DR3B lead 810 from matched pulser contacts 805 and the third wiper of MS 2061B to operate relay 2123C as will be described). Contacts 2103C4, close and contacts 2103C3 open so that a holding circuit for relay 2103C is now completed as follows: battery, winding of 2103C, contact 2113C2, contacts 2103C4 to ground on conductor 2013B. Contacts 2103C5 prepare a circuit for a DR2 ground pulse on closing of matched pulser contacts 803 which follows the DR3B pulse and will operate relay 2113C. The DR3B ground pulse will operate relay 2123C (slightly after the DR1 pulse operated relay 2103C) over the following circuit: ground, contacts 805, conductor 810 of cable 856, C wiper of MS 2061B in one of its first to seventh positions, contacts 2153C2, contact 2103C2, upper right winding of relay 2123C to battery. The magnetic flux created by the current flow in the upper right-hand winding of shunt field relay 2123C is in opposition to the flux created by the current flow in the lower windings of relay 2123C with the result that relay 2123C now operates. Relay 2123C locks operated as follows: battery, lower windings of relay 2123C, 2123C1 to ground on conductor 2123B. Although the contacts 806 and contacts 803 of the matched pulser 800 are continuously closing to send DR1 and DR2 pulses respectively immediately after seizure of repeater 1900B or 1900D, relay 2103C cannot operate until relay 2153C operates at the end of the first digit dialled through repeater 1900B or 1900D and relay 2113C cannot operate until relay 2103C has operated. The leads of the matched pulser are connected through their cables to all repeaters at exchange A. As a DR3 pulse will be sent before a DR2 pulse, relay 2123C operates before relay 2113C operates. Relay 2123C also opens contact 2123C3 to prevent a circuit being completed to the exchange metering switching relay 1990A and closes contacts 2123C2 to prepare a circuit for relay 2115C. Contacts 2123C4 open to prevent a metering operation whenever a combination subscriber or a non-metered subscriber is the calling subscriber. Relay 1990A is provided only in repeater 1900B and is not operated unless the wiper of the B bank of MS 2061B is on its ninth contact. A moment later a ground pulse over the DR2 lead operates relay 2113C as follows: battery, winding of 2113C, contacts 2113C4, contacts 2103C5, DR2 conductor 812 of cable 856, contacts 803 of matched pulser 800 to ground. Relay 2113C opens contacts 2113C1 (for no purpose in this operation as EC lead 1985A is not forwarding ground), 2113C2 opens the holding circuit for relay 2103C, and closes 2113C3 to complete its own holding circuit as follows: battery, winding 2113C, contact 2113C3 to ground on conductor 2013B. Relay 2113C also opens contacts 2113C5 to break the initiating circuit for starter relay 827 so that the poly-phase motor 825 halts operation when contacts 807 are opened and relay 827 restores.

The selector 600B is seized when repeater 1900B switched trunk 35 after the dialing of the second prefix digit 9. The next number dialled, as this is a call to a subscriber in B, was seven or less and therefore raised selector 600B to a corresponding position where it seized connector 400B in the well-known manner. The connector 400B is operated over the trunk 35 on the dialling of relay 1970A by the second and third digits of the subscriber's number. During the second digit MS 2090B is stepped by relay 2040B but no additional circuits will be completed by MS 2090B in its second position. After MS 2090B reaches its third position at the end of third digit of the called subscriber's number and relay 2040B falls back, a circuit is completed for operating relay 2115C as follows: battery, winding of relay 2115C, contact 2115C5, contacts 2123C2, conductor 2102C, the A wiper and one of its first to seventh bank contacts of MS 2061B, third bank contact and wiper of MS 2090B, contacts 2040B6 to ground on conductor 2013B. Relay 2115C closes contacts 2115C2 and 2115C3 to connect the talking conductors 1924B and 2007B, contacts 2155C2 and 2155C1. It closes contacts 2115C1 to shunt pulsing contact 1970A1 by way of contacts 1920A6 and prevent it from operating the connector 400B on the fourth repeated digit. At contacts 2115C4 it completes its holding circuit as follows: battery, winding of relay 2115C, contacts 2115C4 to ground on conductor 2013B. At contacts 2115C6 the pulsing circuit to step the storer 2190C is prepared and will be completed when relay 2020B is operated on the last digit as follows: battery, stepping magnet of the storer 2190C, contacts 2155C4, contacts 2115C6, conductor 2016B, contacts 2020B2 (pulsed by relay 2020B), contacts 2010B1, conductor 2017B, contacts 1920A5 to ground on conductor 2013B. As the storer stepping magnet is pulsed at contacts 2020B2 to step storer 2190C as before described, cam 2191C and the associated lower large cam are moved to a corresponding position and cam contacts 2190C1, 2190C2 and 2190C3 are closed. At the end of the dialling of the last or stored digit, relay 2040B again falls back to complete a circuit for relay 2155C as follows: battery, winding of relay 2155C, contact 2190C1, conductor 2194C, contact 2040B6 to ground on conductor 2013B. At contacts 2190C2 a circuit is also prepared to operated relay 2145C. At contacts 2190C3 a release circuit is prepared similar to the one prepared by 1590C3 in repeater 1300D already described. Relay 2155C closes contacts 2155C1, 2155C2, 2155C3, 2155C5 and opens the stepping circuit to the storer stepping magnet at contacts 2155C4. Contacts 2155C1 and 2155C2 connect trunk 986 from the DLR operator across polar relay 2135C and to trunk 35. Contacts 2155C5 prepare a circuit for operating relay 2165C whose function and operation is the same as previously discussed relay 1565C of repeater 1300D.

Bridging the polar relay 2135C across the DLR trunk 986 causes the DLR operator to be signalled as previously described. In the same manner as previously described the DLR operator converses with the calling party and tickets the call and by reversing battery operates polar relay 2135 which opens contact 2135C2 in the circuit to relay 2165C and closes contact 2135C1 which operates relay 2145C. Relay 2145C closes contacts 2145C1, 2145C9, 2145C8, 2145C4, 2145C6 and 2145C3. Relay 1910A now operates as follows: ground, contacts 2145C4, conductor 2187C, winding of relay 1910A to battery and reverses battery on the trunk 32A and 33A to thereby operate relay 1450B of repeater 1300D which in turn operates relay 1310A as already described to reverse battery on trunk 5 to thereby operate relay 1150B which in turn operates relay 1010A and 1020A in repeater 1000D which causes relay 1110B to be placed across the line to test for paystation tone in a manner previously described. Relay 1320A in repeater 1300D also operated but to no purpose. Relay 2145C holds over a circuit including contacts 2190C2 and 2145C3. Release magnet of the storer 2190C is operated from contacts 2145C6 and the last digit stored in the storer 2190C is sent over the trunk to cause the connector to ring the called party by contacts 2190C4 being actuated by the lobes on cam 2191C as it returns to normal; the pulsing circuit over trunk 35 including contacts 2165C, 2110C2, 2145C1, and 2190C4. Contacts 2145C8 and 2145C9 connect the upper winding of relay 2010B to DLR trunk 986 to no purpose as this gives paystation tone only if an A exchange paystation subscriber is calling.

When the called party answers battery is reversed on trunk 35 in the well-known manner to operate polar relay 2050B which closes contacts 2050B1 to operate relay 1910A. Relay 1910A opens contacts 1910A8 to again place resistor 2186C across DLR trunk 986 and signal the operator that the call has been answered and that timing can begin. Battery is reversed on the trunks 32A, 33A and 5 to again operate relays 1450B, 1310A, 1320A, 1150B, 1010A and 1020A in repeaters 1300B and 1000D. The DLR operator on a call going past exchange A from exchange D will always be signalled from repeater 1900B in exchange A to thereby reduce the number of trunks between exchanges.

*Non-metered call from D to C*

A call from a subscriber in exchange D to a subscriber in exchange C is initiated by dialling the prefix digits 999 and then the called subscriber's number. The dialling of the first two digits 99 results in the seizure of an incoming selector 600B at exchange B exactly as on call to a subscriber in exchange B. The outgoing repeater 1900B at exchange A is also seized and the previously described relays 1970A, 2000B, 2010B, 2133C and 2010C and related contacts operate on seizure including of course match pulser 800. However the dialling of the third prefix digit 9 results in the incoming selector 600B at exchange B being stepped over trunk 35 to its ninth level where it seizes repeater 1600B over trunk 43B to operate relays 1670A, 1700B, 1800C and 1810C which operate as their like suffixed number relays in repeaters 1000D and 1900B in exchange D and A respectively to in turn seize incoming selector 600C′ over trunk 55 normally extended through repeater 1000C in exchange C. Relay 1250C in repeater 1000C operates as described for repeater 1000B to prevent seizure of this repeater by other selector switches.

Incoming selector 600B is also a four wiper selector of which wiper 617, corresponding to an EC wiper of the local selectors, forwards a ground in selector 600B over EC lead 1687A in repeater 1600B, contacts 1810C8, conductor 1964B, contacts 1765B1, winding of relay 1775B to battery. Relay 1775B operates and opens contacts 1775B1 and 1775B2. Opening of contacts 1775B1 prevents operation of relay 1765B and opening of contacts 1775B2 prevents metering operation from repeater 1600B. Relay 1775 will operate whenever repeater 1600B is seized by an incoming selector 600B. Since relay 1765B is not operated the minor switch MS 1790B and storer 1890C is not used on a call when repeater 1600B is seized by an incoming selector such as 600B.

The circuit for operating relay 1670A is as follows: battery, upper winding of relay 1670A, conductor 1674A, repeating coil 1705, conductor 1602, contacts 1610A1, —line of trunk 43B looped through incoming selector 600B, —line of trunk 35 normally extending through repeater 1000B including contacts 1210C1 in repeater 1000B, contacts 2165C2, 2010C2, 2145C2 in repeater 1900B, conductor 2007B, contacts 1970A1, conductor 2008B, coil 2011B, resistor 2053B, left winding of polar relay 2050B, coil 2022B, conductor 2024B, contacts 2010C4, +line of trunk 35 normally extended through repeater 1000B including contacts 1210C3 back through incoming selector 600B and trunk 43B, contacts 1610A3, conductor 1601, coil 1706B, conductor 1675A, lower winding of relay 1670A to ground.

Simultaneously with the dialling of the third prefix number 9, MS 2061B in repeater 1900B is stepped to its ninth position as relay 2020B pulsed the previously described stepping circuit for MS 2061B. MS 2090B is stepped to its first position as previously described by relay 2040B and relay 2153C again operates as has been described. The cams of matched pulser 800 are rotating as described and as relay 2153C had closed contacts 2153C6, a DR1 pulse from contacts 806 operates relay 2103C to allow a DR3C pulse to be sent as contacts 2103C2 now would be closed. A DR3C pulse is sent this time for operating relay 2123C using contacts 804 and lead 811 of cable 856 and the ninth contact and wiper of the C bank of MS 2061B. Relay 2113C operates shortly thereafter on the DR2 pulse from contacts 803 as previously described. Relay 2123C at contacts 2123C2 again prepares a circuit for operating relay 2115C, which however does not operate until MS 2090B is stepped to its fourth position by the called subscribers third digit. The circuit for operating 2115C would be the same as described on a call to exchange B except the wiper of MS 2090B would be in its fourth position and the wiper of MS 2061B would be in its ninth position.

After the dialling of the third digit of the called subscriber's number the relay 2115C is operated to prepare the circuit for the operation of the storer 2190C and on dialling of the fourth digit of the called party's number the storer 2190C is stepped to a position corresponding to the dialled fourth digit. Relay 2155C operates as before described to connect the trunk 986 across the polar relay 2135C and to trunk 35 and the same sequence of operations as described on a non-metered call from exchange D to B may now take place as the DLR operator tests for pay-station tone, converses with the calling party, releases the stored digit as previously described to operate connector 400C to ring the called party and ticket the call and otherwise performs her supervisory duties.

The stepping magnets of MS 1790B and storer 1890C in repeater 1600B would not be operated as no ground is forwarded to complete a circuit for relay 1765B to in turn complete a circuit to the stepping magnet of MS 1790B which must operate before storer 1890C can operate. Relays 1670A, 1700B, 1720B, 1730B, 1740B, 1800C, 1810C, operate as do their like suffixed relays in repeater 1000D already described and relays 1750B, 1610A and 1620A operate to reverse battery on the trunk on answer by the called party in a similar manner.

*A non-metered call from exchange A*

A non-metered DLR subscriber at exchange A on a call to any other exchange forwards ground through the finder selector link to EC lead 1985A from the subscriber's line circuit 10A in the same manner as a non-metered call from subscriber's line circuit 1D in exchange D as shown in Figures 6 and 6*a*. As there are a number of classes of subscribers at exchange A who receive DLR service this will be the first type discussed. A call to either exchange D or B from exchange A steps the local selector 600A to seize an idle repeater 1900D or 1900B on the dialling of the prefix number 8 or 9 respectively, in the same manner as an idle repeater 1000D is seized on a call from exchange D and the local metering circuit 690A is disabled in a manner similar to that previously described on a non-metered call from exchange D. Dialling of the prefix number 8 connects the calling subscriber to a repeater 1900D having a trunk 5 connected to an incoming selector 600D′ through repeater 1000D. The dialling of the prefix number 9 connects the subscriber to a repeater 1900B having a trunk 35 connected to an incoming selector 600B through repeater 1000B at exchange B. Relay 1250C in either repeater 1000D or 1000B operates on seizure as previously described to busy these repeaters. Relays 1970A, 2000B, 2110C and 2010B are operated on seizure of either repeater 1900B or 1900D in the manner previously discussed for their corresponding suffix number relays 1070A, 1100B, and 1210C and repeater 1000D. Relay 2133C operates as disclosed in the discussion of the seizure of repeater 1900B. Relay 2133C again closes contacts 2133C1 for no purpose in this operation but relay 827 of match pulser 800 operates from ground at contacts 2000B as before to cause motor 825 to rotate the cams 800. Relays 2075B does not operate this time as ground was not forwarded on C lead 1506C.

On dialling of the first digit of the called subscriber's number, the incoming selector at either exchange D or B is stepped to one of its first seven levels in a manner previously described to seize a connector 400D, if the call is to exchange D or 400B if the call is to exchange B. Relays 2020B, 2030B and 2040B operate as before described to step MS 2090B to its first position and MS 2061B to one of its first seven bank contacts. When contacts 2040B6 are closed at the end of the first dialled digit of the called subscriber's number the previously described circuit for operating relay 2153C is completed. This time when relay 2153C closes contact 2153C1 it forwards ground from the subscriber's line on the EC lead 1985A to the upper left winding of relay 2123C which does not operate yet. It also closes contacts 2153C6 and 2153C2 to allow a DR1 ground pulse over lead 809 to operate relay 2103C which in turn allows a ground pulse to be sent a moment later when either contacts 804 or contacts 802 close. Contacts 804 and lead 811 of cable 856 are used only with repeater 1900B while contacts 802 and lead 813 of cable 855 are used only with repeater 1900D. If exchange D is called and therefore repeater 1900D is used, leads 814, 811, and 810 and cable 856 from contacts 801, 804 and 805 respectively are not used and only leads 809 (for the DR1 pulse), 813 for a DR3D pulse and 812 for a DR2 pulse are used. The latter leads are shown cabled together in cable 855. The starting operation is the same. In repeater 1900D and DR3D pulse is sent after the DR1 pulse has operated relay 2103C over the following circuit: ground, cam contacts 802, DR3D conductor 813 of cable 855 directly connected to contacts 2153C2, contacts 2103C to the upper right winding of relay 2123C to battery which now operates. Shortly thereafter the DR2D pulse is sent over lead 812 and cable 855 to operate relay 2113 as has been described. The dialling of the second and third digits steps MS 2090B and the connector in the desired exchange and when MS 2090B reaches its third position a previously described circuit to relay 2115C is completed so that the fourth digit may be stored and the DLR operator signalled. After the DLR operator secures the desired information she may release the stored digit to operate the connector and ring the called party all in a manner previously described.

In the case of the call to exchange B using repeater 1900B cable 856 is used to complete similar circuits from match pulser 800 as on a DLR call from exchange D to exchange B to operate relay 2123C. Relay 2103C operates as before from the DR1 pulse and prepares a circuit for the ground pulse from the DR3B lead. A pulse over the previously described DR3B lead 810 now operates relay 2123C. Relay 2113C operates as cam contacts 803 close as has been described, and it breaks the holding circuit for relay 2103C. It will be noticed that in repeater 1900B relay 2123C is operated by the combination of ground on EC lead 1985A and the DR3B pulse over previously described circuit. On a call through repeater 1900D to exchange D however, relay 2123C is operated by the combination of ground on EC lead 1985A and the DR3D lead 813 connected to repeater 1900D only. The DR3B and DR3C leads connected to repeater 1900B and the third bank of MS 2061B are necessary to give DLR service to exchanges B or C for different types of subscribers at exchange A in a manner to be explained.

After relay 2123C in either repeater 1900B or 1900D on a call to exchange B or D respectively operates similar circuits for signalling the DLR operator are completed after dialling of the second and third digits operates the respective connector and the fourth digit is stored. The DLR operator may then secure information and release the stored digit to complete the connection all as has been described.

A non-metered call from a subscriber in A to a subscriber in C is prefixed by the digits 99. The stepping of the selector 600A on dialling of the first prefix digit 9 connects it to a repeater 1900B to the group having trunks to exchange B. The rest of the call proceeds through repeaters 1900B and 1000B to operate selector 600B, repeater 1600B, repeater 1000C, selector 600C' and connector 400C in a manner similar to a call from exchange D to C. In this case relay 2123C in repeater 1900B is operated by the ground on EC lead 1985A and ground on the DR3C lead over the ninth bank contact and wiper of the C bank of MS 2061B directly connected to contacts 2153C2 and contacts 2103C2. At the time MS 2090B is on its third contact after the dialling of the second digit of the called subscriber's number, no circuits are completed as the A banks of MS 2061B is in its ninth position and it is only after the dialling of the third digit of the called party's number that MS 2090B is in its fourth position and the connector 400C has connected to the called party's line that relay 2115C is operated to prepare the circuit to storer 2190C. The storer 2190C now stores the fourth digit of the called number while MS 2090B is stepped to its fifth position where no circuits are completed. The DLR operator is then signalled as described and the call completed as previously described on release of the stored digit after the operator secures necessary information.

One of the previously mentioned types of subscribers 22A in exchange A receives DLR service on a call to exchange B and metered service on a call to exchange D or C; some subscribers 21A receive DLR service only on a call to exchange C and metered service to the other exchanges; and still other lines 23A receive DLR service on calls to B and C only and metered service to the remaining exchanges. Any of these last types of subscribers get metered service on calls to exchange D as the repeater 1900D used for calls to exchange D has the DR3D lead connected to it, which will operate relay 2123C only when a ground is maintained in the subscriber's line circuit and forwarded over EC lead 1985A as intermittent grounds such as forwarded over the 810, 811 or 814 leads of pulser 800 will not match the ground pulse on the DR3D lead 812, thereby leaving relay 2123C unoperated and resulting in metered service in a manner to be explained.

Calls by any of the last three types of subscribers to exchange B or C causes seizure of repeater 1900B and operation of the following relays: relays 1970A, 2000B, 2133C, 2110C and relay 827 of pulser 800 to start motor 825 to rotate the cams as before on seizure. Relays 2020B and 2040B operate as before on dialling through repeater 1900B. At the end of the first digit dialled through repeater 1900B, relay 2153C operates as before described to close contacts 2153C1, 2153C6 and 2153C2. Relay 2103C operates again as a previously described DR1 pulse is sent from pulser 800. This time, when contacts 2153C1 are closed, ground is forwarded on EC conductor 1985A only if this conductor is connected back through selector 600A, local metering circuit 600A, finder 12A to one of the DR3B, DR3C or DR3BC leads (which connection will be made in the subscriber's line circuit). The DR3BC lead 814 will be connected from the contacts of cam 801 of match pulser 800 in multiple to those subscriber's lines 23A securing DLR service to exchanges B and C only. This lead is arranged to send two ground pulses from contacts 801. One ground pulse is sent simultaneously with a DR3B pulse and the other ground pulse simultaneously with the DR3C pulse so that whether the first to seventh bank contacts or the ninth contact of MS 2061B is used, a matched pulse is sent through the subscriber's line 23A through the finder 12A, local metering circuit 690A, selector 600A, and wiper 607, lead 1985A, contacts 2153C1, upper left winding of relay 2123C to battery. In the meantime a simultaneous ground pulse is sent over the DR3B lead 810 or DR3C lead 811 both of cable 856 which will be connected to either the first through seventh contact or the ninth contact respectively of the C bank of 2061B in repeater 1900B. If MS 2061B is in its first through seventh position a ground pulse is sent to the upper left winding of relay 2123C over a circuit previously described which matches the first pulse of DR3BC sent through the subscriber's line. If MS 2061B is in the ninth position as on a call to exchange C, relay 2123C will receive its matched pulse from the second ground placed on the DR3CB lead 814 through the subscriber's line 23A over EC lead 1985A and ground placed on lead 811 and the ninth contact of MS 2061B by cam contacts 804. This matched pulse will operate relay 2123C if the call is to either exchanges B or C so that it will set in motion the previously described operations for signalling DLR operator and storing the last digit to be released by the DLR operator to complete the call. The repeater 1900D having a trunk to exchange D does not have the B or C banks of MS 2061B or the DR3B or DR3C leads 810 or 811 connected thereto but has only the DR3D lead 813 and therefore this type of subscriber on a call to exchange D receives metered service which will be described later.

If a subscriber 22A at exchange A who is to get DLR service only on a call to exchange B dials the prefix number 9 to seize the repeater 1900B and then dials the next digit, which is any digit from one through seven inclusive he advances MS 2061B to a similar position over a circuit already described. Contacts 2153C1 complete the following circuit: ground, contacts of cam 805, DR3B conductor 810, subscriber's line 22A through the finder 12A, local metering circuit 600A, and wiper 607 of selector 600A, EC lead 1985A, contact 2103C1, contact 2113C1, contact 2153C1, upper left winding of relay 2123C to battery. Simultaneously the following circuit is completed: ground, contacts of cam 805, DR3B lead 810, contacts and wiper of MS 2061B in its first through seventh position, contact 2153C2, contact 2103C2, upper right winding of relay 2123C to battery. The matched pulse will thus operate relay 2123C so that the previously described DLR sequence of operations consisting of storing of the last digit of the called party's number, signalling of the DLR operator, release of the stored digit to ring the called party and ticketing of the call will be completed.

A subscriber with line circuit 21A in exchange A having DLR service to exchange C only, on dialling the second prefix number 9 steps MS 2061 to its ninth contact to complete the same circuits for operating relay 2123C except that the DR3C lead 811 and contacts 804 are used. It is impossible for such a subscriber to get DLR service to exchange B as the DR3C lead is connected to contacts 1—7 of MS 2061 thereby preventing the occurrence of a simultaneous or matched ground pulse for operating relay 2123C without which operation, signalling of the DLR operator, storing of the fourth digit of the called party's number and other DLR service cannot take place.

A subscriber 23A receiving DLR service to both exchanges B and C has the DR3CB lead 814 (whose cam 801 closes contacts simultaneously with either the cam 805 or 804) connected to the line circuit so that ground is placed on EC lead 1985A simultaneously with the closure of either contacts 805 or 804. The simultaneous matched or ground pulse is extended to operate relay 2123C whether MS 2061 is in its first through seventh position or ninth position. Afterwards the last digit of the called party's number is stored and the DLR operator signalled and the digit released to complete the connection all as previously described.

None of these last types of subscribers may make DLR calls to exchange D because relay 2123C in repeater 1900D does not operate when the ground pulse passing through the line circuit of any such subscriber and over the EC lead 1985A is not matched with a ground pulse over DR3D lead 813. Thus the pulse over DR3D lead 813 can operate relay 2123C in the repeater 1900D having a trunk 5 to exchange D only if the EC lead 1985A is maintained grounded in the line circuit as in the case of subscriber 10A.

*A non-metered call from exchange B*

A subscriber with line circuit 49B at exchange B on calling a subscriber at exchange A dials the prefix digit 0 to step the local selector 600B' at exchange B to its tenth level to seize repeater 1000B in the same manner as a subscriber at exchange D seizes repeater 1000D. The B exchange non-metered subscriber 49B has a ground in his line circuit which is forwarded through the four wiper finder 42B, the local metering circuit 690B and selector 600B. On seizure of repeater 1000B the trunk 35 is switched through to seize the incoming repeater 1300 B at exchange A in the same manner as a subscriber at exchange D connects to repeater 1300D and a ground pulse is sent at the end of the dialling of the next digit to operate the differential relay 1380A in exactly the same manner as previously described on a non-metered call from exchange A. Repeater 1900B can not be seized by a selector in exchange A as relay 2150C operates as previously described to remove battery from C lead 1987A. Seizure of repeater 1300B in turn results in seizure of the incoming selector 600A'' over trunk 27A at exchange A. The dialling of the first digit of the subscriber's number then results in exactly the same sequence of operation as a call from a subscriber in exchange D to a subscriber in exchange A; a detailed description of which has already been made.

A subscriber 49B at exchange B on calling a subscriber at exchange D dials the prefix digits 88; the dialling of the first digit 8 stepping the local selector 600B' to its eighth level to seize repeater 1000B which in turn seizes repeater 1300B and its associated incoming selector 600A'' exactly as described for the above. Dialling of the second prefix digit 8 causes the incoming selector 600A'' at A to be stepped to its eighth level to connect to repeater 1900D which in turn seizes the incoming selector 600D' at exchange D in a manner already described on seizure of repeater 1900D on a call to exchange D from exchange A. This subscriber being non-metered has forwarded ground over the EC lead 1085A to operate relay 1170B which in turn has operated the differential relay 1380A in repeater 1300B and relay 1525C in the same manner as had been described previously at the end of the second digit on a call from exchange D to exchange B. This in turn results in the forwarding of ground from repeater 1300B to operate relay 2075B repeater 1900D in exactly the same manner as a non-metered call from exchange D to exchange B had operated relay 2075B in repeater 1900B and to complete the call as described in a call from exchange D to B with the exception that the DR3D lead 813 is used for operating relay 2123C in repeater 1900D instead of the DR3B or DR3C leads 809 or 810 used in the repeater 1900B on a call to exchange B.

A non-metered call from exchange B to exchange C presents a slightly different arrangement. The prefix digit 9 is dialled to operate the local selector 600B' to connect to repeater 1600B. Repeater 1600B is seized in a manner similar to other repeaters and relays 1670A and 1700B operate as previously described on the seizure of repeater 1600B. Relays 1800C and 1810C also operate as follows: ground on conductor 1713B, windings of relays 1800C and 1810C to battery. Relay 1800C removes battery at contact 1800C2 from the C lead 1686A to prevent the repeater from being seized by another selector. Relay 1810C closes contacts 1810C2 and 1810C4 to seize trunk 55 to repeater 1000C in exchange C and an incoming selector 600C' at exchange C in the previously described manner. Closing of contact 1810C8 has no effect in this operation as the repeater 1600B was seized by a local selector 600B' and not an incoming selector 600B. Contacts 1810C6 on opening prevent release magnet of MS 1790B from operating. Contacts 1810C7 on closing forwards ground from the subscribers line 49B to operate relay 1765B as follows: ground in subscriber's line circuit 49B, extended through the finder 42B, local metering circuit 690B, local selector 600B' and wiper 607, EC lead 1685A, contact 1810C7, contacts 1775B1, winding of relay 1765B to battery. Relay 1765B operates and opens contacts 1765B1 for no purpose as lead 1687A is not connected and closes contacts 1765B2 to prepare a circuit for the stepping magnet of MS 1790B. Relay 1765B also opens contacts 1765B3 to prevent metering.

The dialling of the first digit of the called subscriber's number operates relay 1720B, 1730B and 1740B in a manner previously discussed for correspondingly suffixed relays. Relay 1740B operates the stepping magnet of MS 1790B over the following circuit: ground on conductor 1713B, contacts 1740B7, contacts 1765B2, conductor 1743B3, contacts 1875C9, conductor 1744B, stepping magnet of MS 1790B to battery. Simultaneously with the dialling, the incoming selector 600C' is stepped and seizes a connector 400C. Dialling continues and the second and third digits of the subscriber's number operate the connector 400C while MS 1790B is stepped from its second to its third position on the dialling of the third digit of the subscriber's number and as relay 1740B releases at the end of the third digit a circuit is completed as follows: battery, winding of relay 1875C, contacts 1875C5, conductor 1809C, wiper of MS 1790B in its third position, contacts 1840B6, to ground on conductor 1713B. Relay 1875C operates and closes the following contacts: 1875C1, 1875C2, and 1875C3 which perform functions of the same nature as similarly suffixed contacts in other repeaters as described namely preventing pulses from being sent over trunk 55 on the last digit and preparing the talking circuit to the DLR operator. Contacts 1875C7 on closing prepare a circuit to test for an idle control trunk 985 to the DLR operator and at contacts 1875C8 completes the test circuit to operate relay 1885C which will be described in connection with the test for an idle trunk. Contacts 1875C4 on closing hold relay 1875C operated as follows: battery, winding of relay 1875C, contacts 1875C4, to ground on conductor 1713B. Opening of contacts 1875C9 breaks the stepping circuit to the stepping magnet MS 1790B. If the C wiper of the rotary switch 1895C is connected to a busy trunk C lead a circuit will be completed as follows: ground, contact 1885C2 (in any other busy repeater either 1600B or 2200B using a trunk 985 to the DLR operator in exchange A), contact 1875C7 (in the repeater using trunk 985), C bank contact and wiper of rotary switch 1895C, contacts 1875C7, contacts 1885C1, contacts 1895C1, stepping magnet of rotary switch 1895C to battery. This ground on the busy trunk also short circuits switching relay 1885C to ground at contacts 1875C8 to prevent operation of relay 1885C as long as the C wiper engages grounded bank contacts of busy trunks. The stepping magnet operates in series with interrupted contacts 1895C1 to step rotary switch 1895C until it encounters a trunk 985 which has not been grounded in another repeater. On encountering an open circuit or an ungrounded trunk the stepping magnet of rotary switch 1895C halts operation. High resistance relay 1885C now operates in series with magnet 1895C as follows: battery, stepping magnet of rotary switch 1895C, self-interrupting contacts 1895C4, winding of relay 1885C, contacts 1875C8 to ground. Due to the high resistance of relay 1885C the magnet 1895C is not operated. Relay 1885C closes contacts 1885C2, 1885C3 and 1885C4. Contacts 1885C2 on closing busies the trunk by grounding the C lead over the C wiper. Contacts 1885C3 and 1885C4 prepare to connect the DLR trunk 985 across polar relay 1835C and to the talking circuit. The DLR operator is not signalled however until relay 1855C is operated, which is after the stepping magnet of storer 1890C is stepped on the fourth digit of the subscriber's number over the following circuit: ground, contacts 1720B2, conductor 1711C, contact 1875C6, contacts 1855C4, stepping magnet of storer 1890C, to battery. Relay 1855C operates when cam springs 1890C1 operate as previously described for other similarly suffixed relays and at contacts 1885C2 completes a circuit over the control trunk 985 to signal the DLR operator who may then converse with the calling party to secure the desired information and reverses battery to operate relay 1835C which in turn operates relay 1845C over contacts 1835C1 and 1890C2. Relay 1845C completes an obvious circuit to the release magnet of storer 1890C at contacts 1845C6 and storer 1890C releases the stored digit which in turn causes the connector to ring the called party all in a manner already described.

*Non-metered call from a subscriber in exchange C*

A non-metered subscriber with line circuit 51C in exchange C dials the prefix number 9 to reach a subscriber in exchange B. This raises the local selector 600C in exchange C to its ninth level to seize repeater 1000C to in turn seize repeater 2200B over trunk 55 normally extended through repeater 1600B at contacts 1810C1 and 1810C3 in a similar manner to that previously described. Relays 2270A, 2300B, operate in a manner similar to that described for like suffixed relays in the other repeaters. The dialling of first digit of the subscriber's number operates relays 2320B, 2330B and 2340B as has been described for correspondingly suffixed numbered relays in other repeaters while simultaneously stepping incoming selector 600B′ to one of its first seven levels to seize connector 400B. The stepping magnet of MS 2390 is energized to step its wipers to its first position over the following circuit: battery, stepping magnet of MS 1390B, contacts 2340B8, contacts 2380B1, conductor 2317B, contacts 2220A5, to ground on conductor 2313B. Stepping magnet of MS 2460C is stepped to a position between its first to seventh contacts over the following circuit: battery, stepping magnet of MS 2460C, contacts 2405C3, conductor 2316B, contacts 2320B2, contacts 2380B1, conductor 2313B, contacts 2020A5 to ground on conductor 2313B. A ground pulse is sent from repeater 1000C as described for repeater 1000D to operate differential relay 2280A in repeater 2200B at the end of the first digit and relay 2280A in turn operates relay 2425C as described for relay 1525C in the operation of repeater 1300D. This is done when relay 1140B in repeater 1000C falls back to close contact 1140B2 and ground one side of trunk 55. This unbalances relay 2280A and it operates as has been described for relay 1380A. Relay 2280A closes contact 2280A1 which completes a circuit for relay 2425C similar to an already described circuit for relay 1525C. Relay 2405C is also operated as described for relay 1505C in the operation of repeater 1300D at the end of the first digit when relay 2340B releases. Relay 2425C prepares a circuit for relay 2415C at contacts 2425C2; closes contacts 2425C1 to forward a ground to selector 600B″ and locks to ground in a manner similar to that previously described for relay 1525C at contacts 2425C3. Relay 2405C locks to ground at contacts 2405C1, breaks the stepping circuit of MS 2460C at contacts 2405C3 and prepares a circuit for relay 2380B at contacts 2405C4 not used in this operation, in a manner similar to that described in the operation of relay 1505C of repeater 1300D.

The dialling of the second and third digits advances MS 2390B to its third position, and when relay 2340B releases a circuit is completed for operating relay 2415C as follows: battery, winding of relay 2415C, contacts 2425C2, contacts 2415C5, first to seventh contacts and wiper of MS 2460C, conductor 2407C, third contact and wiper of MS 2390B, contacts 2340B7, contacts 2380B1, conductor 2317B, contacts 2220A5 to ground on conductor 2313B. The connector 400B is simultaneously operated on the dialling of the second and third digit of the called party's number for connecting to the called party's line.

Relay 2415C locks operated as follows: battery, winding of relay 2415C, contacts 2425C2, contacts 2415C4 to ground on conductor 2313B. Relay 2415C closes contacts 2415C1, 2415C2 and 2415C3 the first of which prevents the last digit from being sent to operate connector 400B and the last two contacts connect the talking circuit in a manner previously described. It also closes contacts 2415C6 to prepare a pulsing circuit to storer 2490C to store the last digit while at contacts 2415C7 and 2415C8 it closes contacts for operating rotary switch 2495C and testing for an idle trunk 985 to the DLR operator.

Contacts 2415C7 and 2415C8 complete testing and operating circuits similarly to contacts 1875C7 and 2415C8 in repeater 1600B which have been described. Closure of contacts 2415C7 completes an energizing circuit for the stepping magnet of switch 2495C if the C lead is grounded in a busy trunk and it steps the switch 2495C in a self-interrupted manner. Relay 2485C is across the C lead of switch 2495C and when an ungrounded idle trunk 985 is encountered it operates in the same manner as previously described for relay 1885C4 closes contacts 2485C2 to place itself in series with the stepping magnet of switch 2495C and thereby halt the stepping operation as explained in the operation of switch 1895C in repeater 1600B.

The storer 2490C has in the meantime been stepped on the last digit of the subscriber's number to a corresponding position and relay 2455C operates to connect the talking circuit at contacts 2455C1 and C2 to the trunk 985 extending to the DLR operator in the same manner as relay 1555C in repeater 1300D operated on a call from exchange D to exchange A. The remainder of the DLR operation follows the previously described sequence of operation for repeater 1300D on a DLR call from exchange D to exchange A. That is, relays 2435C, 2445C,, 2210A and 2220A operate in the proper sequence to complete the DLR operation, while relay 2350B operates on answer by the called party to thus complete the already described necessary steps for completing the call.

A subscriber with line circuit 51C at C making a non-metered call to exchange A dials the prefix digits 00. The dialling of the first prefix digit 0 results in the operation of the local selector 600C and the seizure of repeater 2200B and its incoming selector 600B'' in exactly the same manner as a call to a subscriber in exchange B. The dialling of the second prefix digit 0 however raises the selector 600B'' to its tenth level where it seizes outgoing repeater 1000B of exchange B over trunk 44B to in turn seize incoming repeater 1300B of exchange A and its associated incoming selector 600A'' which is stepped to connect to a connector 400A in exchange A on dialling of first digit of the called subscriber's number. In the meantime as the second prefix digit 0 is dialled the stepping magnet of MS 2460C of repeater 2200B is stepped to its tenth position and MS 2390B of repeater 2200B to its first position in a manner described. Immediately after this digit one side of trunk 55 is grounded a relay 1140B releases in a manner previously explained and relay 2280A is operated to in turn operate relay 2425C. Relay 2405C is operated on release of relay 2340B as previously described to open the stepping circuit to the stepping magnet of MS 2460C at contacts 2405C3 and closes at contacts 2405C4, a circuit for operating relay 2380B as follows: battery, winding of relay 2380B, contact 2405C4, wiper of MS 2460C in its tenth position to ground. Relay 2380B on operating breaks the circuit for stepping magnet of MS 2390 at contacts 2380B1 and thus prevent further operation of any relays or switches in this repeater. When relay 2425C operates to close contact 2425C1 ground is now forwarded on lead 2406C through the selector 600B'' to relay 1170B in outgoing repeater 1000B which operates to ground one side of trunk 35 and operate differential relay 1380A in repeater 1300B in a manner as before described for repeaters 1000C and 1000D. As repeater 1000B is seized at the end of the second prefix digit 0 it does not forward ground to repeater 1300B until the first digit of the called subscriber's number has been dialled to step the incoming selector 600A'' at exchange A and relay 1140B in repeater 1000B releases to close contact 1140B2. Repeater 1300B then operates exactly as repeater 1300D on a non-metered call from exchange D to exchange A.

On a call from a subscriber with line circuit 51C in exchange C to a subscriber in exchange D the prefix digits 888 are dialled. The procedure for seizing the incoming selector 600A'' at A at the end of the second prefix digit 8 is as described on a call from exchange C to exchange A and ground is forwarded as before to repeater 1300B, but this time at the end of the third prefix digit 8. MS 2460C in repeater 2200B is stepped only to its eighth contact but since contacts 8, 9 and 10, are multipled together relay 2380B operates as before. The dialling of the third prefix digit 8 now causes the incoming selector 600A'' at A to seize a repeater 1900D having a trunk 5 extending to an incoming selector 600D' at exchange D. At repeater 1300B the dialling of the third prefix digit 8 steps the wiper of 1560C to its eighth contact, which is multipled to contacts 9 and 10 so that relay 1480B is operated as relay 2380B in repeater 2200B to prevent operation of any other relays in this repeater and signalling of the DLR operator proceeds through repeater 1900D as on a call from exchange D to exchange B. Ground is forwarded by relay 1525C in repeater 1300B over lead 1506C to relay 2075B in repeater 1900D as described on a call from exchange D to exchanges B and C and it completes a circuit for the lower windings of relay 2123C at contacts 2075B1. Relay 2123C now is operated by a pulse over the DR3D lead 813 already described and differs in the operation of relay 2123C in repeater 1900B only in the use of a DR3D pulse instead of DR3B pulse. The DLR operator is then signalled from repeater 1900D and the last digit of the subscriber's number stored in storer 2190C and the call completed in a manner already described for repeater 1900D.

*Metered call from exchange D to exchange A*

A metered subscriber at exchange D on making a nearby exchange call seizes repeater 1000D on dialling of the prefix number exactly as described on a non-metered call from exchange D with the exception that the call proceeds from line 8D which does not have a ground for the EC lead.

Line relay 1070A operates as before described to operate relay 1100B which in turn causes relays 1200C and 1210C to operate as has been described in the operation of this repeater. Battery is removed from C lead 1086A to prevent seizure of the repeater by another selector and line relay 1370A in repeater 1300D is seized as previously described over trunk 5 normally extended through repeater 1900D. The operation of relay 1370A in turn results in the operation of relay 1400B as has been described and seizure of the incoming selector 600A'''.

On dialling of the first digit of the subscriber's number relays 1120B, 1130B, 1140B and 1160B in repeater 1000D operate as before described. Relay 1170B does not operate however as EC lead 1085A is not grounded from the subscriber's line circuit. Contacts 1170B3 therefore remain closed while contacts 1170B2 remain open. As contacts 1170B3 are closed a circuit is completed for operating the stepping magnet of MS 1260C as follows: battery, stepping magnet, contact 1240C4, conductor 1143B, contacts 1120B2, contacts 1170B3 to ground. The wiper of MS 1260C is stepped to its first to seventh position as this is the first digit of the called subscriber's number.

Line relay 1370A in repeater 1300D is also pulsed as has been described to operate relays 1420B, 1430B and 1440B as before described and the stepping magnet of MS 1490B rotates its wiper to its first position where a circuit is completed for operating relay 1505C when relay 1440B releases. MS 1560C has its wiper stepped to its first to seventh position as before described and its off-normal springs operated.

The incoming selector 600A''' is raised over trunk 33A to its first to seventh level as previously described by the transmitted pulses of line relay 1370A.

In repeater 1000D at the end of the first digit when relay 1140B releases a circuit is completed for relay 1230 as follows: battery, winding of relay 1230C, contacts 1230C1, bank contacts and wiper of MS 1260C in its first to seventh position, conductor 1142B, contacts 1140B5 to ground on conductor 1113B. Relay 1230C locks to ground as follows: battery, winding of relay 1230C, contacts 1230C2 to ground on conductor 1113B. It also closes contacts 1230C3, 1230C4, 1230C5, 1230C6 and 1230C7 which connect the leads from pulser 700D for metering the calling party as will be described shortly. As the off-normal springs of MS 1260C operated when it had been stepped on the first digit dialled through repeater 1000D another circuit was completed on the release of relay 1140B for operating relay 1240C as follows: battery, winding of relay 1240C, contact 1240C1, off-normal springs, conductor 1142B, contacts 1140B5 to ground on conductor 1113B. Relay 1240C locks to ground as follows: battery, winding of relay 1240C, contacts 1240C2 to ground on conductor 1113B. Relay 1240C also opens contacts 1240C4 to open the circuit for the stepping magnet of MS 1260C and closes contacts 1240C3 for no purpose in the present call to exchange A as MS 1260C is not in its ninth position.

Simultaneously with the release of relay 1140B in repeater 1000D, relay 1440B in repeater 1300D also releases to complete a previously described circuit for operating relay 1505C which as described in a non-metered call from exchange D to exchange A locks to ground and opens the circuit to the stepping magnet of MS 1560C. Relay 1525C is not operated at the end of the dialling of the first digit of the called party's number because differential relay 1380A is not operated. As relay 1525C does not operate circuits are not prepared for the operation of relay 1515C and DLR service is not given on this call.

The dialling of the first digit of the subscriber's number as previously mentioned steps the incoming selector 600A''' to one of its first seven levels where it seizes a connector 400A over trunk 14A in a well-known manner.

The dialling of the second and third digits steps the connector 400A but does not step MS 1260C in repeater 1000D as contacts 1240C4 are open. As relay 1525C in repeater 1300D has not operated, relay 1515C is not operated when MS 1490B reaches its third position, the circuit to the storer 1590C is not completed and the DLR operated is not to be signalled. Dialling of the fourth digit causes the connector to ring the called party and on the called party answering, battery is reversed on trunks 14A and 33A to operate polar relay 1450B in repeater 1300D to in turn operate relay 1310A and 1320A as described previously. Relay 1320A locks operated as previously described for no purpose in the metered operation. Relays suffixed 20A operate whenever the corresponding polar relays 50B and relays suffixed 10A operate but to no purpose on a metered call. Relay 1310A reverse the contacts of trunk 5 to operate polar relay 1150B as described in a non-metered call. Relay 1150B operates to complete the circuit which operates relay 1010A which in turn reverses battery at contacts 1010A1 and 1010A4 operates relay 1020A which locks operated; this sequence occurring as previously described. It should be noted that 1020A operates to no purpose in this operation as the call is a metered call and no need exists to test for a paystation call as in the case of a non-metered call.

The pulser 700D in Fig. 7 has been operating continuously to send either slow or fast pulses depending on the period of day (if P:M on slow pulses; if A:M on fast pulses). The motor magnet operates the cams accordingly. The first circuit which is effectively completed after relay 1010A in repeater 1000D has operated and after answer by the called party in the procedure for charging the calling subscriber is the circuit controlled by pick-up cam contacts 754. This first circuit operates relay 1030A as follows: ground, cam contacts 754, conductor 715 of cable 730D, contacts 1230C7 in repeater 1000D, conductor 715E, contacts 1170B4, conductor 715F, contacts 1010A7, contacts 1030A1, winding of relay 1030A to battery. Relay 1030A operates and locks to ground as follows: battery, winding of relay 1030A, contacts 1030A2 to ground on conductor 1113B. Relay 1030A closes contacts 1030A3, 1030A4, 1030A6 and opens contacts 1030A5. Contacts 1030A3 completes a circuit for operating meter relay 1040A when cam contacts 761 in the pulser 700D are closed. The selection of the particular lead from the cam pulser is predetermined in accordance with the particular charge to be made. Thus as the charge on calls from exchange D to exchange A is two charges per the initial period, the metering relay 1040A in repeater 1000D operates twice for the initial period to apply booster battery to the metered subscriber's meter and thereby charge him twice. Thus cam contacts 761 are closed twice in quick succession to operate metering relay 1040A twice over the following circuit: ground, cam contacts 761, conductor 708 of cable 730A, contacts 1230C6, conductor 708E, contacts 1050A6, contacts 1065A1 of the timer 1065A, contacts 1030A3, winding of relay 1040A to battery. Relay 1040A operates twice in accordance with this predetermined arrangement and closes contacts 1040A1 and opens contacts 1040A2. This removes the ground from the C lead 1086A and places booster battery on the C lead 1086A instead. This booster battery is applied over the C lead through wiper 606 of local selector 600D, over the C conductor through the local metering circuit 690D through the finder 2D, left winding of the differential meter in line 8D to battery. As relay 1040A applies booster battery twice the differential meter operates twice to charge the subscriber twice. The meter closes its contact 681 as it operates and immediately afterwards, as cam contacts 766 close, a circuit is completed to operate the right winding of the meter and thus restore the differential meter quickly. The circuit for the right winding is as follows: ground, cam contacts 766, conductor 703, contacts 681, right winding of meter to battery.

Immediately after cam contacts 761 has transmitted the two ground pulses to operate the meter relay 1040A, cam contacts 756 close and a circuit is completed to start the motor magnet of the timer 1065A as follows: ground, contacts 756, conductor 713 of cable 732D, contacts 1030A6, timer cam contacts 1065A2, motor magnet of the timer 1065A to battery. The motor magnet makes its first step and cam contacts 1065A1 are opened to break the circuit to meter relay 1040A. It also opens contacts 1065A2 to open the original circuit to the motor magnet of 1065A but closes a new one at 1065A3. The new stepping circuit is controlled over a lead from the pulser 700D which in this case is conductor 713 through cable 730D. Cam contacts 756 on closing complete a circuit for stepping the motor magnet of the timer 1065A once per each revolution of the pulser 700D. This circuit is as follows: ground, cam contacts 756, conductor 713 of cable 730D, contacts 1230C4, conductor 713E, contacts 1050A4, contacts 1030A4, timer cam contacts 1065A3, motor magnet of timer 1065A to battery. The timer continues to advance at this predetermined rate as the motor magnet of timer 1065A receives one pulse per every revolution of pulser 700D and as it advances timer cam contacts 1065A5 are closed to apply tone to conductor 1003 of the talking circuit thereby warning the subscriber that a new charge will be made if the call is continued. As the call continues timer cam contact 1065A4 close to complete a circuit to operate overtime relay 1050A as follows: battery, winding of relay 1050A, contacts 1050A1, cam contacts 1065A4, conductor 1064A, contacts 1210C6 to ground. Overtime relay 1050A operates and locks to ground as follows: battery, winding of relay 1050A, contacts 1050A2, conductor 1064A, contacts 1210C6 to ground. Relay 1050A also closes contacts 1050A3 and 1050A5 to connect the predetermined overtime leads from the pulser 700D. As the timer is now returned to its home position cam contacts 1065A3 open and cam contacts 1065A2 and 1065A1 close and a circuit is completed for reoperating metering relay 1040A through the contacts 1065A1. As this is to be one charge for a time period of half the length as the original, conductor 709 of cable 730D, cam contacts 760 of pulser 700D and contacts 1050A5 are used to complete a similar circuit to that previously described for operating metering relay 1040A to in turn operate the meter 680 as before described. As cam contacts 760 close only once before the timer 1065A starts operation there will be only one charge for the overtime period. The timer motor magnet receives its initial energization from cam contacts 756 and conductor 713, as before, but will now be stepped however by cam contacts 757, conductor 712 of cable 730D and contacts 1050A3 over contacts 1230C3, 1050A3, 1030A4 and 1065A3. As contacts 757 close twice as often as contacts 756 the motor magnet of the timer 1065A operates twice as fast to complete the previously described procedure. If the call continues beyond this first overtime period, charges per unit time will be the same as for the first overtime period as the same leads 709 and 708 from the pulser 700D will be used. If the call is discontinued before the timer 1065A is in its home position relay 1030A is released as explained later in the section on release of the equipment to open the circuit to the meter relay and contacts 1030A5 are closed to complete a self-interrupted circuit for returning the timer to its home position. This circuit is as follows: ground, contacts 1030A5, contacts 1065A6, timer cam contacts 1065A3, timer motor magnet to battery. A similar circuit is used in each repeater and local metering circuits whenever a call is discontinued before the timer reaches its home position to step the timer mechanism to its home position.

*Metered call from exchange D to exchange B*

Here again the calling procedure is the same as on a non-metered call for seizing repeater 1000D to in turn seize repeater 1300D in exchange A over trunk 5 which in turn seizes its associated selector 600A''' as has been described. As no ground is forwarded in this case from the metered subscriber's line circuit 8D to the EC lead 1085A, relay 1170B again remains unoperated. The dialling of the second digit 9 of the prefix number 99 raises the incoming selector 600A''' in exchange A to its ninth level where it connects over trunk 32A to repeater 1900B, which in turn seizes incoming selector 600B over trunk 35 normally extended through repeater 1000B.

The dialling of this second prefix number operates to step MS 1560C in repeater 1300D to its ninth position and MS 1490B in repeater 1300D to its first position over the same circuits previously described for stepping them. However, as differential relay 1380A in repeater 1300D is not operated relay 1525C does not operate so that relay 1515C does not operate. Relay 1505C operates as before when MS 1490B reaches its first position and relay 1440B drops back. Relay 1505C opens the circuit to the stepping magnet of MS 1560C at contacts 1505C3 and at 1504C4 completes a circuit described in a non-metered call from exchange D to exchange B for operating relay 1480B, which opens the circuit to the stepping magnet of MS 1490B at contacts 1480B1. As relay 1515C is not operated, the circuits to the storer 1590C and for signalling of the DLR operator are not completed and ringing of the called party on the fourth digit is not interrupted from repeater 1300D.

Due to the fact that relay 1525C in repeater 1300D does not operate ground is not forwarded through selector 600A''' over lead 1506C to repeater 1900B at the end of the dialling of the second prefix digit 9 which has resulted in seizure of repeater 1900B at exchange A and incoming selector 600B at exchange B in a manner previously described for a call from exchange D to exchange B. Relays 2133C and 2110C operate as before described on seizure. The dialling of the first digit of the called party's number being from one to seven is dialled through repeater 1900B as previously described and steps MS 2090B to its first position while MS 2061B is stepped to its first to seventh position each over its respective previously described stepping circuit. Relay 2153C operates as previously described when MS 2090B reaches its first position but as ground is not forwarded over lead 1506C relay 2075B is not operated to open the metering circuit starter lead 715 nor complete a circuit for one side of shunt wound relay 2123C. Therefore although the DR pulses are sent from the match pulser 800, relay 2123C is not operated. As relay 2123C cannot operate contact 2123C2 is not closed and relay 2115C is not operated so that the last digit will not be stored by storer 2190C nor can the DLR operator be signalled from this repeater and the call is completed without interruption.

A metering operation takes place in repeater 1900B, when battery is reversed on the trunk 35 to operate relay 2050B and in turn relay 1910A to start the metering operation. However as booster battery cannot be applied to the subscriber's line circuit 8D to meter the subscriber from repeater 1900B it will have no effect and the metering will proceed from repeater 1000D on completion of the call. This extra metering operation may be eliminated in repeater 1900B in a manner illustrated for repeater 1600B. The manner in which this is done is described on a metered call through repeater 1600B by a subscriber in another exchange and by an operator at exchange A calling through repeater 1900B or D to operate relay 2065B and thereby prevent any metering.

The dialling of the second digit 9 of the prefix number 99 also causes MS 1260C in repeater 1000D to be stepped to its ninth position over the circuit previously described in a metered call from exchange D to exchange A for stepping it. Relay 1240C is operated as described when relay 1140B releases at the end of the second prefix number 9. Relay 1240C locks operated as described, opens the circuit to the stepping magnet of MS 1260C at 1240C4 and prepares a circuit for operating the stepping magnet of MS 1190B. As relay 1230C does not operate (MS 1260C on ninth contact), contacts 1230C3–C7 are not closed and leads 708, 709, 712 and 713 of cable 730D are not used. Instead cable 732D from pulser 700D is used as will be explained in the metering operation.

Contacts 1120B2 are pulsed by the next digit to operate the stepping magnet of MS 1190B over a circuit as follows: battery, stepping magnet of MS 1190B, conductor 1136B, contacts 1220C3, Y conductor, ninth bank contact and wiper of MS 1260C, X conductor, contacts 1240C3, conductor 1143B, pulsing contacts 1120B2, contacts 1170B3 to ground to position the wiper of MS 1190B on a contact corresponding to the first digit of the called subscriber's number (1—7). The incoming selector 600B in exchange B is also stepped to a corresponding position to connect to an idle connector 400B. The dialling of the second, third and fourth digits as mentioned then causes the connector 400B to ring the called party. At the end of the dialling of the first digit of the subscriber's number and after MS 1190B is stepped, relay 1220C operates as follows: battery, winding of relay 1220C, contact 1220C1, conductor 1137B, off-normal springs, contacts 1140B5 to ground on conductor 1113B. Relay 1220C locks operated as follows: battery, winding of relay 1220C, contacts 1220C2 to ground on conductor 1113B. Relay 1220C also opens contacts 1220C3 to prevent further stepping of MS 1190B on dialling of the second and third digits.

On answer by the called party polar relay 1150B in repeater 1000B is operated to reverse battery to cause the sequence of battery reversals in the repeaters in exchange A as described in a non-metered call from exchange D to exchange B to finally operate relays 1010A and 1020A of the present repeater 1000D in exchange D. Relay 1030A in repeater 1000D is operated as before when cam contacts 752 close, except as relay 1220C has operated instead of relay 1230C, contacts 1220C4 are used instead of contacts 1230C7. Relay 1040A is now operated by one of the leads through MS 1190B and cable 732D from the pulser 700D as relay 1230C is not operated to connect the predetermined leads used on a call from exchange D to exchange A. Ground from conductor 707 of cable 732D and cam contacts 762 operates the metering relay 1040A three times to thereby operate the meter three times so that the subscriber will be charged for three units on this call. The circuit for operating relay 1040A is as follows: ground, cam contacts 762, conductor 707 of cable 732D, wiper and contacts of MS 1190B in one of its first to seventh positions, conductor 708E, contacts 1050A6, timer cam contacts 1065A1, contacts 1030A3, winding of relay 1040A to battery. The subscriber is charged three units per unit time on a call to exchange B from exchange D. The timer is stepped initially by cam contacts 756 and lead 713 of cable 732D as before after which the stepping circuit is shifted to the 713 lead of cable 732D connected to the first to seventh contacts of MS 1190B. The motor magnet of the timer 1065A now operates once for every revolution of the pulser 700D so that the subscriber's charge is three units per unit time over the following circuit: ground, pulser cam contacts 756, conductor 713 of cable 732D, bank contacts and wiper of MS 1190B in one of its first to seventh positions, conductor 713E, contacts 1050A4, contacts 1030A4, timer cam contacts 1065A3, motor magnet to battery. Of course the motor magnet has received its first pulse to step the timer from its home position over the 713 lead as previously described. In this arrangement pulses cannot be sent to step the timer after it reaches its home position unless a pulse is sent over the 713 conductor to step timer 1065A from its home position. The timer is stepped initially from its home position in all repeaters over a similar circuit to that described for stepping 1065A initially.

As the call continues beyond the initial period, overtime relay 1050A operates as before and switches the predetermined leads at contacts 1050A3 and 1050A5. Thus metering relay 1040A is now operated twice corresponding to two charges when cam contacts 761 close to complete a circuit as follows: ground, cam contacts 761, conductor 708 of cable 732D, bank contacts and wiper of MS 1190B in one of its first to seventh positions, conductor 709E, contacts 1050A5, timer cam contacts 1065A1, contacts 1030A3, winding of relay 1040A to battery. During the overtime period relay 1040A operates twice before the timer 1065A is stepped from its home position. The timer is stepped over lead 713 as before from its home position and is stepped the rest of the distance over the following circuit: ground, cam contacts 758, conductor 711 of cable 732D, bank contacts and wiper of MS 1190B in one of its first to seventh positions, conductor 712E, contacts 1050A3, contacts 1030A4, timer cam contacts 1065A3, motor magnet to battery. The three cams controlling cam contacts 758 advance the timer 1065A at a rate three times as fast as cam contacts 756 had advanced it at the initial time period to thereby start metering at the overime rate again as soon as the timer returns to home position, if the call is continued. This overtime charge then is two units charge per one-third of a unit time.

*Metered call from exchange D to exchange C*

Calls from exchange D to exchange C are prefixed by the prefix digits 999. Here again the dialling of the first digit 9 results in the seizure of repeater 1000D to in turn seize repeater 1300D and its associated selector 600A''' in exchange A over trunk 5 looped through repeater 1900D in exchange A. The dialling of the second digit 9 of course raises the associated incoming selector 600A''' at exchange A to its ninth level to seize repeater 1900B having a trunk 35 over which incoming selector 600B is seized as the trunk 35 is extended through repeater 1000B in exchange B.

Concurrent wtih the dialling of the second digit 9, MS 1490B in repeater 1300D is stepped to its first position, and MS 1560C in repeater 1300D to its ninth position, both stepped over circuits previously described. Neither operates further as at the end of the digit, relay 1440B on releasing completes a circuit already described for relay 1505C which breaks the stepping circuit for MS 1590C and also operates relay 1480B as has been described to in turn break the stepping circuit for MS 1490B. Relay 1525C is not operated as ground, is not forwarded over EC lead 1085A in repeater 1000D with this class of service to operate relay 1170B and afterwards differential relay 1380A.

In repeater 1000D, MS 1260C is stepped as before to its ninth position on dialling of the second prefix digit 9 where a stepping circuit for MS 1190B is prepared on the operation of the off-normal springs of MS 1260C and when relay 1140B drops back at the end of the digit relay 1240C is operated. Relay 1240C also opens the stepping circuit for MS 1260C. The prepared circuit to step MS 1190B is completed and pulsed by relay 1120B to step MS 1190B to its ninth position on dialling of the third prefix digit 9 over a circuit previously described on a metered call from exchange D to exchange B and when relay 1140B releases at the end of the third digit relay 1220C operates to break the stepping circuit for MS 1190B as has been described.

The dialling of the third prefix digit 9 steps MS 2061B in repeater 1900B to its ninth position over its previously described stepping circuit, while MS 2090B is stepped to its first position. However as ground is not forwarded over the lead 1506C, relay 2123C does not operate for the reasons given on a metered call from exchange D to exchange B. On relay 2040B releasing, as previously described, a circuit for operating relay 2153C is completed. Relay 2153C on operating at the end of the digit breaks the stepping circuit for MS 2061B at contacts 2153C5 to prevent its being stepped on further dialling. Since relay 2123C cannot be operated, the DLR operator will not be signalled from repeater 1900B and the call may be completed without interruption. However, as explained before as neither relay 2065B nor 2075B are operated a metering operation occurs in this repeater on answer by the called party for no purpose as the calling party's meter cannot be charged from here.

On dialling of the third prefix digit 9 incoming selector 600B is raised to its ninth level as previously described to seize repeater 1600B which in turn switches trunk 55 and seizes the incoming selector 600C' over trunk 55 normally extended through repeater 1000C. In repeater 1600B the dialling of the first digit of the subscriber's number after the repeater is seized by the dialling of the third prefix digit 9 does not cause MS 1790B to be stepped as a ground is not forwarded to operate relay 1765B which in turn prepares a circuit for the stepping magnet of MS 1790B. As relay 1765B does not operate, the stepping circuit to MS 1790B cannot be completed and therefore relay 1875C is not operated and the last digit will not be stored at MS 1890C nor can DLR operator be signalled from this repeater. Therefore the call is completed without interruption. As mentioned previously the incoming selector 600B forwards a ground over its third wiper 607, lead 1687A, contacts 1810C8 (closed on operation of relay 1810C on seizure of repeater 1600B), conductor 1764B, contacts 1765B1, winding of relay 1775B to battery. Relay 1775B operates and opens contacts 1775B1 and 1775B2. Contacts 1775B1 open a point in the circuit to relay 1765B but as ground is not forwarded to relay 1765B on this operation it makes no difference. At contacts 1775B2 a point is open in lead 715 from pulser 700B and thereby prevents any metering operation in repeater 1600B whenever it is seized by incoming selector 600B. This relay 1775B and contacts 1775B2 in the metering lead 715 can be provided in any repeater where a secondary metering operation occurs such as repeater 1900B on a call from exchange D to exchanges B or C. It is provided here merely by way of illustration.

Dialling of the first digit of the called subscriber's number steps the incoming selector 600C' at exchange C to seize the connector 400C while MS 2090B in repeater 1900B is stepped at that time to its second position. Further dialling steps both MS 2090B and the connector 400C. A circuit is completed when relay 2040B releases at the end of the third digit of the subscriber's number as MS 2090B is then in its fourth position to operate relay 1990A as follows: battery, winding of relay 1990A, contacts 1990A8, conductor 1992A, ninth contact and wiper of B bank of MS 2061B, contact 2123C3 (as relay 2123C had not operated), wiper and ninth contact of the A bank of MS 2061B, conductor 2091B, fourth contact and wiper of MS 2090B, contacts 2040B6, to ground on conductor 2013B. Relay 1990A operates and prepares predetermined leads for the metering operation, which operation occurs when the called party answers. However when the metering relay 1940A in repeater 1900B operates it places booster battery on the C lead extending only to the incoming selector 600A''' and therefore the subscriber is not metered from this repeater. The metering operation performed by this repeater will be described in a metered call by a subscriber at the A exchange.

The answer by the called party in exchange C causes the connector 400C to reverse battery, which operates the polar relay 1750B of repeater 1600B in exchange B. The intervening tandem exchange repeaters, included in this connection from exchange D to exchange C, each receive reversal of current from the succeeding repeater and repeats the reversal towards the calling exchange until the polar relay 1150B in repeater 1000D in calling exchange D is operated. When polar relay 1150B is operated as has been described it thereby closes a circuit for the operation of relay 1010A to in turn operate relay 1020A. Operation of relay 1010A as before described closes contacts 1010A7 so that relay 1030A will in turn be operated by a pulse from pulser 700D when cam contacts 754 are closed. Relay 1030A again locks to ground over its described locking circuit and closes 1030A3, 1030A4, 1030A6 and opens 1030A5. As relay 1230C has not operated, its associated predetermined leads from cable 730D are not connected and instead the leads from pulser 700D through cable 732D are connected to the ninth contacts of each of the four rows of bank contacts of MS 1190B will be used.

As the charge for a call from exchange D to exchange C is four charges for each unit of time on the initial period, cam contacts 763 and lead 706 of cable 732D is connected to the ninth contact of the fourth bank of MS 1190B and completes a previously described circuit except that cam contacts 763, lead 706 and the ninth contact of MS 1190B are used for operating metering relay 1040A four times to in turn operate the meter 680 four times and charge the calling subscriber accordingly. The timer 1065A is started by the 713 lead connected to contacts 756 in the pulser 700D. As the time period on the initial call is one unit the 713 lead of cable 732D is also connected from the pulser 700D to the ninth contact of the second row of MS 1190B.

On the overtime charge, contacts 760 of the pulser 700D are connected through conductor 709 to the ninth contact and wiper of the third bank of MS 1190B, conductor 709E, contacts 1050A5, 1065A1, 1030A3 to meter relay 1040A to thereby operate the meter relay 1040A once to apply booster battery and operate the subscriber's meter 680 as previously described. The cam contacts 759 are connected through conductor 710 to the ninth contact and wiper of the first bank MS 1190B, conductor 712E, contacts 1050A3, 1030A4, 1065A3 to step the timer 1065A after it has received its initial pulse over lead 713 in a manner described. The timer 1065A is stepped six times as fast as the unit time period as cam contacts 759 close six times per revolution of the cams so that the charge on the overtime period is one unit charge for one-sixth of a unit time period. Of course the timer is initially stepped on the overtime period as before by contacts 756 and lead 713.

*Metered call from exchange A to exchange D*

A metered subscriber with line circuit 20A in exchange A calling a subscriber in exchange D dials the prefix digit 8 to raise his associated selector 600A to its eighth level where repeater 1900D is seized as has been described to in turn seize the incoming selector 600D' at exchange D over trunk 5 normally extended through repeater 1000D.

The dialling of the first digit of the called party's number raises the incoming selector 600D' to the corresponding level. MS 2090B in repeater 1900D is stepped to its first position while MS 2061 in repeater 1900D is rotated to one of its first seven contacts over the circuits previously described for their stepping operation. Relay 2040B on releasing at the end of the digit as described allows contacts 2040B6 to complete the circuit for operating relay 2153C which locks operated and opens the stepping circuit to MS 2061B. It also closes contacts 2153C1 but as the subscriber is a metered subscriber the EC lead 1985A is not grounded and relay 2123C cannot operate when the DR3 pulses are sent and contacts 2123C2 remain open. Contacts 2123C3 may be omitted in repeater 1900D.

As the second and third digits of the subscriber's number are dialled the connector 400D is operated and MS 2090B in repeater 1900D is stepped to its second and third positions, however no circuit is completed as the wiper for the B bank of contacts of MS 2061B is not on its ninth contact. This bank and relay 1990A of this repeater may be eliminated in repeater 1900D having a trunk 5 to exchange D as its purpose is to switch the predetermined leads from pulser 700A depending on whether a call from exchange A is being made to exchange B or exchange C.

On dialling of the fourth digit of the subscriber's number the connector 400D rings the called party while MS 2090B in repeater 1900D is stepped to its fourth position where no circuit is completed. The called party on answering causes connector 400D to reverse battery so that polar relay 2050B operates to close contacts 2050B1 and operate relay 1910A which operates as previously described to operate relay 1920A. Relay 1920A operates to no purpose in a metered operation. This is true of all relays suffixed 20A in a metered operation. Relay 1930A is now operated when ground is forwarded from cam contacts 754, over lead 715, contacts 2165C3, lead 715', contacts 2123C4, 2075B3, 2065B3 and 1910A7 and 1930A1. Relay 1930A locks operated to conductor 2013B at contacts 1930A2 and also closes contacts 1930A3, 1930A4, 1930A6 and opens contacts 1930A5. Contacts 1930A3 prepare a circuit for metering relay 1940A which is completed when contacts 761 in cam pulser 700A close to operate relay 1940A twice over the following circuit: ground, cam contacts 761, conductor 708 of cable 730A (relay 1990A and contacts 1960A1–A7 are omitted in repeater 1900D), contacts 1950A6, contacts 1965A1, contacts 1930A3, winding of relay 1940A to battery.

Shortly thereafter cam contacts 756 in the pulser 700A close to complete a previously described circuit for stepping the timer 1965A from its home position after which it is operated from cam contact 756 over the following circuit: ground, contacts 756, conductor 713 of cable 730A (contacts 1995A5 omitted in repeater 1900D), contacts 1950A4, contacts 1930A4, timer cam contacts 1965A3, motor magnet to battery. After the initial time period is over and the warning tone has been given as before described the overtime relay 1950A operates over 2110C6, conductor 1966A, contacts 1965A4 and 1950A1 and switches the predetermined leads 713 and 708 from pulser 700A at contacts 1950A3 and 1950A5 to the predetermined overtime leads 712 for operating the timer 1065A and 709 for operating the metering relay 1940A.

The metering relay is now operated at the overtime charge of one unit when cam contacts 760 close over lead 709 and a circuit similar to that previously described for the overtime operation of metering relay 1040A to operate metering relay 1940A once. Immediately thereafter the timer 1965A is stepped off as before when cam contacts 756 close and continues to step during the overtime period whenever cam contacts 757 close. It steps at twice the speed as the initial period over the following circuit: ground, cam contacts 757, conductor 712 of cable 730A (contacts 1990A7 omitted in repeater 1900D), contacts 1950A3, contacts 1930A3, timer cam contacts 1965A3, motor magnet to battery. The overtime charge rate is made as long as the call continues every time timer 1965A reaches its home position in a manner similar to that described in the metering operation of repeater 1000D.

Mention should be made of the fact that as none of the combination metered and DLR subscribers 21A, 22A or 23A forward a matched ground over their respective DR3 leads to EC lead 1985A from match pulser 800, relay 2123C in repeater 1900D is not operated and they receive metered service on a call to exchange D exactly as a fully metered subscriber.

*Metered call from exchange A to exchange B*

A metered subscriber with line circuit 20A to reach a subscriber in exchange B dials the prefix digit 9 to connect through the local selector 600A to repeater 1900B over trunk 32A which in turn results in the seizure of incoming selector 600B over trunk 35 normally extended through repeater 1000B as has been described.

The dialling of the first digit of the called subscriber's number results in stepping of incoming selector 600B to any one of its first seven levels in the manner previously described to seize the connector 400B of exchange B. Simultaneously MS 2090B and MS 2061B are each rotated to its first position and to one of the first seven positions respectively over circuits previously described for stepping these switches. As ground is not forwarded over the EC lead the pulses sent over the DR3 leads do not result in operation of relay 2123C so that the storer 2190C is not operated or the DLR operator signalled. Relay 2153C is operated as previously described when relay 2040B drops back at the end of the first digit to break the stepping circuit for MS 2061B at contacts 2153C5.

Dialling of the second, third and fourth digits of the called subscriber's number results in direct connection with the called party, as the connector 400B is operated by the digits sent directly over the trunks. MS 2090B is rotated one step on each digit but completes no circuits in either its second, third or fourth positions as relay 2123C is not operated and MS 2061B is not at its ninth position.

On answer by the called party battery is reversed by the connector on the trunk 35 in any well-known manner to operate polar relay 2050B. Relay 2050B closes contacts 2050B1 to complete a circuit for operating relay 1910A which circuit is similar to the one for operating relay 1010A. Relay 1910A operates relay 1920A. Relay 1910A also closes a circuit to operate relay 1930A. Relay 1930A operates over lead 715 when cam contacts 754 of pulser 700A close as described. Relay 1930A prepares a circuit for the stepping magnet of 1965A and for metering relay 1940A. As the charge per unit time is two units on a call from exchange A to exchange B on the initial time period cam contacts 761 of pulser 700A and lead 708 of cable 732A operate the metering relay 1940A twice before timer 1965A is stepped initially. The circuit over which relay 1940A is operated is as follows: ground, cam contacts 761, conductor 708 of cable 732A, contacts 1990A2 (relay 1990A is operated in repeater 1900B for metered calls to exchange C), contacts 1950A6, timer cam contacts 1965A1, contacts 1930A3, winding of relay 1940A to battery. Relay 1940A applies booster battery twice to a meter associated with the line circuit 20A similar to the meter 680 associated wtih line circuit 8D so that it will charge the subscriber accordingly in the manner previously described.

Cam contacts 756 of pulser 700A close soon thereafter and a previously described circuit is completed for operating the stepping magnet of the timer 1965A. The same contacts are used to step the timer to its home position after its initial step except that the following circuit is used: ground, cam contacts 756, conductor 713 of cable 732A, contacts 1990A5, contacts 1950A4, contacts 1930A4, timer cam contacts 1965A3, stepping magnet of 1965A to battery. As before when timer cam contacts 1965A5 close, a warning tone will be placed on the trunk to warn the calling party that the initial time period will shortly elapse and that he will be charged at the overtime rate. This device is used in the timer operation of all the repeaters where metering occurs.

If the timer 1065A is not in its home position due to the termination of a previous call, it is stepped home in a self-interrupted manner immediately on termination of the call over the following circuit: ground, contacts 1930A5 (relay 1930A releases on termination of the call in a manner to be explained), contacts 1965A6, 1965A3 to the stepping magnet of timer 1965A so that it is always returned to its home position to handle a newly initiated call. The timers in all repeaters operate in this manner.

When timer cam contacts 1965A4 close overtime relay 1950A is operated over the following circuit: battery, winding of relay 1950A, contacts 1950A1, timer cam contacts 1965A4, conductor 1966A, contacts 2010C6 (relay 2010C operated when the repeater was seized as has been described in a non-metered call) to ground. Relay 1950A lock, operated as follows: battery, winding of relay 1950A, contacts 1950A2, conductor 1966A, contacts 2010C6 to ground. Relay 1950A on operating also opens contacts 1950A6 and 1950A4 and closes contacts 1950A5 and 1950A3 which results in using cam contacts 760 to operate the metering relay 1940A once over a circuit similar to its previously described operating circuit while the stepping magnet of timer 1965A is stepped twice as fast as on the initial time period by cam contacts 757 of pulser 700A and lead 712 of cable 732A over a circuit similar to the previously described one for operating the timer. The subscriber is then charged at the overtime rate as long as the call continues.

Another type of metered subscriber should be mentioned. This class of service receives DLR service on a call to exchange C. As this subscriber does not forward a matched ground from matched pulser 800 through its line circuit 21A and over EC lead 1985A to relay 2123C of repeater 1910B on a call to exchange B, a metered operation results, which is exactly the same as on a call by a subscriber with line circuit 20A of the class receiving metered service on all calls.

*Metered call from exchange A to exchange C*

A subscriber with a line circuit such as 20A making a call from exchange A to exchange C dials the prefix digits 99. The first prefix digit 9 results in the seizure of repeater 1900B and incoming selector 600B exactly as on a call to exchange B. On the dialling of the second prefix digit 9 however the selector 600B is stepped to its ninth level where it seizes outgoing repeater 1600B which in turn results in the seizure of incoming selector 600C' at exchange C over trunk 55 normally extended through repeater 1000C as described previously on a call from exchange A to exchange C.

The dialling of the second prefix digit 9 simultaneously results in MS 2061B in repeater 1900B being stepped to its ninth position over its previously described stepping circuit while MS 2090B is stepped to its first position as before described where a circuit is prepared as before for operating relay 2153C. Relay 2153C operating as before at the end of the digit opens the stepping circuit for MS 2061B. As this is a metered subscriber no ground is forwarded over the EC lead 1985A and therefore relay 2123C does not operate and contacts 2123C3 remain closed. The storer 2190C can not be operated or the DLR operator signalled.

The dialling of the first digit of the called party's number results in the incoming selector 600C′ seizing a connector 400C. Simultaneously MS 2090B is stepped to its second position where no circuits are completed.

MS 1790B in repeater 1600B does not operate on the dialling of the first or any other digit as ground is not forwarded to operate relay 1765B which would if operated complete the stepping circuit for MS 1790B at contacts 1765B2. Thus the DLR operator is not signalled from this repeater nor is the storer 1890C operated. Nor does a metered operation occur in this repeater 1600B as has been explained on a metered call from exchange D to exchange C. Incoming selector 600B forwards a ground to operate relay 2075B which opens contacts 2075B2 and prevents any metering in this repeater.

Dialling of the second, third and fourth digits of the called subscriber's number operates the connector 400C to connect to and ring the called party. MS 2090B in repeater 1900B is also stepped to its second, third, fourth and fifth positions. Nothing occurs when MS 2090B is stepped to its second, third and fifth positions, however, in its fourth position, corresponding to the third digit of the called subscriber's number, a circuit is completed for operating relay 1990A when relay 2040B releases as follows: battery, winding of relay 1990A, contacts 1990A8, conductor 1992A to the ninth contact and wiper of the B bank of MS 2061B, contacts 2123C3, wiper and ninth contact of the A bank of MS 2061B, wiper and fourth contact of MS 2090B, contacts 2040B6 to ground on conductor 2013B. Relay 1990A locks operated as follows: battery, winding of relay 1990A, contacts 1990A9 to ground on conductor 2013B.

Relay 1990A connects the predetermined leads of cable 732A from pulser 700A at contacts 1990A1–1990A6 to be used on a call from exchange A to exchange C so that the calling subscriber is charged at the appropriate rate.

As previously described when the called party answers, battery is reversed to operate 1750B of repeater 1600B which operates relay 1610A as has been described. Relay 1610A reverses battery to operate relay 2050B of repeater 1900B which in turn operates relay 1910A.

In repeater 1900B, relays 1920A, 1930A, 1940A, 1950A and timer 1965A are operated as before with the exception that as the charge rate is three units charge per unit time on the initial time period metering relay 1940A is operated over conductor 707 of cable 732A, contacts 1990A1, 1950A6, 1965A1 and 1930A3 when cam contacts 762 of pulser 700A close. The timer 1965A is stepped initially when cam contacts 756 close and over the previously described stepping circuit using cam contacts 756. On the overtime period metering relay 1940A is operated twice over conductor 708, contacts 1990A3, 1950A5, 1965A1 and 1930A3 when cam contacts 761 close while the timer 1965A is stepped three times as fast over conductor 711, contacts 1990A6, 1950A3, 1930A4, 1965A3 as during the initial period when contacts 758 close after it again receives its initial step from contacts 756.

It is to be noted that a combination DLR subscriber with a line circuit such as 22A, who is a DLR subscriber on calls to exchange B, receives metered service on a call to exchange C as a matched ground is not sent from the match pulser 800 through line circuit 22A and over the EC lead 1985A to operate relay 2123C or repeater 1900B on calls to exchange C.

*Metered calls from exchange B to exchange C*

On a call from a metered subscriber with a line circuit such as 41B to a subcsriber in exchange C the called C subscriber's number is prefixed by the digit 9. The dialling of the prefix digit 9 results in raising the local selector 600B′ to its ninth level where repeater 1600B is seized which would in turn result in the seizure of the incoming selector 600C′ at exchange C over trunk 55 normally extended through repeater 1000C.

The dialling of the first digit of the called party's number causes the selector 600C′ to be raised to one of its first levels where it connects to a connector such as connector 400C. The MS 1790B switch in repeater 1600B is not stepped as ground is not forwarded by a metered subscriber over the EC lead 1685A to operate relay 1765B. Since the MS 1790B switch is not stepped the DLR operator is not signalled nor is the storer 1890C operated. Neither is ground forwarded from local selector 600B′ to operate relay 2075B.

Dialling of the second, third and fourth digits of the called party's number then operates the connector 400C to ring the called party, who on answering causes the operation of relay 1750B by reversing battery over the trunks as previously described. Operation of relay 1750B causes the operation of relay 1610A and in turn relay 1620A over circuits similar to the ones over which their similarly suffixed relays 1910A and 1920A were operated. Relay 1610A on operating prepares a circuit similar to an already described circuit for operating relay 1630A over conductor 715, contacts 1855C8, 1775B2, 1765B3, 1610A7 and 1630A1 when cam contacts 754 of pulser 700B close. Relay 1630A on operating prepares circuits for the operation of relay 1640A and timer 1665A.

As this is a call from a subscriber in exchange B to exchange C the subscriber is charged at the rate of two unit charges per unit time. Relay 1640B is operated twice over conductor 708, contacts 1650A6, 1665A1 and 1630A3 when cam contacts 761 of pulser 700B close. The timer 1665A is initially stepped, when contacts 756 close, over conductor 713, contacts 1630A6 and 1665A2, and it continues to be stepped every time contacts 756 close over the stepping circuit including conductor 713, contacts 1650A4, 1630A4 and 1665A3. On the overtime period, one charge is made per one-half unit time and therefore contacts 760, lead 709 of cable 730B and contacts 1650A5 are used to operate the metering relay 1640A and the timer is stepped after the initial pulse over conductor 712 and contacts 1650A3 when contacts 757 close. It is understood that circuits for operating relays 1640A, overtime relay 1650A and timer 1665A are similar to the ones used for operating their similarly suffixed relays in other repeaters.

*Metered call from exchange B to exchange A and to exchange D*

As the first type of call from exchange B to exchange A operates at exactly the same charge rates as the previously discussed call from exchange B to exchange C it only need be noted that the prefix digit 0 is dialled so that local selector 600B′ is stepped to its tenth level where repeater 1000B is seized which in turn seizes repeater 1300B over trunk 35 normally extended through repeater 1900B in exactly the same manner as described for a call from a subscriber in exchange D to a subscriber in exchange A. Repeater 1000B is used to control the calling subscriber's meter. The metering operation then is a duplication of that described for a call from exchange D to exchange A for which the rates are the same as a call from exchange B to exchange C.

On a call from exchange B to exchange D the called subscriber's number is prefixed by the digits 88. The dialling of the first prefix digit 8 operates selector 600B′ to seize repeater 1000B which in turn causes the seizure of repeater 1300B in exchange A over trunk 35 normally extended through repeater 1900B. Seizure of repeater 1300B results in the seizure of incoming selector 600A″ over trunk 27A as described.

The dialling of the second prefix digit 8 results in rotating MS 1260C of repeater 1000B to its eighth position where conductors X and Y are used to prepare a circuit similar to that described for the ninth position of MS 2060C in repeater 1000B, and at the end of the digit when relay 1140B releases, a previously described circuit is completed for operating relay 1240C which now prepares a previously described circuit for stepping MS 1190B having however the X and Y conductors connected to the eighth bank contacts of MS 1260C. Dialling of this digit of course results in seizure of repeater 1900D, incoming selector 600D' over trunk 5 normally extended through repeater 1000D. Relay 1220C in repeater 1000B then operates at the end of this digit as already described to open the stepping circuit to MS 1190B. Repeater 1000B has the same leads from pulser 700B connected to the first to seventh positions of MS 1190B as are connected to the first to seventh positions of MS 1190B of repeater 1000D from pulser 700D. Therefore when battery is reversed on answer by the called party after the four remaining digits of the called party's number are dialled to ring the called party, relay 1150B in repeater 1000B operates to initiate a metering operation using pulser 700B. The metering operation for repeater 1000B is exactly the same as already described for repeater 1000D on a call from exchange D to exchange B as the subscriber is charged at the same rate for the initial and overtime periods as a subscriber at exchange D making a call to exchange B. It will also be noted that the eighth, ninth and tenth contacts of MS 1190B in repeater 1000B are not used.

*Metered calls from exchange C*

In metered calls from exchange C to exchange B the called subscriber's number is prefixed by the digit 9 and is handled in a similar manner as a call from exchange D to exchange A with the exception that seizure of repeater 1000C results in seizure of repeater 2200B and its associated selector 600B'' when the prefix digit 9 is dialled. Dialling of the first digit of the called party's number then raises the incoming selectors 600B'' to the corresponding level to seize connector 400B. Dialling of this digit will, as disclosed on a call from exchange D to exchange A, result in MS 1260C being rotated to one of its first to seventh positions where relay 1230C will be operated to connect predetermined leads of cable 730C from the pulser 700C which are similar to the leads of cable 730D connected from pulser 700D to repeater 1000D as the charge rate on a call from exchange C to exchange B is the same as a call from exchange D to exchange A.

Dialling of this first digit of the called number will also result in stepping MS 2390B in repeater 2200B to its first position and MS 2460C to one of its first to seventh positions in a manner previously described. A previously described circuit is completed for operating relay 2405C at the end of the digit and the stepping circuit of MS 2460C is broken. MS 2390B is stepped as each digit is dialled but no other circuits are completed and storer 2490C does not operate nor is the DLR operator signalled from this repeater as no ground pulse is forwarded to operate relay 2280A resulting in the failure of the other relay operations necessary to establish these connections as explained in the discussion of a non-metered call from exchange C. The call may then proceed and the sequence of the metering operation of repeater 1000C is as described on a call from exchange D to exchange A.

A metered call from exchange C to exchange A necessitates the use of the prefix digits 00. The dialling of the first prefix digit 0 results in the seizure of the equipment just described on a call to exchange B from exchange C including repeater 1000C, repeater 2200B and incoming selector 600B''. The dialling of the second prefix digit 0 now results in rotating MS 1260C in repeater 1000C to its tenth position over the circuits previously discussed in connection with repeater 1000D. However the stepping circuit of MS 1190B in repeater 1000D is completed through the wiper and ninth contact of MS 1260C in repeater 1000D whereas the stepping circuit for MS 1190B in repeater 1000C is completed through the X and Y conductors connected in multiple to the eighth and tenth positions of MS 1260C in repeater 1000C. Relay 1230C will not operate as its circuit will not be completed when MS 1260C is in its tenth position and relay 1240C when operated prepares the stepping circuit for MS 1190B in repeater 1000C.

The dialling of the second prefix digit 0 also raises the incoming selector 600B'' to its tenth level where it seizes repeater 1000B which in turn seizes repeater 1300B and associated selector 600A'' over trunk 35 normally extended through repeater 1900B. Simultaneously MS 2460C and MS 2390B in repeater 2200B are rotated as before to their tenth and first positions respectively. The eighth, ninth and tenth contacts of MS 2460C are multipled together and it prepares a previously described circuit for relay 2380B. Relay 2405C operates at the end of the prefix digit as relay 2340B releases and completes a previously described circuit for operating relay 2380B and also breaks the stepping circuit for MS 2460C. As before described relay 2380B when operated breaks the stepping circuit for MS 2390B, and as no ground has been forwarded to operate relay 2280A further circuits are not completed for the operation of storer 2490C or the signalling of the DLR operator.

Dialling of the first digit of the called party's number now steps incoming selector 600A'' to a level where it seizes connector 400A in any well-known manner. Simultaneously MS 1490B and MS 1560C in repeater 1300B are stepped to their first and one of its first seven positions respectively as previously described. A previously described circuit for relay 1505C is completed which when operated breaks the stepping circuit to MS 1560C. As a ground pulse does not operate relay 1380A no further circuits are completed and the storer 1590C is not operated nor is the DLR operator signalled. MS 1490B continues to step as further digits are dialled for no purpose.

The dialling of the first digit of the exchange A subscriber's number also steps MS 1260C in repeater 1000B to one of its first seven positions where a circuit is completed for the operation of 1230C and 1240C at the end of the digit thus connecting leads of cable 732C from the pulser 700B to the repeater 1000B. An ineffective metering operation occurs here when the called party answers just as occurred on a call from exchange B to exchange A however the booster battery applied to the C lead 1987A by relay 1040A will not be applied to any meter and therefore will be purposeless. This might be avoided by forwarding a ground from incoming selector 600B'' to operate a relay such as relay 2075B in repeater 2200B which opens a point in the circuit for the initial pulse from pulser 700B.

In the meantime MS 1190B in repeater 1000C is stepped to one of its first seven positions where the predetermined leads of cable 732C from pulser 700C are the same as those used on a call from exchange D to exchange B. The metering operation has been described in connection with repeater 1000D and it will be the same for repeater 1000C after the second, third and fourth digits have been dialled and the called party answers.

On the metered call to exchange D from exchange C the prefix digits 888 are dialled. Seizure of the incoming selector 600A'' proceeds just as on a call to exchange A from exchange C. In repeater 1000C the eight and zero contacts of MS 1260C are multipled together and as the same circuits are completed to prepare MS 1190B of repeater 1000C, the operation is the same with the exception to be noted that the dialling of the third prefix digit 8 places MS 1190B on its eighth contact to which are connected the same leads as are connected to the ninth contact of MS 1190B in repeater 1000D. Thus the ninth contact of MS 1190B in repeater 1000C is blank. However the charge rates are the same as on a call from exchange D to exchange C and the metering operation when the called party answers is similar to that already described in repeater 1000D on a call from exchange D to exchange C.

In repeater 1000B on the call from exchange C to exchange D the dialling of the last prefix digit 8 rotates MS 1260C to its eighth position where a circuit is completed for the MS 1190B switch of this repeater. A metering operation takes place at repeater 1000B on answer by the called party as MS 1190B is stepped to one of its first seven positions on the next digit dialled, but as the booster battery is not applied to a meter it has no effect.

In repeater 2200B on the call from exchange C to exchange D the same operation occurs as occurred on a call from exchange C to exchange A as contacts 8, 9, 0 of MS 2460C are multipled together. In repeater 1300B the stepping circuit to both MS 1490B and MS 1560C are broken when MS 1560C is on its eighth contact after the third prefix digit is dialled and as relay 1505C is operated when relay 1440B releases at the end of the first digit, a circuit is completed for relay 1430B over the 8, 9 and 0 bank contacts multipled together and the wiper of MS 1560C, contacts 1505C4 and conductor 1418B which relay on operating breaks the aforementioned stepping circuits. Incoming selector 600A'' is stepped to its eighth level where it seizes repeater 1900D which in turn seizes incoming selector 600D' over trunk 5 normally extended through repeater 1000D.

The dialling of the first digit of the subscriber's number now results in the stepping of incoming selector 600D' to seize connector 400D. Simultaneously MS 2090B and MS 2061B in repeater 1900D are stepped over their described respective stepping circuits to contact one and one of the first seven contacts respectively. Relay 2153C operates as before described at the end of the digit and breaks the stepping circuit to MS 2061B. MS 2090B is stepped once for each other digit dialled of the subscriber's number but as relay 2123C is not operated nor is MS 2061B in its ninth position, a DLR operation does not take place. However a secondary metering operation occurs in repeater 1900D on answer by a called party as occurred in repeater 1900B on a call from exchange D to exchanges B or C, but as booster battery cannot be applied to a subscriber's meter from this repeater on this operation it has no effect.

The dialling of the second, third and fourth digits of the called subscriber's number and the answer by the called party starts the metering operation at repeater 1000C which proceeds in a manner similar to the described for in repeater 1000D on a call from exchange D to exchange C.

*Calls to the long distance operator*

The long distance operator at 24A is located at exchange A and is reached by dialling 0 in addition to the prefix numbers necessary to reach the A exchange from any other exchanges. A party who desires to reach a long distance operator may be making a call from a metered or paystation phone. Whether the party is at a metered phone or not this operator must ticket the call and switch the call through in any well-known manner. As the long distance operator does not know whether this is a call from a paystation line or from a metered line, battery is reversed so that the test relay may be placed across the line so that if it is a paystation line calling, tone will be heard by the operator. Reversal of battery by the operator, however, would normally start the metering operation and charge the metered subscriber on this type of call, unless some means were provided to prevent the metering operation when the operator reverses battery. The system does not provide a method of enabling the long distance operator to distinguish between metered and non-metered calling subscribers, so on calls to the long distance operator the metering operation is prevented and all non-paystation subscribers are ticketed.

In the case of a metered subscriber at exchange D calling the long distance operator the dialling of the prefix digit 0 results in the seizure of repeater 1000D, repeater 1300D and incoming selector 600A''' in the manner previously described. The second digit dialled is zero and raises selector 600A''' to its tenth level where connection is made to the long distance operator. In the meantime MS 1260C in repeater 100D is rotated to its tenth position where no circuits are completed for stepping MS 1190B or connecting up the pulser 700D leads, and therefore metering does not occur when the long distance operator reverses battery to operate relay 1150 to test for the paystation tone. Relay 1150B in turn operates relay 1010A, which operates relay 1020A so that paystation tone on C lead 1086A may be induced in the secondary of relay 1110B and then sent over the trunks for identification in a manner already explained. She may then ticket the call and complete it in any well-known manner.

In the case of a subscriber at exchange A calling the long distance operator the dialling of 0 results in connection to the long distance operator when local selector 600A is stepped to its tenth level. No seizure of a repeater occurs. Local metering is prevented by the fact that relay 640A is operated when the selector 600A is at the eighth, ninth or tenth levels and this relay operation prevents operation of the polar relay 650 and the metering operation on reversal of battery by the operator when testing for a paystation.

A subscriber at exchange B desiring to reach the long distance operator dials 0 as the first prefix digit to seize incoming selector 600A'' as described before. The calling party again dials 0 to raise the incoming selector 600A'' to its tenth level where connection is made to the long distance operator. Again metering is prevented when the operator reversed battery to test for paystation tone by the fact that MS 1260C of repeater 1000B is at its tenth position where no circuit is provided for operating relay 1230C for connecting leads from the pulser 700B nor can MS 1190B be stepped.

A subscriber at exchange C calling the long distance operator first dials 00 to reach exchange A, where selector 600A'' is seized. In repeater 1000C a circuit is prepared for MS 1190B at the end of the first digit 0 as previously described. However as the digit dialled to reach the long distance operator is 0 the MS 1190B switch in repeater 1000C is stepped to its tenth contact to which no leads from pulser 700C are connected and therefore on reversal of battery by the operator to test for paystation no metering operation occurs and the call may be completed in any well-known manner.

*Local metering operation*

Party line subscribers are not provided with a meter nor are local calls from party lines or other fully non-metered subscribers ticketed by an operator. These calls are therefore made free and may be as long a duration as desired by the calling parties. A high rate subscriber having an individual line and metered service is metered on local calls.

The local metering circuit is the same for all subscribers and the operation of the circuit will be described for a metered subscriber in exchange D making a local call. As all local calls do not raise the selector 600D above the seventh level the normal post springs NPS of the selector 600D do not prepare a circuit for operating relay 640 of the local metering circuit as on a call going to another exchange. Thus when the four digits of the called party's number are dialled and selector 600D had seized connector 400D which then had been operated to connect to and ring the called party who has answered and reversed battery, polar relay 650 is operated in any well-known manner. Relay 650 on operating closes contacts 651 and completes a circuit for operating relay 620 when cam contacts 751 of pulser 700D close as follows: battery, winding of relay 620, contacts 674, contacts 651, contacts 622, lead 718D, cam contacts 751 to ground. Relay 620 closes contacts 621, 623 and opens contacts 622. Contacts 621 completes a holding circuit for relay 620 as follows: battery, winding of relay 620, contacts 674, contacts 651, contacts 621, C conductor to ground in the selector 600D. Contacts 623 prepare a circuit for relay 670 which is completed when cam contacts 752 close as follows: battery, lower winding of relay 670, contacts 623, lead 717, cam contacts 752 to ground. Relay 670 operates and holds operated as follows: battery, upper winding of relay 670, contacts 673 to ground on the C lead in selector 600D. Relay 670 closes contacts 672, 675, 677, 678, 679 and opens contacts 671 and 674. Opening of contacts 674 breaks the holding circuit for relay 620 but completes a temporary new circuit for it over which it is operated as cam contacts 752 and contacts 675 are closed and it falls back as soon as contact 752 open. Contacts 676 prepare a circuit for tone to be applied to the line to warn of the ending of the initial time period and that a new charge will be made if the call is continued. Contacts 677 short one winding of the polar relay 650 and permits better transmission of talking current over the trunk and also allows relay 650 to release and open contacts 651. Contacts 678 on closing prepare a circuit for metering relay 610 which is completed when cam contacts 750 close as follows: ground, cam contacts 750, lead 713 of cable 740, timer contacts 666, contacts 678, contacts 643, winding of relay 610 to battery. Relay 610 operates and applies booster battery at contacts 611 to the meter 680 as described so that one charge is made. On local calls only one unit charge is made per unit time on both initial and overtime periods other leads need not be used from the pulser 700D and therefore the need for an overtime relay is eliminated. The differential meter 680 operates as before and is quickly returned to normal when contacts 766 close again shortly after contacts 750 open. Thus the subscriber is charged once and the timer 665 is initially stepped from its home position over the following circuit. This circuit is as follows: ground, contacts 672, contacts 613, stepping magnet of timer 665 to battery. The timer 665 takes its first step and closes contacts 667 and 668. In the meantime the first stepping circuit for the timer 665 is broken as relay 610 releases shortly after operation. Contacts 667 on closing further prepares a circuit previously prepared when contacts 679 closed and which will step the timer as soon as contacts 755 of the pulser 700D close. This circuit is as follows: ground, cam contacts 755, lead 714 of cable 740, contacts 679, contacts 667, stepping magnet of the timer 665 to battery. The timer 665 continues to step every time cam contacts 755 close until it arrives in its home position. Contacts 669 on closing as previously described provide a tone warning to the calling party that he will shortly be charged for another period. At the end of the period or at home position contacts 667 and 668 open and contacts 666 of the timer 665 close. Relay 670 being still operated allows another pulse to be sent to the meter relay 610 over its previously described metering circuit. It will once more apply booster battery and close contacts 613 to start the timer 665 as before explained. The cycle will then be repeated as long as the call continues.

If the connection should be broken, before the timer 665 reaches its home position, it will be stepped home over the following self-interrupting circuit: ground, contacts 671, contacts 664, contacts 668, stepping magnet of timer 665 to battery.

It is to be noted that any subscriber such as 21*a*, 22*a* and 23*a* at exchange A who receives metered service on a call to any of the other exchanges, also receives metered service on a local call as the ground forwarded from the match pulser 800 through the subscriber's line circuit does not complete any circuit for preventing metered operation and an operator is not signalled on the local call.

*Calls by a long distance operator*

As the operators are located at exchange A any call by the long distance operator 24A from the exchange seizes either repeater 1900B or 1900D over her trunk 26A. The repeater on being seized results in the operation of the previously described relays 1970A, 2000B, 2010A, 2133C and 2010C. Relay 2133C on operating closes contacts 2133C1 to complete a circuit for operating relay 2065B as follows: ground in the operator's position extended through the operator's selector 600A′, over EC lead 986A, contacts 2133C1, contacts 2075B2, winding of relay 2065B to battery. Relay 2065B on operating closes contacts 2065B1 and opens contacts 2065B2 and 2065B3. Contacts 2065B1 on closing short out relay 2010B to prevent its operation to thereby prevent the stepping circuits to MS 2090B and 2061B from being completed at contacts 2010B1. Contacts 2065B2 on opening prevent the operation of relay 2075B and thereby relay 2123C. Thus the DLR operator cannot be signalled nor can the third digit of the called subscriber's number be stored. Contacts 2065B3 on opening prevent any metering operation from starting. Therefore the call may be completed without either signalling the DLR operator or starting a metering operation.

RELEASE OPERATION

*Repeater 1000*

Termination of the call by the called party results in restoring original battery to the outgoing trunk so that polar relay 1150B will release. On release of polar relay 1150B, contacts 1150B1 open to break the circuit to relay 1010A which restores original battery to the trunk at contacts 1010A2 and A3. Relay 1010A also releases contacts 1010A5 and 1010A7 and closes contacts 1010A6. Opening of contacts 1010A7 prevents a pulse from pulser 700D operating relay 1030A.

When the calling party terminates the call the circuit for line relay 1070A is broken at either the calling station or by a preceding repeater and it releases closing contacts 1070A2 to momentarily operate in turn relays 1120B, 1130B, 1140B and 1160B. Relay 1100B releases when contacts 1070A3 open. Relay 1100B on releasing open contacts 1100B2, 1100B3 and 1100B4 and closes contacts 1100B1 to prepare a circuit over which the repeater 1000 can be seized. Opening of contacts 1100B3 releases relays 1120B and 1130B, the last of which on release of contact 1130B1 releases relay 1140B which in turn releases relay 1160B by opening contacts 1140B4. Opening of contacts 1100B4 removes ground from holding conductor 1113B and relays 1210C, 1200C and 1020A release.

If the call is made by a non-metered subscriber, relays 1030A, 1040A, 1050A, 1220C, 1230C, 1240C are not operated. Relay 1200C releasing after relay 1100B releases, opens contacts 1200C1 and close contacts 1200C2, the last to close a circuit over which the repeater may again be seized. At contacts 1200C1 the circuit is opened from the subscriber's EC lead to relay 1170B and it releases to open contacts 1170B1, 1170B2 and close contacts 1170B3 and 1170B4. Relay 1210C on releasing returns the trunk to normal and connects it at contacts 1210C1 and C3 to the incoming selector. Relay 1020A which released on removal of ground from hold conductor 1113B opens contacts 1020A1 and 1020A2, to remove the upper winding of relay 1110B from across the trunk. Relay 1060A also releases to further disconnect the upper winding of 1110B at contacts 1060A1 and 1060A2 from the trunk.

In a metered call relay 1060A is not operated as relay 1010A is only operated once on completion of the call. However relays 1030A, 1050A, 1220C, 1230C and 1240C might still be operated in addition to switches MS 1260C and MS 1190B being in other than their home position. Relay 1230C may also be operated if MS 1260C was not stepped to its first to seventh positions. It has already been explained how the timer 1065A might step to its home position on release of the connections. Removal of ground from hold conductor 1113B opens the circuits of relays 1240C, 1230C and 1220C while release of relay 1210C opens the circuit to relay 1050A and it releases and completes the following circuit for release of MS 1190B and MS 1260C: battery, release magnets of MS 1190B and MS 1260C connected in multiple through their respective off-normal springs, conductor 1212C, contacts 1210C5 to ground. The release magnets operate and return MS 1190B and MS 1260C to their home position. Relay 1030A also releases on removal of ground from hold conductor 1113B and opens contacts 1130A3 and A4 to prevent any further operation of the timer after it reaches the home position and prevent any operation of metering relay 1040A.

In the event the incoming selector 600 was seized as explained before, relay 1250C is operated to prevent seizure of the repeater but it is released as soon as the incoming selector is released at the completion of the call in any well-known manner to restore contact 1250C1 to normal.

*Repeater 1300*

On termination of a call by the called party the original battery on the trunk is restored and relay 1450B releases to open contacts 1450B1 which in turn opens the circuit to relay 1310A and releases it whereupon contacts 1310A2 and 1310A3 are again closed as are contacts 1310A8 while contacts 1310A5 open. If this call was a DLR call closing of contacts 1310A8 shorts resistor 1586C from the DLR trunk and relay 980 at the DLR operator's position reoperates to close contacts 981 and extinguish the supervisory lamp 913 so that the operator knows the call is over. She then removes her plug from the jack 994 and relay 960 releases thus restoring original battery to the DLR trunk causing relay 1535C to release which opens contacts 1535C1 and closes contacts 1535C2 to thus momentarily operate relay 1565C as relay 1555C is locked operated.

However release of the line by the calling party releases relay 1370A, reoperates 1420B, 1430B and 1440B and releases 1400B to in turn release relays 1420B, 1430B, 1440B, 1320A, 1515C, 1525C, 1555C and relay 1505C which is operated if MS 1560C is in its first to seventh position. Relay 1400B on releasing completes at contacts 1400B5 a release circuit for MS 1490B, MS 1560C and storer 1590C (in the event it has not completely released after sending the dialled digit or because of faulty operation): battery, windings of release magnets of MS 1490B, MS 1560C, storer 1590C and their off-normal springs, conductor 1512C, contacts 1400B5 to ground. Returning of MS 1560C to normal breaks the circuit for relay 1480 if it has operated in the event MS 1560C has been stepped to its eighth, ninth or tenth levels. Release of relay 1505C at contacts 1505C3 again prepares the stepping circuit to MS 1560C. Relay 1515C on releasing opens the circuit to storer 1590C and at contacts 1515C2 and C3 disconnects the talking conductors from the DLR trunk and opens contacts 1515C1. Relay 1525C opens contacts 1525C2 and C1 and C3. At contacts 1525C1 it removes ground from C lead 1506C.

*Repeater 1900*

Release of the connection by the called party will of course release relay 2050B to in turn release relay 1910A. Release of relay 1910A will open contacts 1910A5 and 1910A7 the latter to prevent operating relay 1930A after relay 2000B releases. It also closes contacts 1910A8 to short resistor 2186C to signal the DLR operator if the call is a DLR call that it had completed. She will remove her plug from the jack 994 and release relay 2135C in the same manner as the release of 1535C in repeater 1300.

On release of the connection by the calling party relays 1970A, 2020B, 2030B, 2040B and 2000B will be released as described for correspondingly suffixed relays in the other repeaters. Release of relay 2000B removes ground from hold conductor 2013B and relays 1920A, 1930A, 1990A, 2113C, 2123C, 2133C, 2110C, 2115C, 2153C and 2155C release. Contacts 2000B2 opens the circuit to relay 2010B which restores. If the call was a metered call release of relay 1930A opens contact 1930A3 to prevent pulses from 700A from operating relay 1940A. Timer 1965A if not in the home position is stepped home under the following self-interrupted circuit: battery, motor magnet of 1965A, cam contact 1965A3, interrupter contact 1965A6, contacts 1930A5 to ground. Release of relay 2110C at contacts 2110C1 and C3 restores the trunk to the incoming selector and contacts 2110C6 opens the circuit to overtime relay 1950A if it operated. Release of relay 2133C restores the circuit over which the repeater may be seized and opens contacts 2133C1 thus opening the EC lead 1986A and releasing relay 2165B in the event the repeater was seized from an operator's selector 600A'. Opening of contacts 2133C3 releases relay 2075B which operated if the repeater was seized by a selector operated by a non-metered subscriber through repeater 1300. Relay 2153C releasing on removal of ground from conductor 2013B opens contacts 2153C1 and 2153C2. Contacts 2153C1 on opening prevents energization of the upper left hand winding of relay 2123C. Contacts 2153C6 on opening prevent operation of relay 2103C by a DR1 pulse from the pulser 700A and thereby prevents any other relay from being operated by DR pulses. Relay 2115C on releasing disconnects the talking conductors from the DLR trunk and opens contacts 2115C1. The MS 2090B and 2061B switches are released when relay 2000B released to close contacts 2000B6 over a circuit similar to that described for the release of minor switches in other repeaters.

*Repeater 1600*

Termination of the call by both parties releases relays 1750B, 1610A, 1670A, 1700B, 1620A, 1630A, 1720B, 1730B and 1740B in a manner previously described for like suffixed relays in other repeaters. Relays 1810C and 1800C likewise release to open the circuits to either relay 1765B or 1775B depending on which was operated and relay 1650A and release them and restore the circuit over which the repeater may be seized. Relay 1810C on release also closes contacts 2010C6 to release MS 1790B if it has been stepped as follows: battery, release magnet of MS 1790B, off-normal springs, conductor 1812C, contacts 1810C6 to ground. Relays 1875C and 1855C are likewise released if they are operated by a DLR call on release of relay 1700B. Relay 1875C on release opens the stepping circuit to storer 1890C. Relay 1885C operated only on a DLR call releases when contacts 1875C7 and 1875C8 open. The DLR operator is signalled when the call was terminated in a manner previously described on the closing of contacts 1610A8 and she releases polar relay 1835C as previously explained. Release of relay 1875C further disconnects the talking circuit from the DLR trunk and opens contacts 1875C1. Relay 1885C on releasing opens the DLR trunk and idles it so that another repeater may use the trunk to reach the DLR operator. If the call was a metered one, release of relay 1630A prevents pulses being sent from pulser 700 to operate either the timer 1665A or relay 1640A.

*Repeater 2200*

Repeater 2200 will release in much the same manner as described for the release of the other repeaters. On termination of the connection relays 2350B, 2210A, 2220A, 2270A, 2300B, 2320B, 2330B and 2340B release in a manner similar to that already described for the other repeaters. Release of relay 2300B allows the release of relay 2425C, 2415C and 2455C. Relay 2210A on release signals the DLR operator and she releases relay 2435C. Relay 2415C on release opens contacts 2415C2 and 2415C3, to disconnect the talking circuit from the DLR trunk. Relay 2485C is released at contacts 2415C7 and 2415C8. Release of the minor switches 2390B and 2460C if they have been stepped is as follows: battery, release magnets of MS 2390B and 2460C their off-normal springs, conductor 2412C, contacts 2300B5 to ground. Returning of MS 2460C to its home position breaks the circuit for relay 2380B if MS 2460C was in its eighth, ninth or tenth position.

Thus having disclosed and described the preferred embodiment of my invention with particularity what I claim is:

1. In an automatic telephone system of the type having a first called subscriber line, a second called subscriber line, a first class of calling lines having metered service on calls to the called lines, a second class of calling lines having delayed line recording service on calls to the called lines, a third class of calling lines having metered service on calls to said first called line and delayed line recording service on calls to said second called line, a fourth class of calling lines having metered service on calls to said second called line and delayed line recording service on calls to said first called line, common switching means operated by a subscriber at any one of said calling lines initiating a call and dialling the directory number of a desired called subscriber line for establishing a connection from said calling line to said desired called line, the improvement comprising a delayed line recording operator's position, delay control means and meter control means associated with said switching means, marking means individual to said second class of calling lines arranged to cooperate with said delay control means when a connection between a calling one of said second class lines is established to any one of said called lines for disabling said meter control means and for preventing the signalling of the called line, marking means individual to said third class of calling lines arranged to cooperate with said delay control means when a connection between a calling one of said third class lines is established to said second called line for disabling said meter control means and for delaying the signalling of the called line, marking means individual to said fourth class of calling lines arranged to cooperate with said delay control means when a connection from a calling one of said fourth class lines is established to said first called line for disabling said meter control means and for delaying the signalling of the called line, means operated for signalling said operator's position in response to each said delay in signalling a called line, means associated with said switching means and controlled from said operator's position for operating said switching means for signalling the line to which a connection is established, and a meter individual to each calling line in said first, third and fourth classes, said meter control means effective when a connection is established by a calling line in said first class to any one called line and by a calling line in said third class to said first called line and by a calling line in said fourth class to said second called line and answered by a subscriber at the respective lines for operating the meter individual to the calling line.

2. In a telephone system, a calling and a called line, means responsive to a subscriber at said calling line dialling the digits of the called line's telephone number for extending a connection from said calling line to said called line, storing means included in said extended connection for storing one of the digits of said called line's number, a delayed line recording operator's position, means responsive to the storing of said one digit for also connecting said calling line to said operator's position, means responsive to the connection of said calling line to said position for signalling the operator at said position, a supervisory signal at said position, operator controlled means for causing the transmission of said stored digit to signal a subscriber at said called line and for operating said supervisory signal to signal the operator at said position that said digit is being transmitted, means for operating said supervisory signal in response to the complete transmission of said stored digit, and means for again operating said supervisory signal in response to a subscriber at the called line answering the call.

3. In a telephone system, a calling line and a first repeater, a second repeater, a two conductor trunk connecting said first repeater to said second repeater, a third repeater associated with said second repeater, a called line, means including all said repeaters and said trunk for automatically establishing a direct connection from said calling line to said called line, a class of service marking means for marking said calling line for a particular class of service, a first means in said first repeater operated by said marking means, a second means in said first repeater controlled by said first means for unbalancing said two conductor trunk, a third means in said second repeater responsive to the unbalancing of said trunk for forwarding a corresponding marking to said third repeater, and service discriminating means in said third repeater for thereafter controlling said established connection in accordance with the calling line class of service.

4. In a telephone system, a calling subscriber line, a first called subscriber line, a first means for establishing a connection from said calling line to said first called line, said first means operated responsive to a subscriber at said calling line dialling a first prefix number and the regular directory telephone number of said first called line to establish a connection to said called line, and means operated only after a connection is established between said calling line and said called line for intercepting said call directed from the calling line.

5. In a telephone system having a first and a second class of calling lines and a first and second class of called lines, means common to all of said calling lines operated for establishing a connection from any of said calling lines to any of said called lines in accordance with numbers individual to each called subscriber line dialled by a subscriber at any one of said calling lines, and means cooperating with said first means for intercepting calls when a connection is established to one of said first class of called lines if said first means is operated by a subscriber at one of said first class of calling lines, said last means cooperating with said first means for intercepting calls when a connection is established to one of said second class of said called lines if said first means is operated by a subscriber at one of said second class of calling lines.

6. In a system as claimed in claim 5, a meter individual to each of said calling lines, means in said established connection effective for operating the meter of the calling line responsive to said called lines answering a call, and means for preventing the operation of said meter in case said call is intercepted.

7. In a system as claimed in claim 5, means effective after interception for controlling said first means to signal the called lines.

8. In a telephone system a calling subscriber line, a called subscriber line, means operated by a calling subscriber at said calling line dialling a predetermined number for completing a connection from said calling line to said called line, marking responsive means included in said connection, means for marking said calling line, other means for applying said marking to said marking responsive means during a call, said means for marking said calling line applying a corresponding marking to said marking responsive means if a predetermined number is dialled to complete said connection, and an intercept operator's position, said marking responsive means operated to signal said intercept position on said call only in case both said markings correspond.

9. In a telephone system, a plurality of calling lines, a plurality of called lines, means for establishing a connection from any of said calling lines to any of said called lines in accordance with the individually corresponding number of the called line dialled by a subscriber at any one of said calling lines, a relay, a circuit for said relay completed from a calling one of said lines at a predetermined time, another circuit for said relay completed at said predetermined time if said calling subscriber dials one number, said relay operated only in case both said circuits are completed simultaneously, and means operated by said operated relay for intercepting said call.

10. In a telephone system a plurality of calling lines, a plurality of called lines, means for establishing a connection from any of said calling lines to any of said called lines in accordance with the individually corresponding number of the called line dialled by a subscriber at any of said calling lines, a pulser for transmitting pulses, a relay, one circuit connection from said pulser to one of said calling lines, said circuit connection to said one calling subscriber line extended to said relay on a call from said one calling subscriber line, another circuit connection from said pulser extended to said relay if a subscriber at said one calling line dials a certain number to thereby operate said relay when said pulser sends a pulse over said first circuit connection and said other circuit connection, and means operated by said operated relay for intercepting said call.

11. In a telephone system, a plurality of calling lines, a plurality of called lines, means for establishing a connection from any of said calling lines to any of said called lines in accordance with the individually corresponding number of the called line dialled at any of said calling lines, a pulser for transmitting pulses, a relay, individual corresponding circuit connections from said pulser to said calling lines, one circuit connection corresponding to a calling line extended to said relay on a call by said calling line, other circuit connections individually corresponding to the called lines extending from said pulser, a selecting means, said selecting means operated in accordance with the individually corresponding number of the called line dialled by a calling subscriber at one of said calling lines to thereby connect one of said other circuit connections form said pulser to said relay, means in said pulser for simultaneously transmitting a pulse over one of the circuit connection corresponding to the calling line and over the other circuit connection corresponding to the called line to operate said relay, and means operated by said operated relay for intercepting said call.

12. In a telephone system, subscriber lines, discriminating marking means individually controlling predetermined ones of said lines in accordance with the class of calling service for such predetermined lines, calling subscriber controlled means for transmitting a number of impulses individually corresponding to any one of a plurality of called subscriber lines, means responsive to said impulses transmitted from any one of said calling subscriber controlled means for completing a connection to a called subscriber line and for automatically signalling a called subscriber line if the calling line is other than a predetermined one, said last means being also under control of one of said predetermined calling lines to extend a connection to a called one of said lines without signalling the called subscriber, an operator's position, means under control of said discriminating marking means for storing a part of said impulses on a call from one of said predetermined calling lines, and means controlled from said operator's position for releasing the stored impulses to further operate said last means to signal the subscriber at one of said called lines.

13. A system as claimed in claim 12 wherein said discriminating marking means comprises a pulser having connections individually corresponding to said called lines connected to said marking controlled means, means in said pulser for providing an individually corresponding marking for said predetermined lines, and means controlled in accordance with the digits of said transmitted called number for effectuating the connection from said pulser to said marking controlled means corresponding to the called line, said marking controlled means effective to store a digit only if the provided individually corresponding subscriber marking and said effectuated connection correspond.

14. In a system as claimed in claim 12, a meter for each other of said calling lines and for certain of said predetermined lines, a pulser having conductors connected to said means for completing a connection, means in said pulser arranged to deliver an individually corresponding number of pulses over said conductors to said means for completing a connection, selecting means operated by a predetermined dialled digit for selecting corresponding ones of said conductors, means operated by said pulses transmitted over said selected conductors to operate the meter of a calling line accordingly on answer by a called party, said last means operated by pulses transmitted over said selected conductors to operate the meter of a certain predetermined calling line if a call from said certain predetermined line was not intercepted.

15. In a system as claimed in claim 14, a timer, timing circuits extending from said pulser to said timer completed by said selecting means, said timer operated over said timing circuits to thereby control the meter of a calling line in accordance with the duration of said call.

16. In a telephone system having a number of exchanges and a plurality of calling and called lines at each exchange in said system, means for establishing connections from any one of said calling lines to any one of said called lines, said means operated responsive to a calling subscriber on a call to another exchange dialling a prefix number individually corresponding to the called exchange and the regular telephone directory number of the desired called subscriber to connect to the called subscriber line, an operator's position at one exchange, means responsive to a subscriber at any calling line in any exchange dialling a certain prefix number and the telephone number of a calling line for signalling said operator's position and establishing a connection to said called line, and means operated from said operator's position for allowing said first means to complete said call by signalling said called line.

17. In a telephone system, a plurality of calling subscriber lines, discriminating marking means for marking predetermined ones of said calling lines for determining the class of service such calling lines are entitled to, a plurality of called subscriber lines some of which are in a first class and some of which are in a second class, means operated by a subscriber at a calling line for extending a connection from said calling line to one of said called lines, means in said extended connection for immediately applying ringing current to said called line to signal the subscriber thereat, and means in said extended connection controlled by said discriminating marking means in case said connection is extended from a predetermined one of said calling lines to one of said first class of called lines for delaying the application of ringing current to said one first class called line.

18. In a system such as described in claim 17, a meter individual to each of said predetermined calling lines, and means automatically operated for operating the meter of a calling predetermined line on answer of a call to any one of said called lines in said second class which is completed without said delay.

19. A system such as claimed in claim 17 in which said means for delaying the application of ringing current comprises a relay, a circuit for operating said relay completed if a subscriber at one of said calling predetermined lines dials certain digits of a called subscriber's number, and means for storing one of the digits of the called subscriber's number.

20. In a telephone system, subscriber lines, discriminating marking means for transmitting a marking individual to predetermined ones of said lines, calling subscriber controlled means for transmitting digital impulses individually corresponding to any one called subscriber line, a plurality of automatic switches and at least one repeater controlled by said transmitted digital impulses for completing a connection between a calling subscriber line and a called subscriber line, marking responsive means in said repeater operated by a predetermined number of digital impulses corresponding to one of the digits in a particular called subscriber's number transmitted to said repeater and by the individual marking transmitted by the discriminating marking means on a call by one of said predetermined calling lines for intercepting such a call before it is completed.

21. In a telephone system of the type having calling subscriber lines some of which are in a first class and some of which are in a second class, a repeater for receiving a plurality of series of impulses corresponding to the digits of a called subscriber's telephone number, means controlled from any one of said calling subscriber lines for seizing said repeater and for transmitting a plurality of series of digital impulses thereto corresponding to a called line, means in said repeater for repeating simultaneously with their receipt said plurality of series of impulses to retransmit said impulses, and means responsive to said receipt of a number of retransmitted impulses corresponding to a called subscriber's number for completing a connection to the called subscriber's line and for signalling the subscriber at the called line, said last means responsive to receipt of a certain portion of said retransmitted impulses for effecting a connection to said called subscriber line, the improvement comprising discriminating means in said repeater operated only in case said repeater is seized from one of said first class of calling lines for storing a last series of impulses corresponding to the last digit of said called subscriber's telephone number, a toll recording operator's position, means at said position operated for signalling the toll recording operator in response to said discriminating means storing said last digit, and manual control means controlled by said operator for controlling said repeater to transmit said stored digit to signal the connected called line.

22. In a telephone system wherein a first, second and third class of calling lines are provided and a first called line and a second called line are accessible to said calling lines by means common to all of said calling lines on the dialling of a number individually corresponding to the called lines by a subscriber at a calling line to automatically operate said means to establish a connection to a called line, the improvement comprising means operated for intercepting a call to said first called line if a connection thereto is established from one of said first class of calling lines, means including part of said first means operated for intercepting a call to said second called line if a connection thereto is established from one of said second class of calling lines, said first intercepting means operated for intercepting a call to said first called line if a connection thereto is established from one of said third class of calling line, said second intercepting means operated for intercepting a call to said second called line if a connection thereto is established from one of said third class of calling lines, and means for rendering said first intercept means ineffective on a call from said one first class calling line to said second called line and from said one second class calling line to said first called line.

23. In a telephone system of the type wherein a number of called subscribers are provided with individually corresponding telephone numbers, a number of calling subscribers may individually operate common switching apparatus on the dialling of a telephone number individual to one called subscriber to establish a connection to the called subscriber's line and signal the subscriber thereat and wherein the calling subscriber lines are provided with individually corresponding markings arranged to be forwarded to said common switching apparatus before completion of a call, the improvement comprising means in said common switching apparatus operated if the number dialled by a calling subscriber and the individual marking of the calling subscriber line correspond to prevent the signalling of a subscriber at the called line and for storing a digit of the called subscriber's number, the calling subscriber's line being connected to the called subscriber's line on the dialling of said number, an operator's position signalled by said operated means, and means controlled from said operator's position for releasing said stored digit to thereby signal the called subscriber.

References Cited in the file of this patent

UNITED STATES PATENTS

| | | |
|---|---|---|
| 1,944,269 | Raynsford et al. | Jan. 23, 1934 |
| 2,291,496 | Newstedt | July 28, 1942 |
| 2,372,353 | Bascom et al. | Mar. 27, 1945 |
| 2,569,650 | Balzer et al. | Oct. 2, 1951 |
| 2,574,454 | Wicks | Nov. 6, 1951 |
| 2,647,163 | Lomax | July 28, 1953 |